United States Patent
Busch et al.

(10) Patent No.: US 10,657,187 B2
(45) Date of Patent: May 19, 2020

(54) SEARCH INFRASTRUCTURE

(71) Applicant: Twitter, Inc., San Francisco, CA (US)

(72) Inventors: Michael Busch, San Francisco, CA (US); Samuel Luckenbill, San Francisco, CA (US); Brian Larson, San Francisco, CA (US); Patrick J. Lok, San Francisco, CA (US); Krishna Gade, San Francisco, CA (US); Francesco G. Callari, San Francisco, CA (US); Ugo Di Girolamo, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 657 days.

(21) Appl. No.: 14/422,150

(22) PCT Filed: Aug. 16, 2013

(86) PCT No.: PCT/US2013/055409
§ 371 (c)(1),
(2) Date: Feb. 17, 2015

(87) PCT Pub. No.: WO2014/028871
PCT Pub. Date: Feb. 20, 2014

(65) Prior Publication Data
US 2015/0227624 A1  Aug. 13, 2015

Related U.S. Application Data

(60) Provisional application No. 61/800,335, filed on Mar. 15, 2013, provisional application No. 61/801,097, (Continued)

(51) Int. Cl.
*G06F 16/903* (2019.01)
*G06F 16/951* (2019.01)
(Continued)

(52) U.S. Cl.
CPC ...... *G06F 16/951* (2019.01); *G06F 16/24568* (2019.01); *G06F 16/24578* (2019.01); *G06F 16/90339* (2019.01)

(58) Field of Classification Search
CPC ............. G06F 17/30864; G06F 16/951; G06F 16/24568; G06F 16/90339; G06F 16/24578
(Continued)

(56) References Cited

U.S. PATENT DOCUMENTS 7,308,643 B1* 12/2007 Zhu ................... G06F 17/30864
707/E17.108
8,868,535 B1* 10/2014 Paiz .................. G06F 17/30864
707/706
(Continued)

FOREIGN PATENT DOCUMENTS

| JP | 2010-211438 A | 9/2010 |
|----|----|----|
| KR | 10-2004-0017008 A | 2/2004 |
| WO | 00/73942 A2 | 12/2000 |

OTHER PUBLICATIONS

Extended European Search Report in corresponding European Application No. 13829589.4 dated Mar. 17, 2016 (6 pages).
(Continued)

*Primary Examiner* — Syed H Hasan
*Assistant Examiner* — Saba Ahmed
(74) *Attorney, Agent, or Firm* — Fish & Richardson P.C.

(57) ABSTRACT

A system for real-time search, including: a set of partitions, each including a set of segments, each segment corresponding to a time slice of messages posted to the messaging platform, and a real-time search engine configured to receive a search term in parallel with other partitions in the set of partitions, and search at least one of the set of segments in reverse chronological order of the corresponding time slice to identify document identifiers of messages containing the
(Continued)

search term; and a search fanout module configured to: receive a search query including the search term; send the search term to each of the set of partitions for parallel searching; and return, in response to the search query, at least one of the identified document identifiers of messages containing the search term.

26 Claims, 41 Drawing Sheets

Related U.S. Application Data filed on Mar. 15, 2013, provisional application No. 61/801,687, filed on Mar. 15, 2013, provisional application No. 61/684,668, filed on Aug. 17, 2012.

(51) Int. Cl.
  *G06F 16/2457* (2019.01)
  *G06F 16/2455* (2019.01)
(58) Field of Classification Search
  USPC .......................................................... 707/728
  See application file for complete search history.

(56) References Cited

U.S. PATENT DOCUMENTS

| | | | |
|---|---|---|---|
| 2003/0050959 A1 | 3/2003 | Faybishenko et al. | |
| 2003/0182310 A1* | 9/2003 | Charnock | G06F 17/30716 |
| 2005/0193335 A1* | 9/2005 | Dorai | G06F 17/30893 |
| | | | 715/234 |
| 2009/0125504 A1* | 5/2009 | Adams | G06F 17/30905 |
| 2010/0199257 A1* | 8/2010 | Biggerstaff | G06F 8/76 |
| | | | 717/104 |
| 2010/0306238 A1* | 12/2010 | Balakrishnan | G06F 16/328 |
| | | | 707/769 |
| 2011/0264717 A1* | 10/2011 | Grube | G06F 11/0727 |
| | | | 707/827 |
| 2011/0295694 A1* | 12/2011 | Coggeshall | G06Q 30/02 |
| | | | 705/14.66 |
| 2012/0084291 A1* | 4/2012 | Chung | G06F 16/14 |
| | | | 707/741 |
| 2012/0158633 A1* | 6/2012 | Eder | G06N 5/022 |
| | | | 706/46 |
| 2012/0197928 A1 | 8/2012 | Zhang et al. | |
| 2013/0124474 A1* | 5/2013 | Anderson | G06F 17/30286 |
| | | | 707/634 |
| 2013/0173306 A1* | 7/2013 | Sasidhar | G06F 19/322 |
| | | | 705/3 |
| 2013/0262959 A1* | 10/2013 | Resch | G06F 11/10 |
| | | | 714/766 |
| 2014/0351891 A1* | 11/2014 | Grube | G06F 11/0727 |
| | | | 726/3 |
| 2015/0134623 A1* | 5/2015 | Liu | G06F 11/1453 |
| | | | 707/692 |

OTHER PUBLICATIONS

Busch et al., "Earlybird: Real-Time Search at Twitter", 28th International Conference on Data Engineering (ICDE 2012), Arlington, Virginia, USA, Apr. 1-5, 2012, IEEE, Piscataway, New Jersey, Apr. 1, 2012, pp. 1360-1369, 10 pages.
International Search Report issued in PCT/US2013/055409 dated Nov. 26, 2013, 3 pages.
Written Opinion of the International Searching Authority issued in PCT/US2013/055409 dated Nov. 26, 2013, 4 pages.
Soboroff et al., "Evaluating Rel-Time Search over Tweets," retrieved from the internet at Jun. 4, 2012 at URL <https://www.aaai.org/ocs/index.php/ICWSM/ICWSM12/paper/download/4714/5062/>, 4 pages.
Nagmoti et al., "Ranking Approaches for Microblog Search," Web Intelligence and Intelligent Agent Technology (WI-IAT), 2010 IEEE/WIC/ACM International Conference on, IEEE, Piscataway, New Jersey, Aug. 31, 2010, XP031785699, ISBN 978-1-4244-8482, pp. 153-157, 5 pages.
European Search Opinion issued in EP 13829589.4 dated Mar. 17, 2016, 4 pages.
Supplementary European Search Report issued in EP 13829589.4 dated Mar. 3, 2016, 1 page.
International Search Report issued in PCT/US2013/055409 dated Nov. 26, 2013 (2 pages).
Ben-Yitzhak et al., "Beyond Basic Faceted Search Yahoo! Research," Feb. 11, 2008, Retrieved from the Internet: URL<http://nadav.harel.org.il/homepage/papers/p33-ben-yitzhak.pdf> Retrieved on Feb. 5, 2020, pp. 33-39.
BR Office Action in Brazilian Appln. No. BR112015003293-1, dated Jan. 14, 2020, 6 pages (with English ranslation).
Dash et al., "Dynamic faceted search for discovery-driven analysis," Proceedubg of the 17th ACM Conference on Information and Knowledge Mining, CIKM 2008, ACM Press, New York, New York, Oct. 26, 2008, pp. 3-12, DOI: 10.1145/1458082.1458087, ISBN: 978-1-59593-991-3, * p. 4-p. 8 *.
Extended European Search Report in European Application No. 19217153.6, dated Feb. 21, 2020, 5 pages.
Extended European Search Report in European Application No. 19217156.9, dated Feb. 19, 2020, 11 pages.

* cited by examiner

Inverted Message Index 299

Message Table 200

| | |
|---|---|
| 1 | The old night keeper keeps the keep in the town |
| 2 | In the big old house in the big old gown. |
| 3 | The house in the town had the big old keep |
| 4 | Where the old night keeper never did sleep |
| 5 | The night keeper keeps the keep in the night |
| N | And keeps in the dark and sleeps in the light. |

| Dictionary 205 | Postings List 210 |
|---|---|
| and | <6> |
| big | <2> <3> |
| dark | <6> |
| did | <4> |
| gown | <2> |
| had | <3> |
| house | <2> <3> |
| in | <1> <2> <3> <5> <6> |
| keep | <1> <3> <5> |
| keeper | <1> <4> <5> |
| keeps | <1> <5> <6> |
| light | <6> |
| never | <4> |
| night | <1> <4> <5> |
| old | <1> <2> <3> <4> |
| sleep | <4> |
| sleeps | <6> |
| the | <1> <2> <3> <4> <5> <6> |
| town | <1> <3> |
| where | <4> |

Primary Posting 1381: [Document Identifier bit(s) 1382] [Term Position bit(s) or Term Occurrence bit(s) 1383] [Type Flag bit(s) 1384]

FIG. 13A

Overflow Postings 1385: [Term Position bit(s) 1386] [Term Position bit(s) 1386] [Term Position bit(s) 1386] [Term Position bit(s) 1386]

FIG. 13B

Overflow Postings 1385: [Term Occurrence bit(s) 1389A] [Term Position bit(s) 1386] [Payload Length bit(s) 1387] [Payload bit(s) 1388] {First Overflow Posting} [Term Position bit(s) 1386] [Payload Length bit(s) 1387] [Payload bit(s) 1388] [Block Length bit(s) 1389B] {Second Overflow Posting}

FIG. 13C

SEARCH INFRASTRUCTURE

BACKGROUND

Traditional search techniques rely heavily upon indexing. Generally, it is impractical and inefficient to scan each document in a large corpus of documents. Indexing can greatly reduce the computing power required for search operations by abstracting data in one or more data structures external to the corpus. An index is a representation of data which is organized to allow faster data retrieval operations, often at the expense of greater storage requirements and/or increased write latency.

One common type of search index is the inverted index. In order to construct an inverted index, each document in the corpus is analyzed and a dictionary is constructed based on the analysis. The dictionary is an index of all unique searchable terms found in the corpus documents. Each term in the dictionary is associated with a list of document identifiers, where each document identifier references a document containing at least one instance of the term. Thus, it is possible to perform a textual search of the dictionary for a specified term and to identify each document containing the term. Although the usage of indices can greatly improve the read latency of a search engine, extremely large data sets can present a challenge for search engine designers. Most large indexed data sets are implemented as distributed systems involving complicated synchronization algorithms to maintain data consistency.

Complicating the matter even further, real-time messaging platforms can have entirely different requirements from those of traditional search architectures. For example, a real-time platform may place a greater emphasis on timeliness as a search criterion. In fact, the corpus of searchable data may be entirely different based on the method chosen for ingesting and assimilating new documents. A key requirement of real-time search is the ability to ingest content rapidly and index it for searchability, while concurrently supporting low-latency, high-throughput query evaluation. As a result, the traditional search engine architecture may be inadequate for indexing and searching real-time information.

SUMMARY

In general, in one aspect, the invention relates to a system for real-time search in a messaging platform. The system can include: a computer processor; a set of partitions, each including a set of segments, each segment corresponding to a time slice of messages posted to the messaging platform, and a real-time search engine configured to receive a search term in parallel with other partitions in the set of partitions, and search at least one of the set of segments in reverse chronological order of the corresponding time slice to identify document identifiers of messages containing the search term; and a search fanout module executing on the computer processor and configured to: receive a search query including the search term; send the search term to each of the set of partitions for parallel searching; and return, in response to the search query, at least one of the identified document identifiers of messages containing the search term.

In general, in one aspect, the invention relates to a method for real-time search in a messaging platform. The method can include: receiving a search query including a search term; sending the search term to each of a set of partitions for parallel searching, where the set of partitions each includes a set of segments, and where each of the set of segments corresponds to a time slice of messages posted to the messaging platform; for each partition, in parallel with other partitions in the set of partitions, searching, using a computer processor, at least one of the set of segments in reverse chronological order of the corresponding time slice to identify document identifiers of messages containing the search term; and returning, in response to the search query, at least one of the identified document identifiers of messages containing the search term.

In general, in one aspect, the invention relates to a non-transitory computer-readable storage medium having instructions for real-time search in a messaging platform, the instructions configured to execute on at least one computer processor and including functionality to: receive a search query including a search term; send the search term to each of a set of partitions for parallel searching, where the set of partitions each includes a set of segments, and where each of the set of segments corresponds to a time slice of messages posted to the messaging platform; for each partition, in parallel with other partitions in the set of partitions: search at least one of the set of segments in reverse chronological order of the corresponding time slice to identify document identifiers of messages containing the search term; and return, in response to the search query, at least one of the identified document identifiers of messages containing the search term.

In general, in one aspect, the invention relates to a system for real-time search. The system can include: a computer processor; a partition including a first segment including a first time slice of documents and a query cache associated with the first segment and including a first binary attribute for each document of the first time slice of documents; and a real-time search engine executing on the computer processor and configured to: receive a search request including a first binary search term, search the query cache in reverse chronological order of the first time slice of documents by matching the first binary search term to a value of the first binary attribute, generate, based on searching the query cache, a result set including document identifiers of a subset of the first time slice of documents, and return the result set in response to the search request.

The system for real-time search according to any of the above-mentioned embodiments, wherein the real-time search engine is further configured to: calculate relevance scores for at least a portion of the first time slice of documents, wherein the relevance scores are calculated based on timeliness of the portion of the first time slice of documents, and wherein the subset of the first time slice of documents is selected for inclusion in the result set based on the calculated relevance scores.

The system for real-time search according to any of the above-mentioned embodiments, wherein: the search request further comprises a non-binary search term; and the real-time search engine is further configured to identify the non-binary search term within each document of the subset.

The system for real-time search according to any of the above-mentioned embodiments, further comprising a query cache update engine configured to: identify an average search time latency for the non-binary search term; determine that the average search time latency exceeds a predefined threshold; and dynamically add an additional binary attribute to the query cache in response to determining that the average search time latency exceeds the predefined threshold.

The system for real-time search according to any of the above-mentioned embodiments, wherein: the query cache further comprises a second binary attribute for each document of the first time slice of documents; the search request further comprises a second binary search term; and searching the query cache in reverse chronological order of the first time slice of documents further comprises matching the second binary search term to a value of the second binary attribute.

The system for real-time search according to any of the above-mentioned embodiments, wherein: the partition further comprises a second segment comprising a second time slice of documents; the query cache is further associated with the second segment and the query cache comprises the first binary attribute for each document of the second time slice of documents; and the real-time search engine is further configured to search the query cache in reverse chronological order of the second time slice of documents by matching the first binary search term to a value of the first binary attribute, wherein the result set further comprises document identifiers of a subset of the second time slice of documents.

The system for real-time search according to any of the above-mentioned embodiments, wherein a portion of the query cache associated with the first segment and a portion of the query cache associated with the second segment are operable to be updated at different frequencies based on changes of metadata associated with the documents of the first time slice of documents and the second time slice of documents.

The system for real-time search according to any of the above-mentioned embodiments, wherein: the first time slice of documents comprises documents posted more recently than the second time slice of documents; and the portion of the query cache associated with the first segment is updated more frequently than the portion of the query cache associated with the second segment.

The system for real-time search according to any of the above-mentioned embodiments, further comprising: a plurality of partitions comprising the partition; and a search fanout module configured to: receive the search request comprising the first binary search term; send the search request to the plurality of partitions for parallel searching; receive a plurality of result sets from the plurality of partitions, wherein the plurality of result sets comprises the result set; generate a final result set comprising document identifiers from the plurality of result sets; and return the final result set in response to the search request.

The system for real-time search according to any of the above-mentioned embodiments, wherein searching the query cache further comprises executing a logical operation on values of at least two binary attributes to identify the first subset of documents.

The system for real-time search according to any of the above-mentioned embodiments, wherein: the partition comprises a single writer thread; and searching the query cache further comprises: identifying a last update identifier indicating a last update point of the query cache; identifying a last written document identifier designating a position of the single writer thread of the partition; identifying, based on the last update identifier and the last written document identifier, a stale portion of the query cache corresponding to a fresh portion of a postings list of the first segment; refreshing the stale portion of the query cache; and determining a safe search range of the postings list, wherein the refreshed portion is within the safe search range.

The system for real-time search according to any of the above-mentioned embodiments, wherein the single writer thread is the only writer thread of the partition.

The system for real-time search according to any of the above-mentioned embodiments, wherein the first binary attribute comprises one selected from a group consisting of a top contributor flag, a top document flag, a spam flag, an includes image flag, an includes video flag, an includes news flag, an includes pornography flag, and includes antisocial user flag.

The system for real-time search according to any of the above-mentioned embodiments, wherein the first binary attribute represents a query-independent characteristic for each document.

The system for real-time search according to any of the above-mentioned embodiments, wherein the first time slice of documents are posted to a real-time messaging platform.

In general, in one aspect, the invention relates to a method for real-time search. The method can include: receiving a search request including a first binary search term; identifying an inverted document index including document identifiers of a first time slice of documents; accessing, by a computer processor, a query cache including a binary attribute for each document of the first time slice of documents; searching, by the computer processor, the query cache in reverse chronological order of the first time slice of documents by matching the first binary search term to the first binary attribute; generating, based on searching the query cache, a result set including document identifiers of a subset of the first time slice of documents; and returning the result set in response to the search request.

The method for real-time search according to any of the above-mentioned embodiments, further comprising calculating relevance scores for at least a portion of the first time slice of documents, wherein the subset of the first time slice of documents is selected for inclusion in the result set based on the calculated relevance scores.

The method for real-time search according to any of the above-mentioned embodiments, wherein the search request further comprises a non-binary search term, and wherein the method further comprises identifying the non-binary search term within each document of the subset.

The method for real-time search according to any of the above-mentioned embodiments, further comprising executing a logical operation on values of at least two binary attributes for each document of at least a portion of the first time slice of documents to identify the first subset of documents.

The method for real-time search according to any of the above-mentioned embodiments, wherein the inverted document index is updated by only a single writer thread, and wherein searching the query cache further comprises: identifying a last update identifier indicating a last update point of the query cache; identifying a last written document identifier designating a position of the single writer thread in a postings list of the inverted document index; identifying, based on the last update identifier and the last written document identifier, a stale portion of the query cache corresponding to a fresh portion of a postings list of the postings list; refreshing the stale portion of the query cache; and determining a safe search range of the postings list, wherein the refreshed portion is within the safe search range.

The method for real-time search according to any of the above-mentioned embodiments, wherein the first binary attribute represents a query-independent characteristic for each document.

In general, in one aspect, the invention relates to a non-transitory computer-readable storage medium having instructions for real-time search. The instructions are configured to execute on at least one computer processor to enable the computer processor to: receive a search request including a first binary search term; identify an inverted document index including document identifiers of a first time slice of documents; access a query cache including a binary attribute for each document of the first time slice of documents; search the query cache in reverse chronological order of the first time slice of documents by matching the first binary search term to the first binary attribute; generate, based on searching the query cache, a result set including document identifiers of a subset of the first time slice of documents; and return the result set in response to the search request.

In general, in one aspect, the invention relates to a system for real-time search. The system can include: a computer processor; an inverted index segment including a postings list corresponding to a first time slice of documents; a facet store associated with the postings list; and a real-time search engine executing on the computer processor and configured to: receive a search request including a search term and a facet category; search, based on the search term, the postings list in reverse chronological order of the first time slice of documents to identify a first set of matching document identifiers; search elements in the facet store corresponding to the first set of matching document identifiers to identify a set of facets within the facet category; calculate a count of references from the elements to each facet in the set of facets; generate, based on the count of references, a result set including a facet identifier of a facet of the set of facets; and return the result set in response to the search request.

The system for real-time search according to any of the above-mentioned embodiments, further comprising an inverted facet index comprising a facet dictionary and a facet postings list, wherein the facet dictionary comprises facet identifiers of the set of facets, and wherein the facet postings list comprises document identifiers of documents associated with the set of facets.

The system for real-time search according to any of the above-mentioned embodiments, wherein the real-time search engine is further configured to: search the inverted facet index for the facet identifier; calculate, based on searching the inverted facet index, histogram scores for the facet identifier, wherein each of the histogram scores represents a count of documents associated with the facet identifier within a discrete time segment of the facet postings list; calculate a historical average of the histogram scores; and determine that a current histogram score of the histogram scores exceeds the historical average, wherein the facet identifier is selected for inclusion in the result set based on the current histogram score exceeding the historical average.

The system for real-time search according to any of the above-mentioned embodiments, wherein the facet store further comprises a primary facet array and an overflow facet array, wherein: the primary facet array comprises a plurality of primary elements each corresponding to a document identifier of the postings list; and the overflow facet array comprises a plurality of overflow elements, and wherein the overflow facet array is configured to store facet identifiers for document identifiers of the postings list that are associated with multiple facets; and searching elements of the facet store comprises: searching, based on the facet category, the primary facet array in reverse chronological order of the first time slice of documents to identify references to the set of facets; and calculating a count of references to each facet of the set of facets, wherein the facet identifier is selected for inclusion in the result set based on the count of references to the facet identifier.

The system for real-time search according to any of the above-mentioned embodiments, wherein the real-time search engine is further configured to determine, based on accessing an inverted facet index, a count of the first time slice of documents referencing each facet of the first set of facets, wherein the facet identifier is selected for inclusion in the result set based on the count.

The system for real-time search according to any of the above-mentioned embodiments, further comprising: a plurality of partitions comprising a first partition, wherein the first partition comprises the inverted index segment, the facet store, and the real-time search engine; and a search fanout module configured to: receive the search request comprising the search term and the facet category; send the search request to each of the plurality of partitions for parallel searching; receive a plurality of result sets from the plurality of partitions, wherein the plurality of result sets comprises the result set; generate a final result set comprising facet identifiers from the plurality of result sets; and return the final result set in response to the search request.

The system for real-time search according to any of the above-mentioned embodiments, wherein each of the plurality of partitions comprises only a single writer thread, and wherein searching the facet store further comprises: identifying a last update identifier indicating a last update point of the facet store; identifying a last written document identifier designating a position of the single writer thread of the partition; identifying, based on the last update identifier and the last written document identifier, a stale portion of the facet store corresponding to a fresh portion of a postings list of the inverted index segment; refreshing the stale portion of the facet store; and determining a safe search range of the postings list, wherein the refreshed portion is within the safe search range.

The system for real-time search according to any of the above-mentioned embodiments, wherein the facet category comprises one selected from a group consisting of an images facet category, a videos facet category, a news facet category, a hashtag facet category, a mentions facet category, an authors facet category, a topics facet category, a language statistics facet category, a source statistics facet category, and a stocks facet category.

The system for real-time search according to any of the above-mentioned embodiments, wherein the first time slice of documents comprises messages posted to a real-time messaging platform.

In general, in one aspect, the invention relates to a method for real-time search. The method can include: receiving a search request including a search term and a facet category; identifying an inverted index segment including a postings list corresponding to a first time slice of documents; searching, based on the search term, the postings list in reverse chronological order of the first time slice of documents to identify a first set of matching document identifiers; accessing, by a computer processor, a facet store associated with the postings list; searching, by the computer processor, elements in the facet store corresponding to the first set of matching document identifiers to identify a set of facets within the facet category; calculating, by the computer processor, a count of references from the elements to each facet in the set of facets; generating, based on the count of references, a result set including a facet identifier of a facet of the set of facets; and returning the result set in response to the search request.

The method for real-time search according to any of the above-listed embodiments, further comprising: searching an inverted facet index for the facet identifier, wherein the inverted facet index comprises a facet dictionary and a facet postings list, wherein the facet dictionary comprises facet identifiers of the set of facets, and wherein the facet postings list comprises document identifiers of documents associated with the set of facets; calculating, based on searching the inverted facet index, histogram scores for the facet identifier, wherein each of the histogram scores represents a count of documents associated with the facet identifier within a discrete time segment of the facet postings list; calculating a historical average of the histogram scores; and determining that a current histogram score of the histogram scores exceeds the historical average, wherein the facet identifier is selected for inclusion in the result set based on the current histogram score exceeding the historical average.

The method for real-time search according to any of the above-listed embodiments, wherein the facet store further comprises a primary facet array and an overflow facet array, wherein: the primary facet array comprises a plurality of primary elements each corresponding to a document identifier of the postings list; the overflow facet array comprises a plurality of overflow elements, wherein the overflow facet array is configured to store facet identifiers for document identifiers of the postings list that are associated with multiple facets; and searching elements of the facet store comprises: searching, based on the facet category, the primary facet array in reverse chronological order of the first time slice of documents to identify references to the set of facets; and calculating a count of references to each facet of the set of facets, wherein the facet identifier is selected for inclusion in the result set based on the count of references to the facet identifier.

The method for real-time search according to any of the above-listed embodiments, further comprising determining, based on accessing an inverted facet index, a count of the first time slice of documents referencing each facet of the first set of facets, wherein the facet identifier is selected for inclusion in the result set based on the count.

The method for real-time search according to any of the above-listed embodiments, further comprising: receiving, in a search fanout module, the search request comprising the search term and the facet category; sending the search request to each of a plurality of partitions for parallel searching, wherein the plurality of partitions comprises a first partition, wherein the first partition comprises the inverted index segment and the facet store; receiving a plurality of result sets from the plurality of partitions, wherein the plurality of result sets comprises the result set; generating a final result set comprising facet identifiers from the plurality of result sets; and returning the final result set in response to the search request.

The method for real-time search according to any of the above-listed embodiments, wherein each of the plurality of partitions comprises only a single writer thread, and wherein searching the facet store further comprises: identifying a last update identifier indicating a last update point of the facet store; identifying a last written document identifier designating a position of the single writer thread of the partition; identifying, based on the last update identifier and the last written document identifier, a stale portion of the facet store corresponding to a fresh portion of a postings list of the inverted index segment; refreshing the stale portion of the facet store; and determining a safe search range of the postings list, wherein the refreshed portion is within the safe search range.

The method for real-time search according to any of the above-listed embodiments, wherein the facet category comprises one selected from a group consisting of an images facet category, a video facet category, a news facet category, a hashtag facet category, a mentions facet category, an authors facet category, a topics facet category, a language statistics facet category, a source statistics facet category, and a stocks facet category.

The method for real-time search according to any of the above-listed embodiments, wherein the first time slice of documents comprises messages posted to a real-time messaging platform.

In general, in one aspect, the invention relates to a non-transitory computer-readable storage medium having instructions for real-time search. The instructions are configured to execute on at least one computer processor to enable the computer processor to: receive a search request including a search term and a facet category; identify an inverted index segment including a postings list corresponding to a first time slice of documents; search, based on the search term, the postings list in reverse chronological order of the first time slice of documents to identify a first set of matching document identifiers; access a facet store associated with the postings list; search elements in the facet store corresponding to the first set of matching document identifiers to identify a set of facets within the facet category; calculate a count of references from the elements to each facet in the set of facets; generate, based on the count of references, a result set including a facet identifier of a facet of the set of facets; and return the result set in response to the search request.

The non-transitory computer-readable storage medium of any above-mentioned embodiment, wherein the facet store further comprises a primary facet array and an overflow facet array, wherein: the primary facet array comprises a plurality of primary elements each corresponding to a document identifier of the postings list; and the overflow facet array comprises a plurality of overflow elements, and wherein the overflow facet array is configured to store facet identifiers for document identifiers of the postings list that are associated with multiple facets; and searching elements of the facet store comprises: searching, based on the facet category, the primary facet array in reverse chronological order of the first time slice of documents to identify references to the set of facets; and calculating a count of references to each of the set of facets, wherein the facet identifier is selected for inclusion in the result set based on the count of references to the facet identifier.

The non-transitory computer-readable storage medium of any above-mentioned embodiment, wherein the plurality of instructions further comprise functionality to determine, based on accessing an inverted facet index, a count of the first time slice of documents referencing each of the first plurality of facets, wherein the facet identifier is selected for inclusion in the result set based on the count.

In general, in one aspect, the invention relates to a system for real-time search. The system can include: a computer processor; an inverted index segment including: a primary postings list including a primary posting for each document of a time slice of documents; and an overflow postings list including a set of overflow blocks, wherein each of the set of overflow blocks corresponds to at least one occurrence of a term in an associated document of the time slice of documents; and a real-time search engine executing on the computer processor and configured to: receive a search request including a search term; search, based on the search term, the primary postings list in reverse chronological order of the time slice of documents to identify a set of primary postings; identify, for each of at least a subset of the set of primary postings, an overflow block of the set of overflow blocks; generate, based on the set of primary postings and the identified overflow blocks, a result set including a set of document identifiers of documents matching the search term; and return the result set in response to the search request.

The system for real-time search according to any of the above-mentioned embodiments, wherein identifying the overflow block comprises, for a primary posting of the subset: determining that a document corresponding to the primary posting comprises at least one repeat occurrence of the search term; and determining, based on the primary posting, a location of the overflow block in the overflow postings list.

The system for real-time search according to any of the above-mentioned embodiments, wherein determining the location of the overflow block comprises: identifying, in the primary postings list, a skip point within proximity of the primary posting; and accessing, in the primary postings list, a skip entry element corresponding to the skip point, wherein the skip entry element stores a reference to the location of the overflow block.

The system for real-time search according to any of the above-mentioned embodiments, wherein identifying the overflow block comprises, for a primary posting of the subset: determining that the document corresponding to the primary posting comprises at least one repeat occurrence of the search term; determining, based on a location of the primary posting in the primary postings list, that the overflow block is not referenced by an associated skip entry element; accessing a first element of the overflow postings list corresponding to the search term; and traversing the overflow postings list until the overflow block corresponding to the primary posting is identified.

The system for real-time search accordingly to any of the above-mentioned embodiments, wherein each primary posting of the primary postings list comprises: a document identifier corresponding to a document; a configurable portion, wherein the configurable portion comprises one selected from a group consisting of a term position value storing a location of a term within the document and an occurrence value storing a number of occurrences of a term within the document; and a primary posting type flag indicating whether the configurable portion stores the term position value or the occurrence value.

The system for real-time search according to any of the above-mentioned embodiments, wherein each overflow block of the plurality of overflow blocks comprises a plurality of overflow postings corresponding to a primary posting in the primary postings list.

The system for real-time search according to any of the above-mentioned embodiments, wherein each overflow posting of the plurality of overflow postings comprises one selected from a group consisting of a delta-position value indicating a position of a term within a document, a payload attribute storing information about an occurrence of the term within the document, and a payload length indicating a size of the payload attribute.

The system for real-time search according to any of the above-mentioned embodiments, wherein the primary postings list comprises: a first level postings pool comprising a plurality of first level sections each configured to store at least one first level primary posting; and a last level postings pool comprising a plurality of last level sections each larger than each of the plurality of first level sections, wherein each of the plurality of last level sections comprises skip entry elements and skip points.

The system for real-time search according to any of the above-mentioned embodiments, wherein each of the plurality of first level sections and each of the plurality of last level sections is a dynamically allocated object in heap memory.

The system for real-time search according to any of the above-mentioned embodiments, wherein the overflow postings list comprises: a first level postings pool comprising a plurality of first level sections each configured to store at least one first level overflow posting; and a last level postings pool comprising a plurality of last level sections each larger than each of the plurality of first level sections.

The system for real-time search according to any of the above-mentioned embodiments, wherein: generating the result set comprises calculating relevance scores for documents referenced by each of the set of primary postings, wherein the relevance scores are calculated based at least on timeliness; and the plurality of document identifiers is selected for inclusion in the result set based on the calculated relevance scores.

The system for real-time search according to any of the above-mentioned embodiments, further comprising: a plurality of partitions comprising a first partition, wherein the first partition comprises the inverted index segment and the real-time search engine; and a search fanout module configured to: receive the search request comprising the search term; send the search request to each of the plurality of partitions for parallel searching; receive a plurality of result sets from the plurality of partitions, wherein the plurality of result sets comprises the result set; generate a final result set comprising document identifiers from the plurality of result sets; and return the final result set in response to the search request.

In general, in one aspect, the invention relates to a method for real-time search. The method can include: receiving a search request including a search term; searching, by a computer processor and based on the search term, a primary postings list in reverse chronological order of a time slice of documents to identify a set of primary postings; identifying, by the computer processor and for each of at least a subset of the set of primary postings, an overflow block of a set of overflow blocks, wherein each of the set of overflow blocks corresponds to at least one occurrence of a term in an associated document of the time slice of documents; generating, based on the set of primary postings and the identified overflow blocks, a result set including a set of document identifiers of documents matching the search term; and returning the result set in response to the search request.

The method for real-time search according to any of the above-mentioned embodiments, wherein identifying the overflow block comprises, for a primary posting of the subset: determining that a document corresponding to the primary posting comprises at least one repeat occurrence of the search term; and determining, based on the primary posting, a location of the overflow block in an overflow postings list, wherein determining the location of the overflow block comprises: identifying, in the primary postings list, a skip point within proximity of the primary posting; and accessing, in the primary postings list, a skip entry element corresponding to the skip point, wherein the skip entry element stores a reference to the location of the overflow block.

The method for real-time search according to any of the above-mentioned embodiments, wherein identifying the overflow block comprises, for a primary posting of the subset: determining that the document corresponding to the primary posting comprises at least one repeat occurrence of the search term; determining, based on a location of the primary posting in the primary postings list, that the overflow block is not referenced by an associated skip entry element; accessing a first element of an overflow postings list corresponding to the search term; and traversing the overflow postings list until the overflow block corresponding to the primary posting is identified.

The method for real-time search according to any of the above-mentioned embodiments, wherein each primary posting of the primary postings list comprises: a document identifier corresponding to a document; a configurable portion, wherein the configurable portion comprises one selected from a group consisting of a text position value storing a location of a term within the document and an occurrence value storing a number of occurrences of a term within the document; and a primary posting type flag indicating whether the configurable portion stores the text position value or the occurrence value.

The method for real-time search according to any of the above-mentioned embodiments, wherein each overflow posting of the plurality of overflow postings comprises one selected from a group consisting of a delta-position value indicating a position of a term within a document, a payload attribute storing information about an occurrence of the term within the document, and a payload length indicating a size of the payload attribute.

The method for real-time search according to any of the above-mentioned embodiments, wherein the primary postings list comprises: a first level postings pool comprising a plurality of first level sections each configured to store at least one first level primary posting; and a last level postings pool comprising a plurality of last level sections each larger than each of the plurality of first level sections, wherein each of the plurality of last level sections comprises skip entry elements and skip points.

The method for real-time search according to any of the above-mentioned embodiments, wherein: generating the result set comprises calculating relevance scores for documents referenced by each of the set of primary postings, wherein the relevance scores are calculated based at least on timeliness; and the plurality of document identifiers is selected for inclusion in the result set based on the calculated relevance scores.

In general, in one aspect, the invention relates to a non-transitory computer-readable storage medium having instructions for real-time search. The instructions are configured to execute on at least one computer processor to enable the computer processor to: receive a search request including a search term; search, based on the search term, a primary postings list in reverse chronological order of a time slice of documents to identify a set of primary postings; identify, for each of at least a subset of the set of primary postings, an overflow block of a set of overflow blocks, wherein each of the set of overflow blocks corresponds to at least one occurrence of a term in an associated document of the time slice of documents; generate, based on the set of primary postings and the identified overflow blocks, a result set including a set of document identifiers of documents matching the search term; and return the result set in response to the search request.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 1B shows a schematic diagram of a partition that can be included in the partitions of FIG. 1A, in accordance with one or more embodiments of the invention.

FIG. 2 shows an example of an inverted message index in accordance with one or more embodiments of the invention.

FIGS. 13A-13C depict an example of a primary posting and an overflow posting in accordance with one or more embodiments of the invention.

DETAILED DESCRIPTION

Figure 1A:
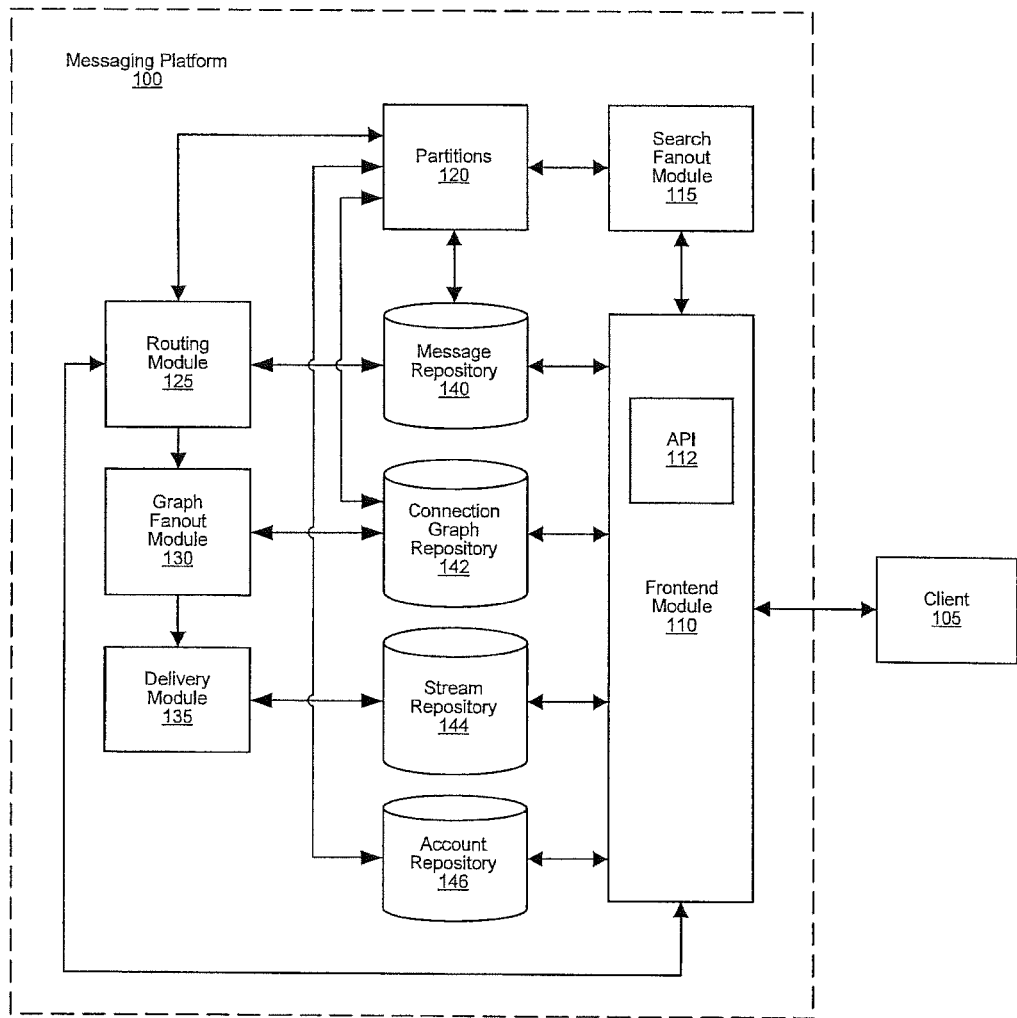
FIG. 1A shows a schematic diagram of a system, in accordance with one or more embodiments of the invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments of the invention provide a method and system for search in any system including searchable documents (e.g., messages in a messaging platform, web pages, videos, and/or any other type of document that is searchable). In one or more embodiments, messages posted to a messaging platform are required to be within a maximum length (e.g., character count). In one or more embodiments, hyperlinks and non-textual content can be excluded from a maximum length determination of the message, in accordance with various embodiments. It should be appreciated that one or more embodiments of the invention are discussed with reference to messages in a messaging platform, but that one or more embodiments of the invention can include searchable documents in any platform. A search query including a search term is received from a client. The search term is sent to a set of partitions for parallel searching. Each partition returns one or more document identifiers of messages associated with the search term. One or more of the document identifiers is returned in response to the search query.

FIG. 1A shows a messaging platform (100) and a client (105) in accordance with one or more embodiments of the invention. As shown in FIG. 1A, the messaging platform (100) has multiple components including a frontend module (110) with an application programming interface (API) (112), a search fanout module (115), partitions (120), a routing module (125), a graph fanout module (130), a delivery module (135), a message repository (140), a connection graph repository (142), a stream repository (144), and an account repository (146). Various components of the messaging platform (100) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

In one or more embodiments of the invention, the messaging platform (100) is a platform for facilitating real-time communication between one or more entities. For example, the messaging platform (100) can store millions of accounts of individuals, businesses, and/or other entities (e.g., pseudonym accounts, novelty accounts, etc.). One or more users of each account may use the messaging platform (100) to send messages to other accounts inside and/or outside of the messaging platform (100). In one or more embodiments, the messaging platform (100) can be configured to enable users to communicate in "real-time", i.e., to converse with other users with a minimal delay and to conduct a conversation with one or more other users during simultaneous sessions. In other words, the messaging platform (100) can allow a user to broadcast messages and can display the messages to one or more other users within a reasonable time frame so as to facilitate a live conversation between the users. Recipients of a message may have a predefined graph relationship with an account of the user broadcasting the message. In one or more embodiments of the invention, the user is not an account holder or is not logged in to an account of the messaging platform (100). In this case, the messaging platform (100) can be configured to allow the user to broadcast messages and/or to utilize other functionality of the messaging platform (100) by associating the user with a temporary account or identifier.

In one or more embodiments of the invention, the search fanout module (115) includes functionality to receive a search query including one or more search terms. The search query can be generated by the frontend module (110) in response to a search request received from the client (105) and then sent to the search fanout module (115). The search terms can be part of a search string (e.g., a regular expression) or other grouping of terms and can include one or more user entered search terms and/or one or more filter flags for filtering or otherwise restricting the requested search, in accordance with various embodiments of the invention. Examples of a filter flag may include, but are not limited to, an exclude antisocial flag, an exclude spam flag, an exclude native reports flag, a top messages flag, an image request flag, a video request flag, and a news request flag. The filter flag can be generated and included in an application programming interface (API) call made by the client (105) or can be added to the request by the frontend module (110) based on a type and/or source of the request.

In one or more embodiments of the invention, the partitions (120) include functionality to identify one or more document identifiers of messages matching the search term(s). Each partition can be configured to search one or more segments (discussed below) in order to identify messages based on the search terms. In addition, the search fanout module (115) can be configured to receive the search request including a search term and/or a facet category, and send the search request to the partitions (120) for parallel searching. The search fanout module (115) can be configured to receive a set of result sets from the partitions (120), generate a final result set including document identifiers and/or facet identifiers from the set of result sets, and return the final result set in response to the search request. For example, the search fanout module (115) can return the final result set to the frontend module 110.

Real-Time Search Infrastructure

Figure 1B:
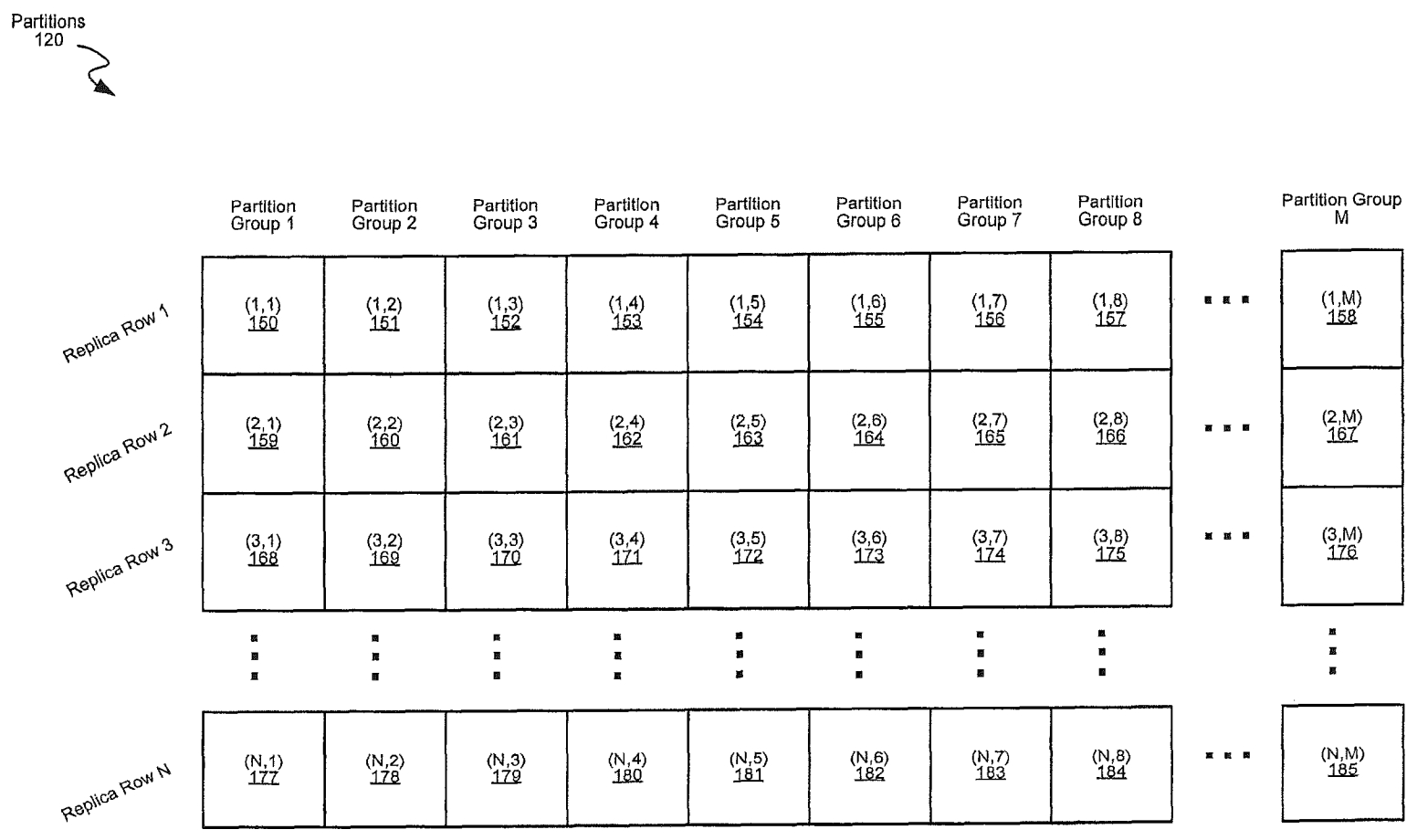

FIG. 1B shows a schematic diagram of a partition (150) that can be included in the partitions (120) of FIG. 1A, in accordance with one or more embodiments of the invention. As shown in FIG. 1B, each partition group (e.g., partition group 1, partition group 2, etc.) may include multiple replicated partitions in one or more replica rows. For example, FIG. 1B shows four replicated partitions (150, 159, 168, and 177) across four replica rows (replica rows 1, 2, 3, and N) for partition group 1. Thus, each partition may be replicated any number of times (e.g., N times in the example of FIG. 1B). Replicated partitions can store the same document identifiers in their inverted message indices (or portions thereof). Various components of the partitions (120) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

In one or more embodiments of the invention, the search fanout module (115) includes functionality to send one or more search terms to one partition in each of the partition groups. Each partition can be configured to receive the search terms in parallel with one or more other partitions in the other partition groups. Thus, in one or more embodiments of the invention, the search terms are fanned out to a single partition from each partition group. The search fanout module can be configured to select the single partitions in response to receiving a search query.

In one or more embodiments of the invention, the search fanout module (115) is configured to perform load balancing among partitions and/or partition groups. The search fanout module (115) may be configured to receive periodic or on-demand updates (e.g., status, current load/bandwidth, etc.) from one or more of the partitions and/or to use the updates to implement any type of scheduling algorithm for load balancing. Alternatively, in one or more embodiments of the invention, the search fanout module (115) is configured to randomly select a partition from each partition group. In one or more embodiments of the invention, the load balancing functionality is performed by an intermediary service of each partition group rather than the search fanout module (115).

Figure 1C:
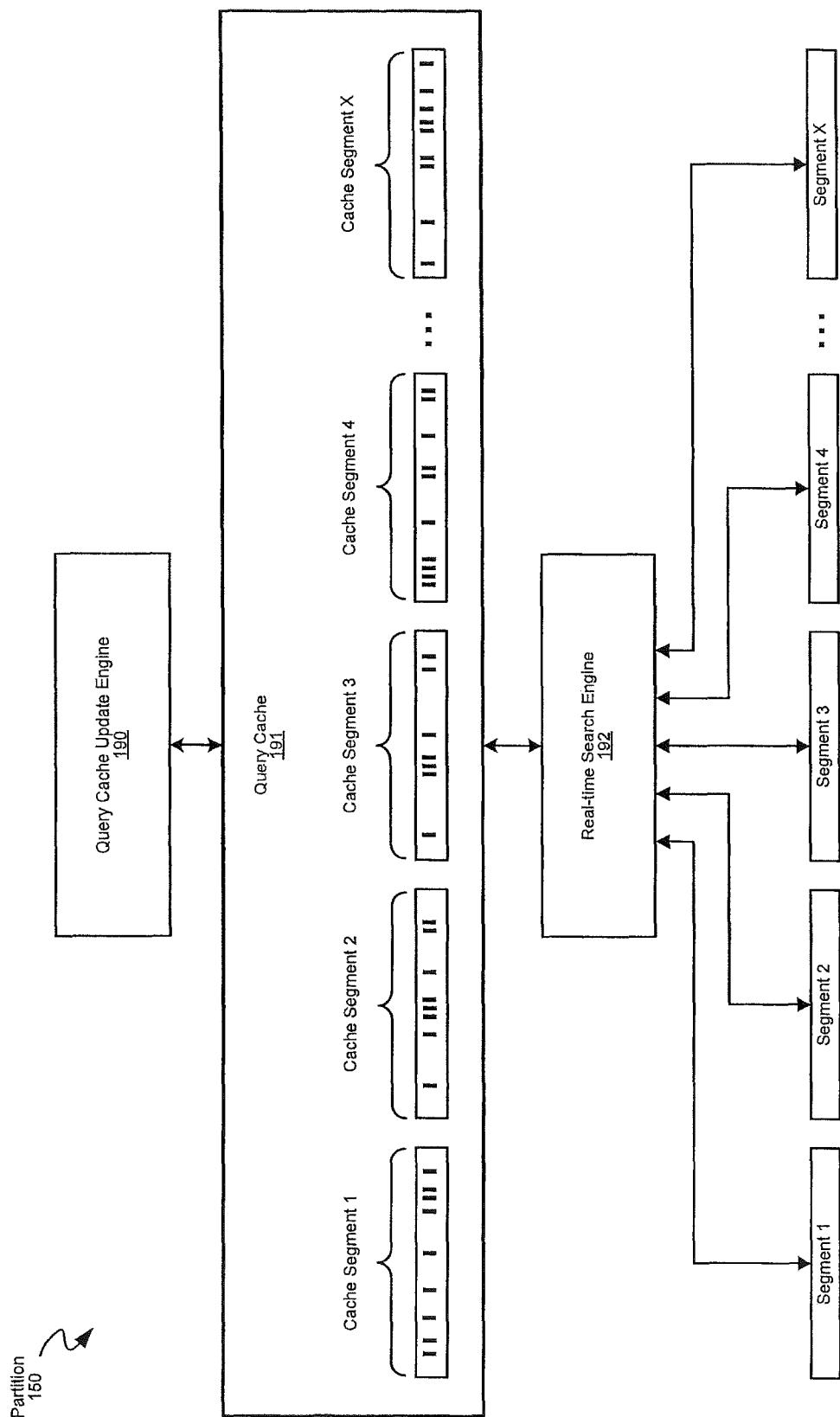
FIG. 1C shows a schematic diagram of a partition that can be included in the partitions of FIG. 1A, in accordance with one or more embodiments of the invention.

FIG. 1C shows a schematic diagram of a partition (150) of FIG. 1B, in accordance with one or more embodiments of the invention. As shown in FIG. 1C, the partition (150) can include a query cache (191) and/or one or more segments (e.g., segments 1-X). The query cache (191) can include one or more cache segments (e.g., cache segments 1-X), each mapped to a different segment of the partition (150) (e.g., cache segment 1 mapped to segment 1, cache segment 2 mapped to segment 2, and so on). The partition (150) can further include a real-time search engine (192) and/or a query cache update engine (190). Various components of the partition (150) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there may be more than one of each separate component running on a device, as well as any combination of these components within a given embodiment of the invention.

In one or more embodiments of the invention, each segment (e.g., segments 1-X) includes an inverted message index and one or more associated data structures. For example, an index can include a postings list, a dictionary, and an attributes array storing one or more attributes for each posting in the postings list. The postings list may include any number of document identifiers referencing a set of messages in the message repository (110). Alternatively, in one or more embodiments of the invention, one or more of the segments may store separate portions of the same inverted message index. In this way, the inverted message index may be stored collectively across multiple segments of the partition (150).

In one or more embodiments of the invention, each segment (e.g., segments 1-X) stores one or more time slices of messages posted to the messaging platform. For example, each segment can include a postings list representing messages that were consecutively posted or posted in order to the messaging platform. However, in one or more embodiments of the invention, the messages in the time slice may not have necessarily been posted back to back to the messaging platform.

The postings list may include document identifiers of a set of messages in the message repository (110) that include a particular term identified in the dictionary. In one or more embodiments, one or more of the segments may store separate portions of the same inverted index. In this way, the inverted index may be stored collectively across multiple segments of the partition (150).

The query cache (191) can be one or more repositories, data services, structures, and/or collections of data corresponding to the document identifiers stored in one or more segments of the partition (150). In one or more embodiments of the invention, the query cache (191) includes a cache segment (e.g., cache segments 1-X of FIG. 1C) corresponding to each segment (e.g., segments 1-X). Thus, in the example of FIG. 1C, cache segment 1 includes data associated with segment 1, cache segment 2 includes data associated with segment 2, cache segment 3 includes data associated with segment 3, and so on. Each entry in the cache segment may include one or more binary attributes corresponding to a document identifier in the corresponding segment. Examples of binary attributes may include, but are not limited to, a top contributor flag, a top message flag, a spam flag, an includes image flag, an includes video flag, and an includes news flag. The cache segments may be implemented as distinct objects or structures, and/or may simply refer to a logical portion of the query cache (191), in accordance with various embodiments of the invention. In another example, the query cache (191) can include cache segments each corresponding to more than one partition segment. In a further example, the query cache (191) can include cache segments that together correspond to one partition segment.

In one or more embodiments of the invention, the partition (150) includes functionality to read and/or modify the query cache (191). The partition (150) may include one or more background processes (not shown) configured to periodically or continuously update the query cache (191) by calculating and/or identifying attributes and updating cache entries accordingly. The background processes may follow a writer thread updating one or more inverted message indices of the segments, and may update stale query cache entries for newly written messages.

In one or more embodiments of the invention, the partition (150) includes functionality to receive a binary attribute with the search term. The partition (150) can be configured to match the binary attribute to one or more entries in the query cache (191). The partition (150) can then return one or more document identifiers of messages corresponding to the matched entries. In this way, the partition (150) can be configured to limit the search range of a given request to messages of a particular type (i.e., messages having the specified attribute(s)).

In one or more embodiments of the invention, each partition (150) includes a single writer thread (not shown). The writer thread can be configured to modify the segment(s) of the partition according to a predefined protocol. For example, the writer thread can be configured to periodically replace or overwrite an oldest segment of the partition with document identifiers of a current time slice of new messages of the messaging platform, and/or to delete the oldest segment of the partition. In one or more embodiments of the invention, by utilizing a single writer thread, the partition (150) is configured to avoid the use of exclusive locks entirely and to guarantee that the writer thread is non-blocking and wait-free (i.e., never blocked in progressing by locked resource).

In one or more embodiments of the invention, the writer thread includes functionality to maintain a shared volatile variable designating or associated with a last written document identifier. The shared volatile variable can be shared between the writer thread and any number of reader threads of the real-time search engine (192). The writer thread and the real-time search engine (192) can be configured to utilize the shared volatile variable to synchronize concurrent read and write operations and/or to implement the aforementioned non-blocking wait-free algorithm.

In one or more embodiments of the invention, the writer thread includes functionality to write a predefined number of document identifiers (and related data) to a segment. The written data (or a portion thereof) can be cached and, thus, not yet written to shared memory (e.g., RAM or other memory shared between two or more CPU cores), depending on the caching algorithm used. The writer thread can be configured to perform a write to the volatile variable at a location in the program order which precedes any reads of the written document identifiers. In one or more embodiments of the invention, the write of the volatile variable causes a flush of the cache to shared memory for at least the written document identifiers. The writer thread can further be configured to maintain a shared last written document identifier (e.g., as a value of the volatile variable). Thus, the real-time search engine (192) can be configured to read document identifiers up to the last written document identifier. In one or more embodiments of the invention, these document identifiers are guaranteed to be valid because the real-time search engine (192) only reads document identifiers up until the last written document identifier (which is not updated until the write of the volatile variable). Because the write of the volatile variable occurs prior (in the program order) to any reads of the written document identifiers, the data is guaranteed to be flushed to shared memory and thus valid. In this way, the real-time search engine (192) can be configured to use the volatile variable to create a memory barrier which is visible to multiple executing threads.

In one or more embodiments of the invention, each partition (150) includes multiple writer threads. In this case, the partition can be configured to utilize one or more synchronization mechanisms to maintain data integrity and to avoid potential concurrency issues.

In one or more embodiments of the invention, the real-time search engine (192) includes functionality to search the query cache (191) using cache-only and/or hybrid filtering. As the writer thread writes the most current segment, the query cache segment corresponding to that segment may be populated by one or more background processes. Thus, a background process may trail the writer thread and update corresponding query cache data as the current segment is written. As a result, population of the query cache segment may lag the population of the current segment by varying amounts. Cache-only filtering involves searching only the portions of the query cache (191) that are non-stale at a current time (i.e., without performing an on-demand update of the query cache (191)). Thus, cache-only filtering restricts the search range to that of the currently non-stale cache entries. Hybrid filtering involves populating a stale portion of the query cache (191) on demand. Thus, the real-time search engine (192) can be configured to identify a stale portion of the query cache (191) which corresponds to the lag between the writer thread and one or more background processes responsible for updating the query cache (191). The query cache update engine (190) or the real-time search engine (192) can then calculate the attribute values for the stale portion and update the query cache (191), thereby increasing the search range of the query cache (191) for the current request.

In one or more embodiments of the invention, the real-time search engine (192) includes functionality to determine a safe search range of the query cache (191). In one or more embodiments of the invention, the search range refers to the searchable (i.e., non-stale) portion of the query cache at a given point in time. The search range may be calculated either periodically or on demand, at any time before and/or after receiving the search request, in accordance with various embodiments of the invention.

In one or more embodiments of the invention, the real-time search engine (192) includes functionality to identify a last update identifier indicating a last update point of the query cache (191). The real-time search engine (192) can be configured to identify a last written document identifier designating a position of the single writer thread of the partition. Based on the last update identifier and the last written document identifier, the real-time search engine (192) may be configured to identify a stale portion of the query cache corresponding to a fresh portion of the postings list (i.e., a portion of the query cache (191) which is not yet updated by the background process(es)). The query cache update engine (190) in conjunction with the real-time search engine (192) can then refresh the stale portion of the query cache on demand, and can then update a safe search range of query cache (191) to include the previously stale portion.

The partition (150) can be implemented as a single physical computing device (e.g., a server) or any number of physical computing devices in a distributed system. Thus, for example, the partition (150) may refer to a single server device, or a logical group of communicatively coupled server devices in a cluster. Similarly, the segments may be implemented in various different physical configurations. Thus, each segment may be implemented as any number of separate computing devices, each segment may refer to a set of related applications in a distributed system, or the segments may reside in the same physical computing device, in accordance with various embodiments of the invention.

Returning to FIG. 1A, in one or more embodiments of the invention, each partition of the partitions (120) includes functionality to send one or more of the identified document identifier(s) to the search fanout module (115). Each partition can be configured to send any subset of the document identifiers to the search fanout module (115), in accordance with a predefined protocol for selecting document identifiers. For example, the partition can rank the document identifiers based on their relevance scores and can select the highest ranked subset, the lowest ranked subset, or a random subset of the document identifiers for transmission to the search fanout module (115).

In one or more embodiments of the invention, the search fanout module (115) includes functionality to receive the document identifier(s) from one or more of the partitions (115). The fanout module (115) can be configured to receive any number of document identifiers from each partition (e.g., depending on the number of matches or selections made by the partition).

In one or more embodiments of the invention, the search fanout module (115) includes functionality to select any number of the received document identifiers for responding to the search query. Thus, the search fanout module (115) can be configured to simply aggregate the document identifiers from each partition and to send them in response to the search query, or to reduce the total number of document identifiers by selecting one or more document identifiers from the aggregated set. The search fanout module (115) can be configured to perform the selection randomly or according to a predefined algorithm. In one or more embodiments of the invention, the partitions calculate a relevance score for each document identifier. The document identifiers are sent along with their corresponding relevance scores to the search fanout module (115). In this case, the search fanout module (115) can be configured to aggregate the document identifiers and to select a subset of the aggregated document identifiers with the highest relevance scores to be sent in response to the search query. Aggregating the document identifiers may involve simply obtaining the identifiers from their respective partitions, in accordance with various embodiments of the invention.

Figure 1D:
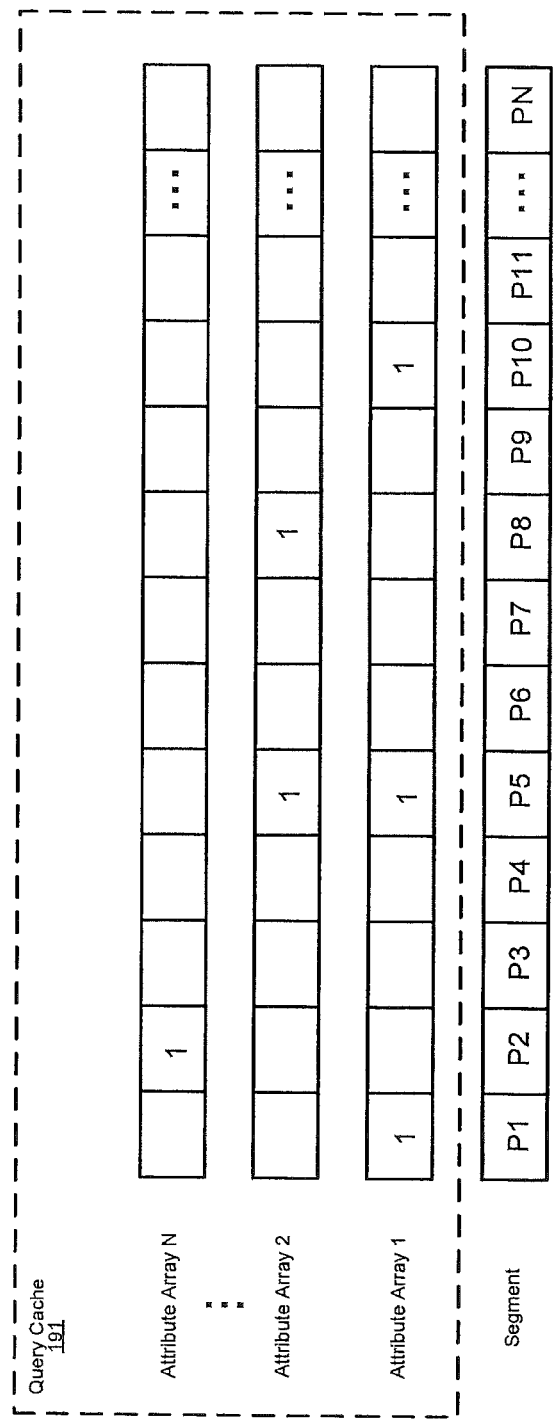
FIG. 1D shows a diagram of a query cache and a corresponding segment, in accordance with one or more embodiments of the invention.
Figure 1E:
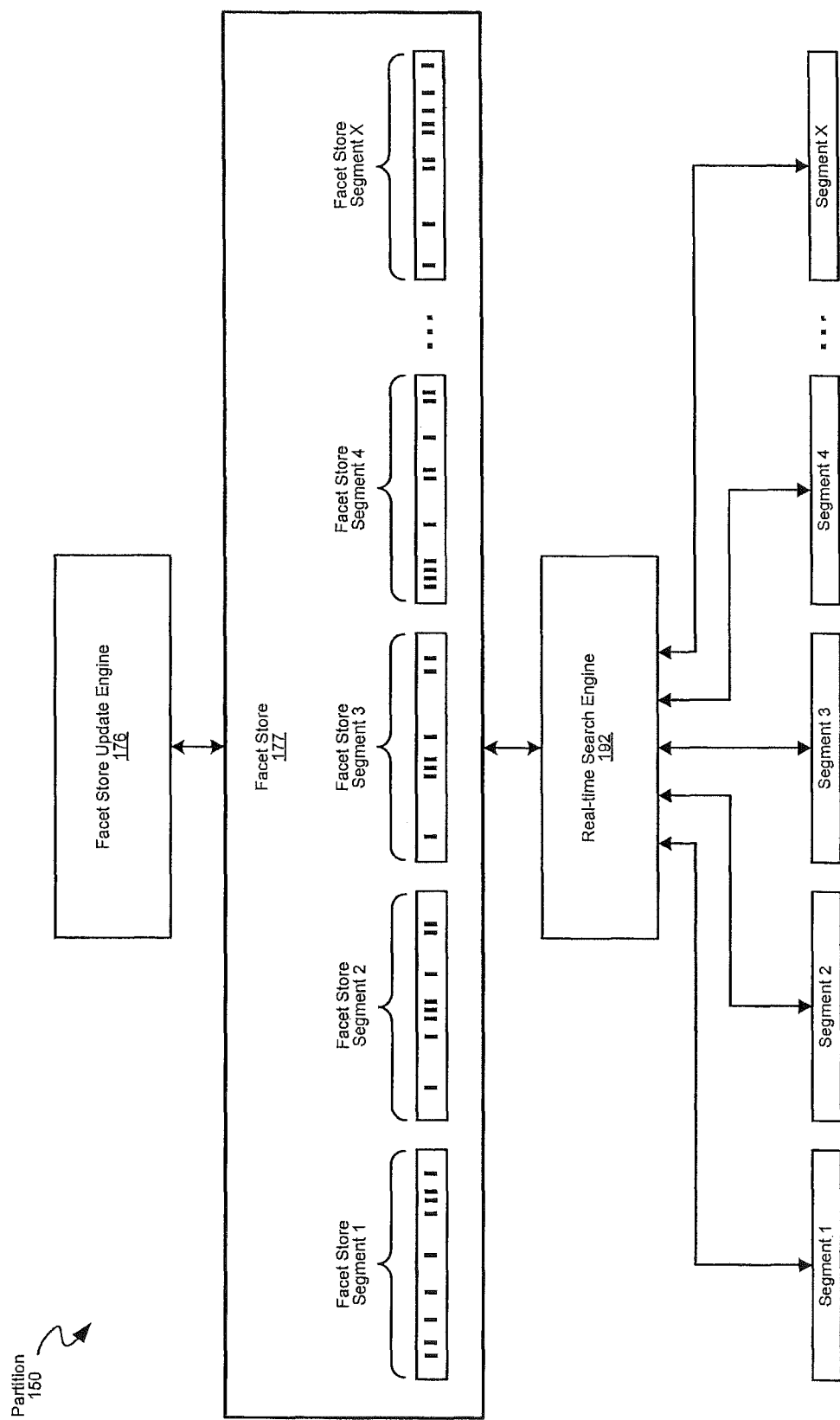
FIG. 1E shows a schematic diagram of a partition that can be included in the partitions of FIG. 1A, in accordance with one or more embodiments of the invention.
Figure 1F:
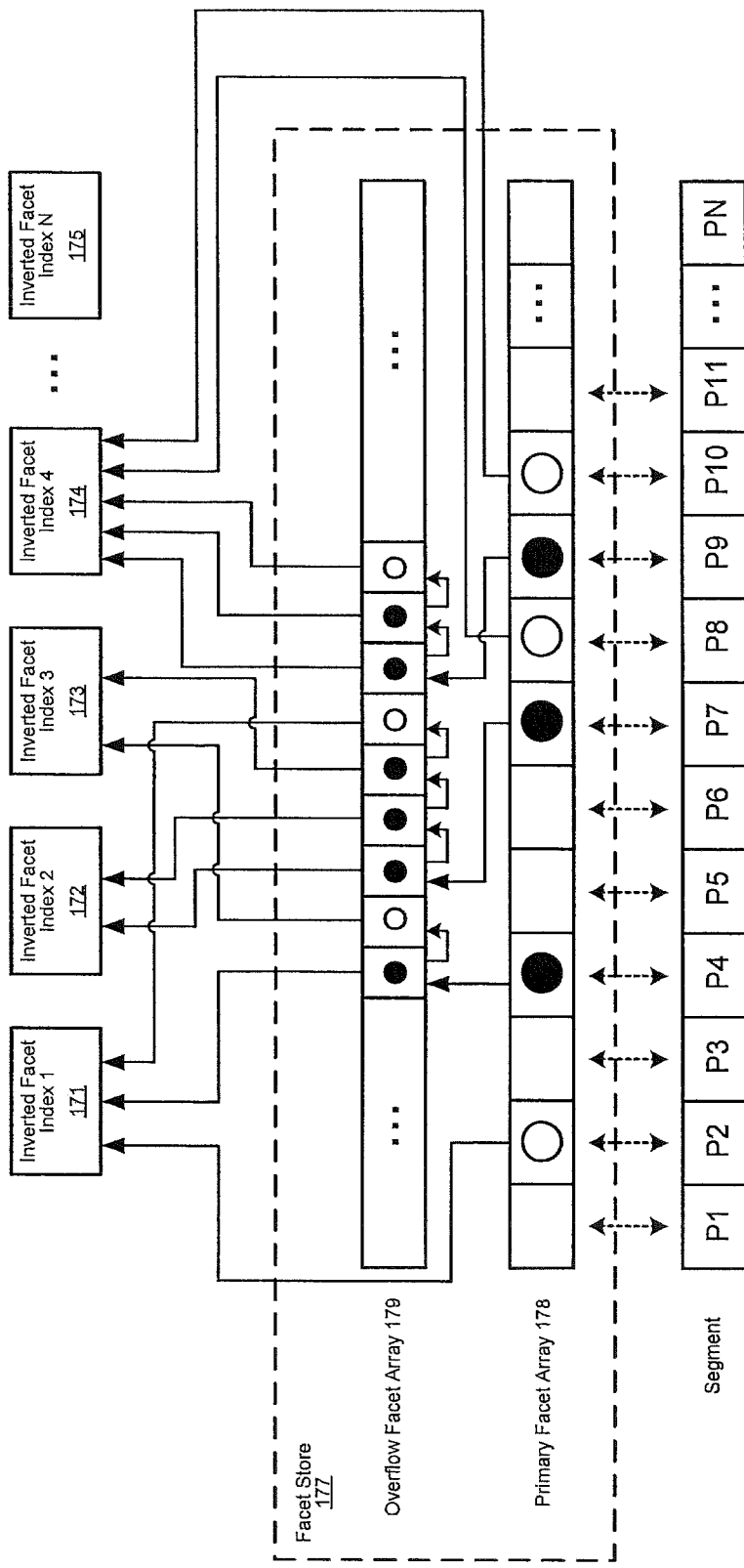
FIG. 1F shows a schematic diagram of a facet store, a corresponding segment, and corresponding inverted facet indices, in accordance with one or more embodiments of the invention.
Figure 1G:
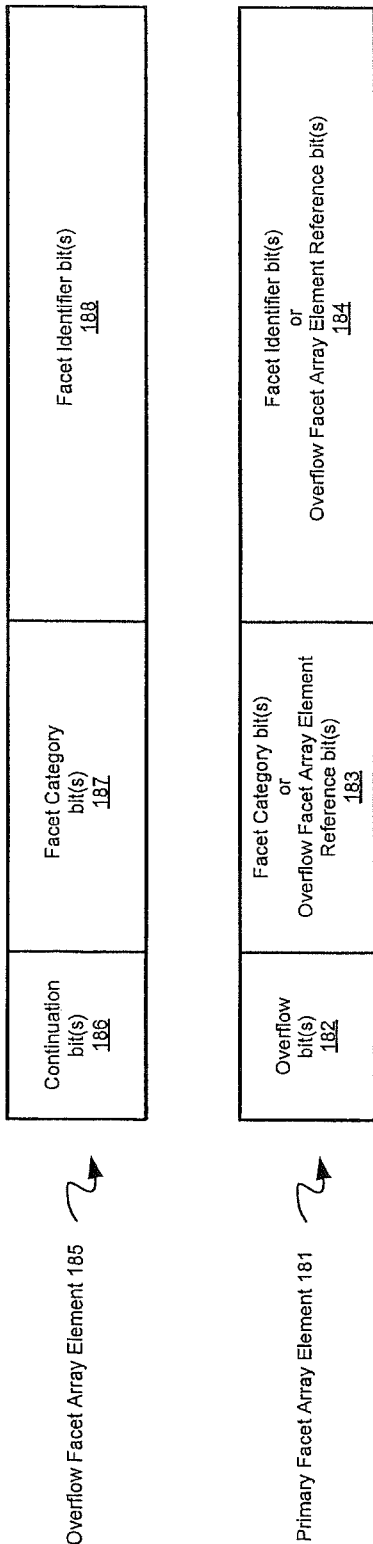
FIG. 1G shows a schematic diagram of a primary facet array element and an overflow facet array element, in accordance with one or more embodiments of the invention.
Figure 1H:
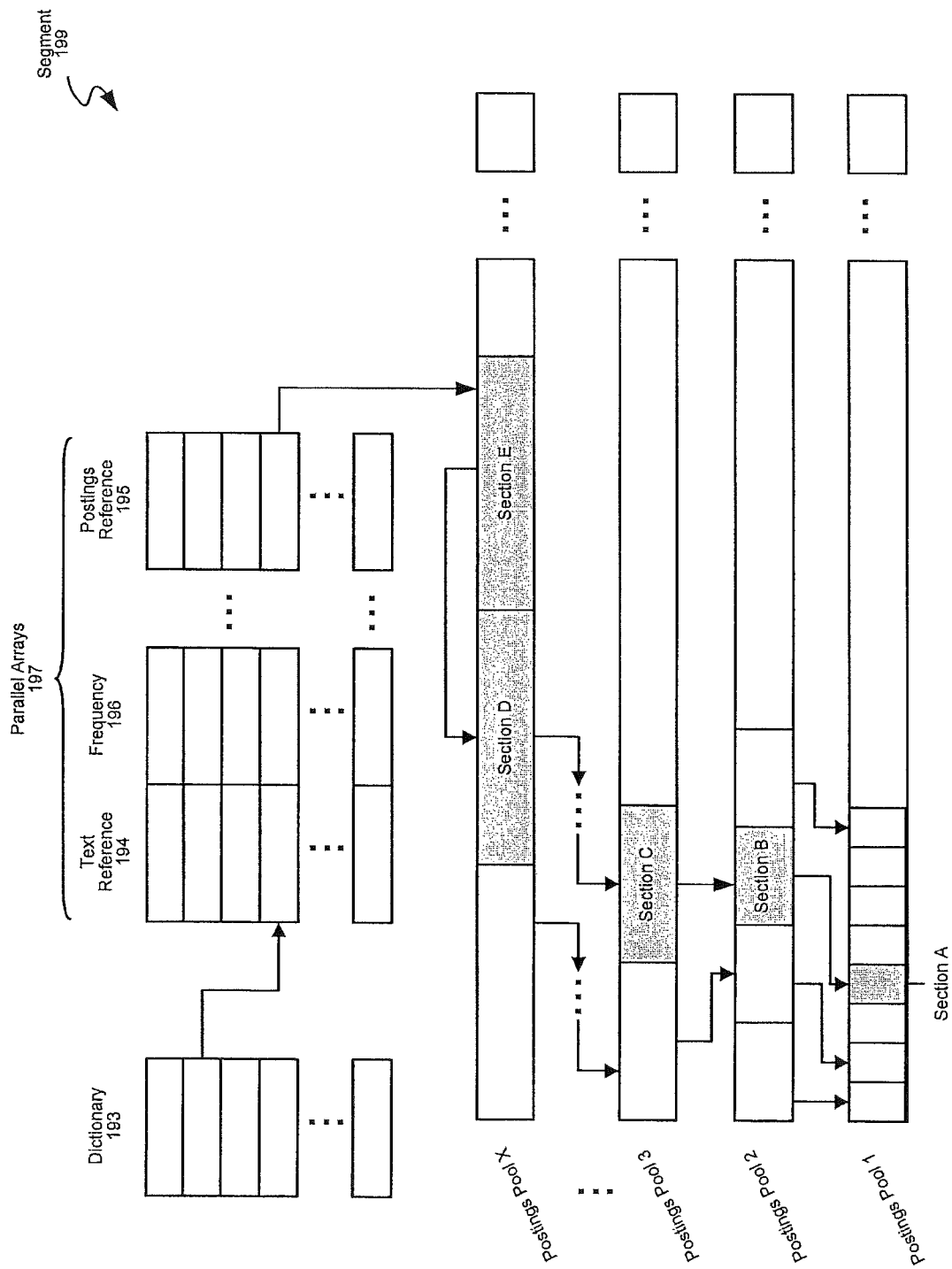
FIG. 1H shows an example of a segment, in accordance with one or more embodiments of the invention.

FIG. 1H shows an example of a segment (199) in accordance with one or more embodiments of the invention. As shown in FIG. 1H, the segment (199) can include a dictionary (193), one or more parallel arrays (197) (e.g., text reference (194), postings reference (195), frequency (196), etc.), and one or more postings pools (e.g., postings pools 1-X). Various components of the segment (199) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

In one or more embodiments of the invention, the postings pools include one or more sections of postings (e.g., sections A-N). Each postings pool may include a fixed section size. In one or more embodiments of the invention, the fixed section sizes of the postings pools increase with each subsequent postings pool (beginning with the lowest level postings pool, postings pool 1). The increase between adjacent postings pools may be either a fixed amount, an exponential amount, and/or customized based on performance/design/resource constraints. In the example of FIG. 1H, each section in postings pool 1 can store up to two postings. Thus, in this example, section A has a size of 2. Continuing the example, postings pool 2 has a section size of $2^4$ or 16, postings pool 3 has a section size of $2^7$ or 128, and postings pool X has a section size of $2^{11}$ or 2048. Any section size may be chosen and any number of postings pools may be utilized, in accordance with various embodiments of the invention. Each postings pool can include a maximum of 1 section for each term in the dictionary (193), with the exception of the last (i.e., highest level) postings pool (e.g., postings pool X). The last postings pool can include any number of sections for a single term in the dictionary (193).

In one or more embodiments of the invention, each section includes one or more postings. A posting includes a document identifier of a message of the messaging platform. The posting can further include a text position indicating a position of the term within the message. In one or more embodiments of the invention, each posting is a binary value having a sufficient number of bits to address document identifiers for the entire segment. In one or more embodiments of the invention, messages of the messaging platform are limited by a maximum character count. For example, the messaging platform may require that all messages be less than 140 characters in length. In this case, the text position portion of the binary posting value must be of sufficient length to store the position of every possible term in the message. In one example, each posting is a 32 bit binary value with a 24 bit document identifier portion and an 8 bit text position portion. In this example, the maximum number of document identifiers that each segment can store is 16,777,216 (i.e., $2^{24}$).

In one or more embodiments of the invention, the postings may be implemented as a fixed length binary value (discussed above) or may utilize delta encoding. Delta encoding involves storing only the delta (i.e., difference) between a given document identifier and a previous document identifier in the postings list. Delta encoding may reduce the storage requirements of the postings list by reducing the size of individual postings. However, in one or more embodiments of the invention, by utilizing fixed length encoding, the real-time search engine can be configured to traverse the postings list in backward order, forward order, and/or from any starting point. Thus, the real-time search engine can be configured to utilize fixed length encoding of the entire document identifiers to traverse the postings pools in reverse chronological order (i.e., latest additions searched first). In other words, using fixed length encoding, the real-time search engine can be especially configured for real-time search functionality (i.e., using timeliness as a search factor).

In one or more embodiments of the invention, the dictionary (193) is a data repository (e.g., a database management system, a database table, a storage service, a flat file, a collection of data structures, an object) storing a set of all unique terms included in the messages of the message repository. The dictionary (193) can further include one or more unique identifiers of content included within or referenced by one or more messages. Examples of content referenced by the dictionary can include, but are not limited to, images, videos, URLs (e.g., all URLs and/or category/topic specific URLs such as news, entertainment, sports, politics, etc.), and any other type of content embedded, referenced, and/or associated with a message. For example, the dictionary can include a unique alphanumeric identifier of an image which is included in multiple messages in the message repository. In this way, the dictionary can index content associated with messages in order to enable content-specific search functionality. In another example, the dictionary stores an identifier of each URL referenced by at least one message. Thus, entries in the dictionary (193) can include textual terms as well as any other formats referencing identifiable content. In one or more embodiments of the invention, the dictionary (193), parallel arrays (197), and postings pools are populated by one or more per segment background writer threads.

In one or more embodiments of the invention, the writer thread of each partition includes functionality to identify one or more terms within the message. The writer thread may then identify some or all of the terms in the dictionary (193).

If a term does not exist in the dictionary (193), the writer thread may be configured to add it to the dictionary (193). The writer thread may then add a posting including a document identifier of the message to one of the postings pools and may reference the posting by the dictionary entry and/or one or more of the parallel arrays (197). The writer thread can be configured to add the posting to the lowest level non-full section corresponding to the dictionary term. In other words, the writer thread first checks postings pool 1 for a section corresponding to the term. If a section does not exist for the term, the writer thread adds the section to postings pool 1 and then adds the new posting to that section. If a section does exist, the writer thread checks to see if the section is full. If the section is not full, the writer thread adds the new posting to the section. If the writer thread determines that the section is full, the new posting is added to the next lowest level postings pool with a non-full section (or no section). Upon reaching the last postings pool (i.e., postings pool X in FIG. 1H), new (i.e., higher level) sections are allocated within the same postings pool (e.g., sections D and E of postings pool X in FIG. 1H).

In one or more embodiments of the invention, each of the postings pools is implemented as one or more blocks which are fixed-size dynamically allocated objects in heap memory. Each block is a collection of sections of the corresponding postings pool. For example, blocks in a lower-level postings pool may include a larger number of sections (due to the smaller section sizes) than blocks in a higher-level postings pool. In this way, the number of dynamic memory allocations do not increase linearly with the number of postings added to the postings list. The fixed size of blocks can vary between different postings pools, in accordance with various embodiments. The parallel arrays may be implemented as any structure or object type (not necessarily an "array" type) referenced by entries in the postings reference (195). By utilizing a single object (or a fixed number of objects) for each of the postings pools, it may be possible to reduce the overhead associated with garbage collection functionality of some runtime systems.

In one or more embodiments of the invention, the parallel arrays (197) are each a fixed number of allocated objects in heap memory. In other words, new objects are not dynamically allocated as the size of the parallel arrays (197) grows. For example, each parallel array can be implemented as an integer array of a predefined size. The parallel arrays may be implemented as any structure or object type (not necessarily an "array" type) referencing entries in the dictionary (193). By utilizing a single object (or a fixed number of objects) for each of the parallel arrays (197), it may be possible to reduce the overhead associated with garbage collection functionality of some runtime systems.

In one or more embodiments of the invention, the dictionary is implemented as a hash table such that each entry in the dictionary is a hash bucket. Terms can then be hashed, using a predefined hash function, to a bucket in the dictionary.

In one or more embodiments of the invention, the text reference array (194) includes, for each entry in the dictionary, one or more references (e.g., pointers) to a data structure (e.g., a byte array, not shown) representing the actual term. The real-time search engine can be configured to utilize the text reference array (194) to efficiently identify the representation of the term in the byte array. In this way, the text reference array (194) can be used to resolve hash collisions. For example, if the two terms "text" and "foo" hash to the same dictionary entry, the second term "foo" can be rehashed to a different entry when writing to the dictionary.

Upon receiving a request to read the term "foo", the real-time search engine can first hash the term to the first dictionary entry. In this example, the real-time search engine reads identifies a portion of a byte array corresponding to that entry and reads the term "text" from the byte array. The real-time search engine determines that a hash collision has occurred (based on the byte array not containing the requested term, "foo") and then rehashes the term to the second dictionary entry. The real-time search engine determines that the second dictionary entry is correct based on the portion of the byte array corresponding to that entry containing the text "foo". In one or more embodiments of the invention, the text reference array (194) may be implemented as any type of data structure configured to store representations of terms. Since the terms of the dictionary may represent images, links, hashtags, and/or any other type of searchable element or attribute, the data structure corresponding to the text reference array (194) may likewise store various different types or representations of those elements in memory, in accordance with various embodiments of the invention.

In one or more embodiments of the invention, the postings reference array (195) includes, for each term in the dictionary (193), a single reference to the highest level section corresponding to the term in the postings pools (e.g., in postings pool X of FIG. 1H). In one or more embodiments of the invention, the frequency array (196) identifies, for each term, a number of messages containing the term.

In one or more embodiments of the invention, one or more of the components of the segment (199) resides entirely within primary storage (e.g., random access memory) for lower latency. For example, the dictionary (193), one or more of the parallel arrays (197), and/or one or more of the postings pools may reside entirely within primary storage. Alternatively, in one or more embodiments of the invention, one or more of the older segments (i.e., segments storing older time slices) of a partition may reside, either partially or entirely, within secondary storage (e.g., a hard disk drive, a solid state drive, etc.). Thus, for example, a predefined number of the newest segments (i.e., segments storing the most recent time slices) may reside within primary storage, while any older segments reside within secondary storage or a combination of primary and secondary storage (e.g., virtual memory).

Returning to FIG. 1C, in one or more embodiments of the invention, the real-time search engine (192) includes functionality to search one or more of the segments to identify document identifiers of messages based on one or more search terms. The real-time search engine (192) can be configured to identify a predefined number of matching document identifiers for each search query. Thus, in one example, if the search terms are extremely prevalent, the real-time search engine (192) can identify the first 10,000 document identifiers for analysis. In one or more embodiments, the real-time search engine (192) is configured to identify a predefined number of matching document identifiers without relevance scoring. Thus, for example, the real-time search engine (192) can be configured to identify a first X number of most-recent messages containing the search term(s) and to return the X messages in response to a search request. Identification of the matching document identifiers can be based on any search syntax, in accordance with various embodiments of the invention. For example, the terms "pink elephant" (including quotations) can require the entire phrase to be present, while the same terms without the quotations can require the separate terms to exist anywhere within the same message.

In one or more embodiments of the invention, the real-time search engine (192) includes functionality to calculate a relevance score for each of the identified document identifiers. The relevance score can be calculated using a mathematical formula including one or more factors. In one or more embodiments of the invention, the real-time search engine (192) uses the following mathematical formula, or a variant thereof, to calculate one or more relevance scores:

$$\text{score}(t) = \Sigma L_t * \Pi B_t,$$

where t is the document identifier, where $L_t$ is a set of linear weights associated with the document identifier, and where $B_t$ is a set of non-linear weights associated with the document identifier.

In one or more embodiments of the invention, the real-time search engine (192) uses any combination of one or more of the following factors as linear and/or non-linear factors in the mathematical formula:

a) age of the message
b) frequency of the matched term(s) in the message
c) density of the term(s) in the message—In one or more embodiments of the invention, this is represented as a fraction of the matched characters divided by the total character count of the message.
d) account reputation value—In one or more embodiments of the invention, this is represented as a numerical value calculated based on a number of references of the account by messages within a predefined time period. For example, an increase in mentions of the account and interactions with the account would increase the account's reputation value.
e) rebroadcast count—This is a number of times the message has been rebroadcasted by other users of the messaging platform.
f) favorite count—This is a number of times the message has been selected as a favorite (or other positive association) by other users of the messaging platform.
g) reply count—This is a number of times the message has been replied to by other users of the messaging platform.
h) has URL flag—This is a binary flag indicating whether the message includes a uniform resource locator (URL).
i) is reply flag—This is a binary flag indicating whether the message is a reply to another message.
j) is rebroadcast flag—This is a binary flag indicating whether the message is a rebroadcast of another message.
k) offensive flag—This is a binary flag indicating whether the message has been identified as containing one or more terms from a blacklist of offensive terms.
l) is from verified account flag—This is a binary flag indicating whether the message is from a verified account identified in a whitelist of verified accounts.
m) account spam flag—This is a binary flag indicating whether the message has been identified as potentially containing spam (e.g., unsolicited advertisements or content).
n) account NSFW flag—This is a binary flag indicating whether the account has been identified as linking (in one or more messages) to websites in a blacklist of potentially offensive sites (e.g., pornography, gore, explicit material, etc.)
o) account bot flag—This is a binary flag indicating whether the account broadcasting the message has been identified as potentially being operated by a software application (i.e.; the message was generated by software and not a human being).
p) has media URL—This is a binary flag indicating whether the message has been identified as containing a media URL (e.g., image, video, sound).
q) has news URL—This is a binary flag indicating whether the message has been identified as containing a news related URL (e.g., a URL referencing a domain included in a predefined or dynamically updated list of news related domains).
r) OON (out of network) reply flag—This is a binary flag indicating whether the message is a reply from an account which the searching account (i.e., the account of a user requesting the search) does not follow.
s) interestingness score—This is the ratio between the number of rebroadcasts of the given message and the average number of rebroadcasts from messages of the account.
t) text score—an estimation of the quality of the text in the message based on words lengths, punctuation, and/or other heuristics.
u) multiple hashtags or trends flag—This is a binary flag indicating whether the message has been identified as containing multiple hashtags or trends. A hashtag is a keyword prefixed by a hash character (or some other designating character). The keyword is designed to allow searching, aggregation, tagging, and/or filtering of related messages. A trend can be similarly identifiable (or can itself be a hashtag). A trend can be a keyword which exceeds a predefined threshold of occurrence within messages broadcasted in a given time window.
v) has trend—This is a binary flag indicating whether the message has been identified as containing a topic that was trending at the time the message was broadcasted.
w) is self message—This is a binary flag indicating whether the message was broadcasted by the searching entity (i.e., the message was broadcasted by the account from which the search originates).
x) is trusted—This is a binary flag indicating whether the message comes from the trusted network of the account broadcasting the message. In one or more embodiments of the invention, each account has a trusted network which is identified by one or more background processes of the partition. The trusted network may be identified by calculating a connection rank for each account in a list of accounts closely related (i.e., within a predefined number of degrees separation in the connection graph) to the broadcasting account. The connection rank may be based on a number of references of the account by messages within a predefined time period. The connection may further be based on any other association between the broadcasting account and the closely related account.
y) is follow—This is a binary flag indicating whether the message was broadcasted by a follower of the searching account.

Both the linear and non-linear weights may be weighted by a multiplier. For example, the real-time search engine (192) can use the age of the message as a non-linear factor to prioritize newer messages. Thus, in this example, given the age of the message (A), the non-linear weight used by the real-time search engine can be (1/A) or (1/A^2). In another example, the real-time search engine can use the mathematical formula $$\text{score}(t) = (L_d + L_r + L_f + L_a)(N_{aw} * N_d),$$

where $L_d$ is the density of the search terms and is equal to the ratio of matched terms to the total message size, where $L_r$ is an account reputation value and is equal to the number of unique mentions of the account within the past 60 seconds (with a ceiling of 10), where $L_f$ is the frequency of the search terms and is equal to the number of matches of the search term within the message, where $L_a$ is the linear aging factor and is equal to (1/message_age_in_seconds^1.5), where $N_{aw}$ is the non-linear aging factor which varies based on a context data item identified among the search terms by the real-time search engine, and where $N_d$ is the top messages factor and is equal to 10 if the message has been rebroadcasted more than 5 times and is otherwise equal to 1. In one or more embodiments of the invention, the real-time search engine (192) can be configured to use any combination of the above factors (a-y) as linear and/or non-linear factors in calculating one or more relevance scores.

In one or more embodiments of the invention, the real-time search engine (192) includes functionality to rank the document identifiers in order of the calculated relevance scores. The real-time search engine (192) can be configured to select a predefined number of the highest ranked document identifiers for returning to the search fanout module (115). Thus, the search fanout module (115) can be configured to receive sets of matching document identifiers from any number of partitions.

In one or more embodiments of the invention, the real-time search engine (192) is a software application or a set of related software applications configured to execute on one or more hardware processors. The real-time search engine (192) can include one or more reader threads configured to perform multiple concurrent searches of the partition (150). The real-time search engine (192) can be a component of a service-oriented architecture (SOA) application and can be configured to facilitate communication between the partition (150) and one or more other components of the messaging platform (100). In one or more embodiments of the invention, one or more components of the real-time search engine (192) reside in cloud computing application in a network distributed system. In one or more embodiments of the invention, the real-time search engine (192) is integrated within or operatively connected to one or more other components of the messaging platform (100).

FIG. 2 shows an example of an inverted message index (299) in accordance with one or more embodiments of the invention. As shown in FIG. 2, the inverted message index (299) can include a message table (200), a dictionary (205), and a postings list (210). The postings list may be implemented as a linked list, an array, an object, and/or any number of other data structures, in accordance with various embodiments of the invention.

In one or more embodiments of the invention, the message table (200) is a data repository (e.g., a database management system, a database table, a storage service, a flat file, a collection of data structures, an object) storing one or more messages. Each message includes a unique identifier (i.e., a document identifier) depicted in the left column of the message table (200).

In one or more embodiments of the invention, the dictionary (205) is a data repository (e.g., a database management system, a database table, a storage service, a flat file, a collection of data structures, an object) storing a set of all unique terms included in the messages of the message table (200). Though not shown in the example of FIG. 2, the dictionary (205) can further include one or more unique identifiers of content included within or referenced by a message in the message table (200). For example, the dictionary can include a unique alphanumeric identifier of a photograph which is included in multiple messages in the message table (200). In this way, the dictionary can index content associated with messages in order to enable content-specific search functionality. In one or more embodiments of the invention, the dictionary (193) of FIG. 1H or 11 includes similar functionality.

Figure 11:
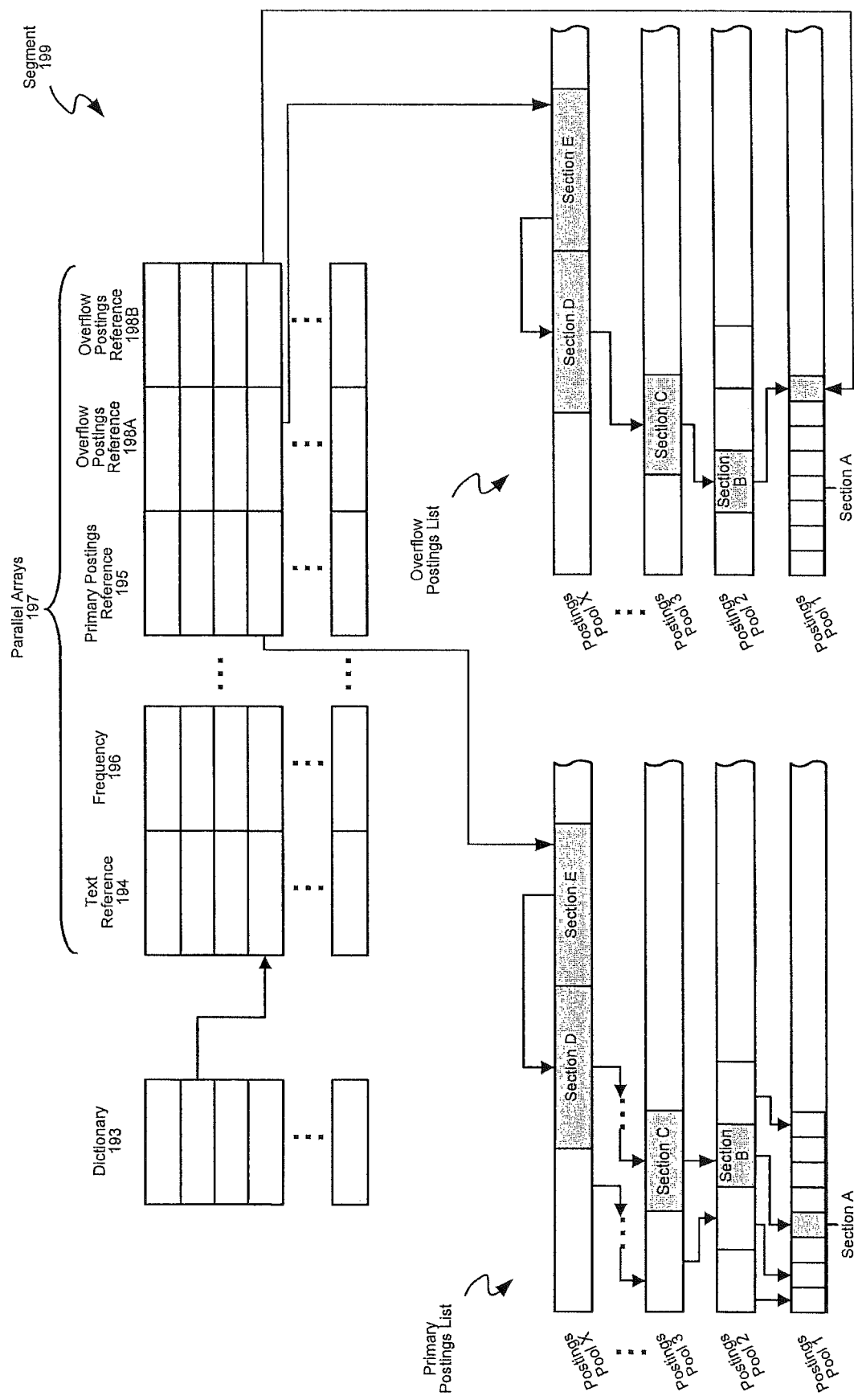
FIG. 11 shows an example of a segment, in accordance with one or more embodiments of the invention.

In one or more embodiments of the invention, the postings list (210) is a data repository (e.g., a database management system, a database table, a storage service, a flat file, a collection of data structures, an object) storing one or more references to messages in the message table (200) for each term in the dictionary. In one or more embodiments of the invention, the postings list (210) includes an ordered list of references for each term in the dictionary (205). The list may be ordered chronologically, in the order in which the relevant messages were broadcasted by a messaging platform. Any other order (or no order) may be maintained for elements in the postings list (210), in accordance with various embodiments of the invention. The postings pools of FIG. 1H or 11 are an example of a postings list, in accordance with various embodiments of the invention.

Returning to FIG. 1A, in one or more embodiments of the invention, one or more of the data repositories (message repository (140), connection graph repository (142), stream repository (144), and account repository (146)) is a database and/or storage service residing on one or more servers. For example, one or more of the data repositories may be implemented as a storage service using service-oriented architecture (SOA) and configured to receive requests for data and to provide requested data to other components of the messaging platform (100). In another example, the message repository (140) can include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application can be used, in accordance with various embodiments of the invention.

In one or more embodiments of the invention, one or more of the data repositories (message repository (140), connection graph repository (142), stream repository (144), and account repository (146)) is a separate application or set of applications residing on one or more servers external (and communicatively coupled) to the messaging platform (100). Alternatively, in one or more embodiments of the invention, one or more of the data repositories can be an integrated component of the messaging platform (100) and/or can reside, either partially or entirely, on one or more common hardware devices (e.g., a server).

In one or more embodiments of the invention, the routing module (125) includes functionality to receive one or more messages and to store the messages in the message repository (140). The routing module (125) can be configured to assign an identifier to the message and to notify the graph fanout module (106) of a sender of the message.

In one or more embodiments of the invention, the routing module (125) includes functionality to select a partition of the partitions (120) for indexing one or more new messages. In other words, the routing module (125) can be configured to perform load balancing among the partitions (120) by allocating messages or blocks of messages to specific partitions in the set of partitions (120). The routing module (125) can be configured to use a mathematical function (e.g., a hash function) to select the partitions either randomly or based on a load balancing algorithm. The routing module (125) can be configured to assign a document identifier to each new message and to use the document identifier as an input to the mathematical function. In one or more embodiments of the invention, the load balancing functionality of the routing module (125) is performed by the set of partitions (120).

In one or more embodiments of the invention, the graph fanout module (106) includes functionality to retrieve graph data from the connection graph repository (142) and to use the graph data to determine which accounts in the messaging platform (100) should receive the message. The graph data, for example, can reflect which accounts in the messaging platform are "following" a particular account and are, therefore, subscribed to receive status messages from the particular account.

In one or more embodiments of the invention, the delivery module (135) includes functionality to receive a list of accounts from the graph fanout module (106) and the message identifier generated by the routing module (125) and to insert the message identifier into stream data associated with each identified account. The delivery module (135) can then store the message list in the stream repository (144). The stream data stored in the stream repository (144) can make up one or more streams associated with one or more accounts of the messaging platform (100). A stream may be a dynamic list of messages associated with one or more accounts or can reflect any arbitrary organization of messages that is advantageous for the user of an account.

In one or more embodiments of the invention, the frontend module (110) is a software application or a set of related software applications configured to communicate with external entities (e.g., the client (105)). The frontend module (110) can include the application programming interface (API) (112) and/or any number of other components used for communicating with entities outside of the messaging platform (100). The API (112) can include any number of specifications for making requests from and/or providing data to the messaging platform (100). For example, a function provided by the API (112) can provide search results to a requesting client (105).

In one or more embodiments of the invention, the frontend module (110) is configured to use one or more of the data repositories (the message repository (140), the connection graph repository (142), the stream repository (144), and/or the account repository (145)) to define streams for serving messages (i.e., stream data) to a user of the account on the messaging platform (100). A user can use any client (105) to receive the messages. For example, where the user uses a web-based client to access the messaging platform (100), the API (112) can be utilized to define one or more streams and/or to serve the stream data to the client for presentation to the user. Similarly, different forms of message delivery can be handled by different modules in the frontend module (110). In one or more embodiments of the invention, the user can specify particular receipt preferences which are implemented by the frontend module (110).

Figure 3A:
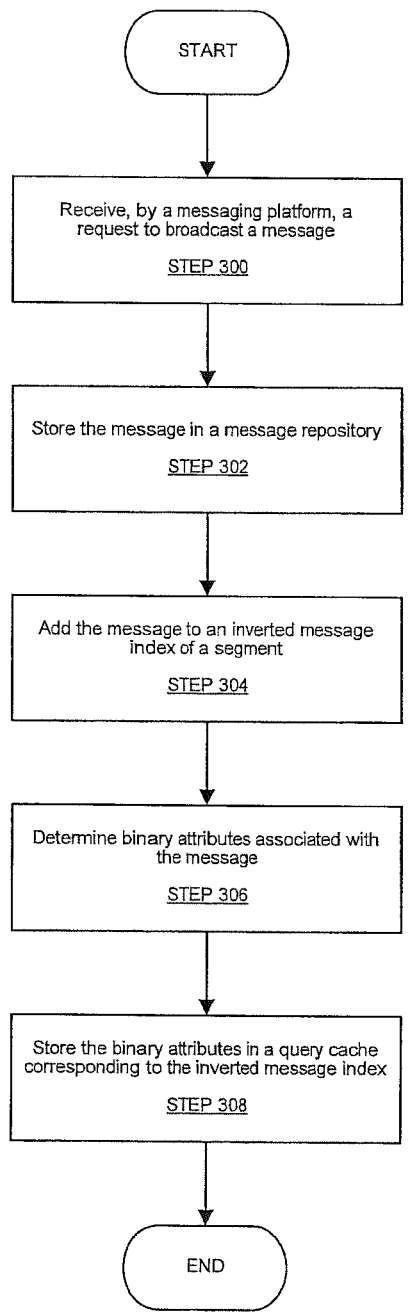
FIGS. 3A-3D show flowcharts in accordance with one or more embodiments of the invention.

FIG. 3A shows a flowchart of a method for populating an inverted message index. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 3A should not be construed as limiting the scope of the invention.

In STEP 300, a request to broadcast a message is received by a messaging platform. The request can be received by a frontend module (e.g., frontend module (110) of FIG. 1A, discussed above) and can be sent to a routing module for broadcasting as well as search indexing. The indexing and broadcasting of the request can occur concurrently or in any order, in accordance with various embodiments of the invention.

In STEP 302, the message is stored in a message repository. The message repository may be any storage configured to store broadcasted (or ready to broadcast) messages of the messaging platform. In one or more embodiments of the invention, STEP 302 can be performed after STEP 304 (or at any other point in the process).

In STEP 304, the message is added to an inverted message index of a segment. In one or more embodiments of the invention, FIG. 1H depicts an example of a segment having an inverted message index. The message can be parsed to identify individual tokens, terms, and/or content and can be indexed by populating a postings list (e.g., postings pools 1-X of FIG. 1H, discussed above) and associated data structures.

In STEP 306, binary attributes associated with the message are determined. Determining binary attributes can be performed by one or more background processes at one or more periodic and/or predefined times. Thus, while the message can be indexed and searchable, the binary attributes can be populated at a later time. In this way, in one or more embodiments of the invention, STEPS 306 and 308 are performed regularly (for the same messages) in order to maintain an updated query cache with attributes of the messages referenced by the inverted message index.

In STEP 308, the binary attributes are stored in a query cache corresponding to the inverted message index. Writing to the segment and/or query cache can be performed by a single writer thread of the partition and can occur without waiting or blocking on shared resources, in accordance with various embodiments of the invention.

Figure 3B:
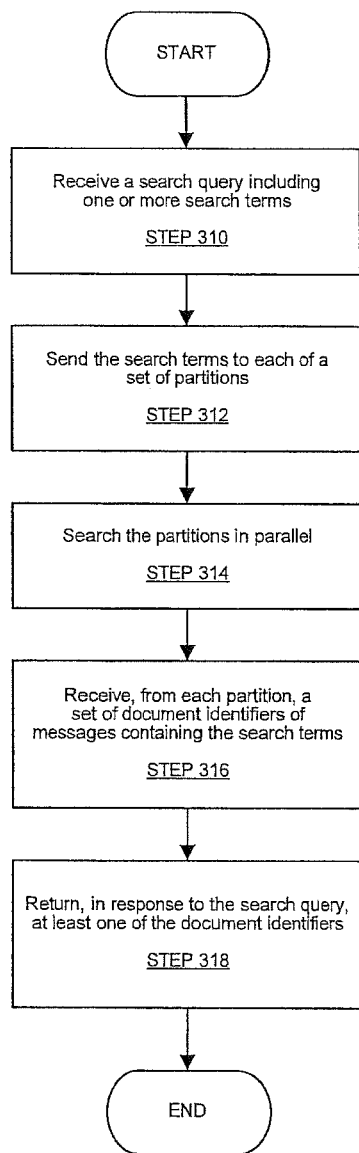

FIG. 3B shows a flowchart of a method for searching a messaging platform. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 3B should not be construed as limiting the scope of the invention.

In STEP 310, a search query having one or more search terms is received. The search query can be any request for searching messages of the messaging platform, and can be received from any entity and/or device. In STEP 312, the search terms are sent to each partition of a set of partitions. In this way, the search terms can be fanned out to the partitions for parallel searching.

In STEP 314, the partitions are searched in parallel. The partitions may each search until a predefined number of matches are found or until a predefined time threshold has elapsed (whichever comes first). In STEP 316, a set of document identifiers of messages containing the search terms is received from each partition. The partitions may also (either concurrently or after identifying the document identifiers of matching messages) calculate relevance scores for one or more of the identified document identifiers. The relevance scores can be received (with the corresponding messages) from any number of the partitions, in accordance with various embodiments of the invention.

In STEP 318, at least one of the document identifiers is returned in response to the search query. In one or more embodiments of the invention, after receiving a predefined number of responses and/or after all partitions have replied, a subset of the received document identifiers are selected. The subset can be selected based on having the highest relevance scores and/or any combination of other factors. In one or more embodiments of the invention, a search fanout module receives results from only some of the partitions which are searched (e.g., due to a delayed response, no matches found, etc.). In this case, the search fanout module can be configured to select document identifiers for responding to the search query from all responses received within a predefined time period and/or can ignore responses after a predefined number of document identifiers are received from one or more partitions.

Figure 3C:
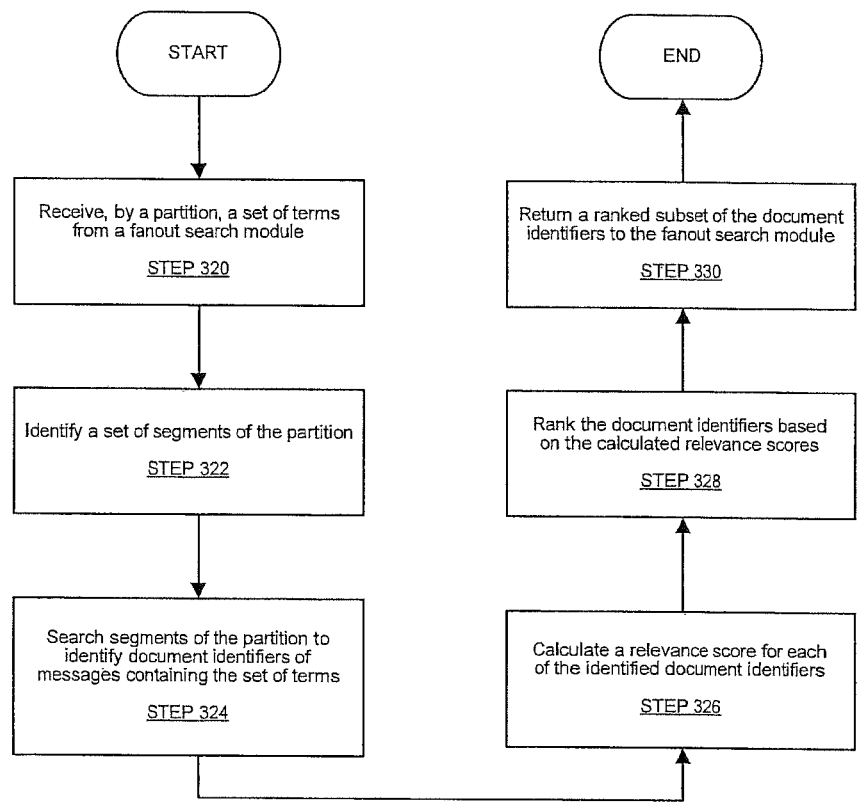

FIG. 3C shows a flowchart of a method for searching a messaging platform. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 3C should not be construed as limiting the scope of the invention.

In STEP 320, a set of terms is received, by a partition, from a search fanout module. In STEP 322, a set of segments of the partition is identified. Each segment may include an inverted message index or a portion of an inverted message index. The partition may receive the terms in a search request, and may be configured to search the set of segments for document identifiers of messages matching the one or more terms.

In STEP 324, the segments of the partition are searched to identify document identifiers of messages containing the set of terms. The search can be performed by any number of reader threads (e.g., threads of real-time search engine (192) of FIG. 1C, discussed above) configured to search the various segments of the partition. Each reader thread can identify one or more terms in a dictionary and then traverse a postings list to identify document identifiers of messages associated with (or including) the terms. Based on a syntax of the one or more terms, the reader thread(s) can be configured to perform one or more joins or other operations on intermediate result sets, in accordance with various embodiments of the invention. The search can be ended after a predefined time period and/or after a predefined number of matching results have been identified by the reader thread(s).

In STEP 326, a relevance score is calculated for each of the identified document identifiers. STEPS 324 and 326 can be performed concurrently, or in any order, in accordance with various embodiments of the invention. In STEP 328, the document identifiers are ranked based on the calculated relevance scores.

In STEP 330, a ranked subset of the document identifiers is returned to the search fanout module. The subset can be selected based on any number of criteria for reducing the size of the final result set sent by the partition (e.g., highest relevance scores, timeliness, etc.).

Figure 3D:
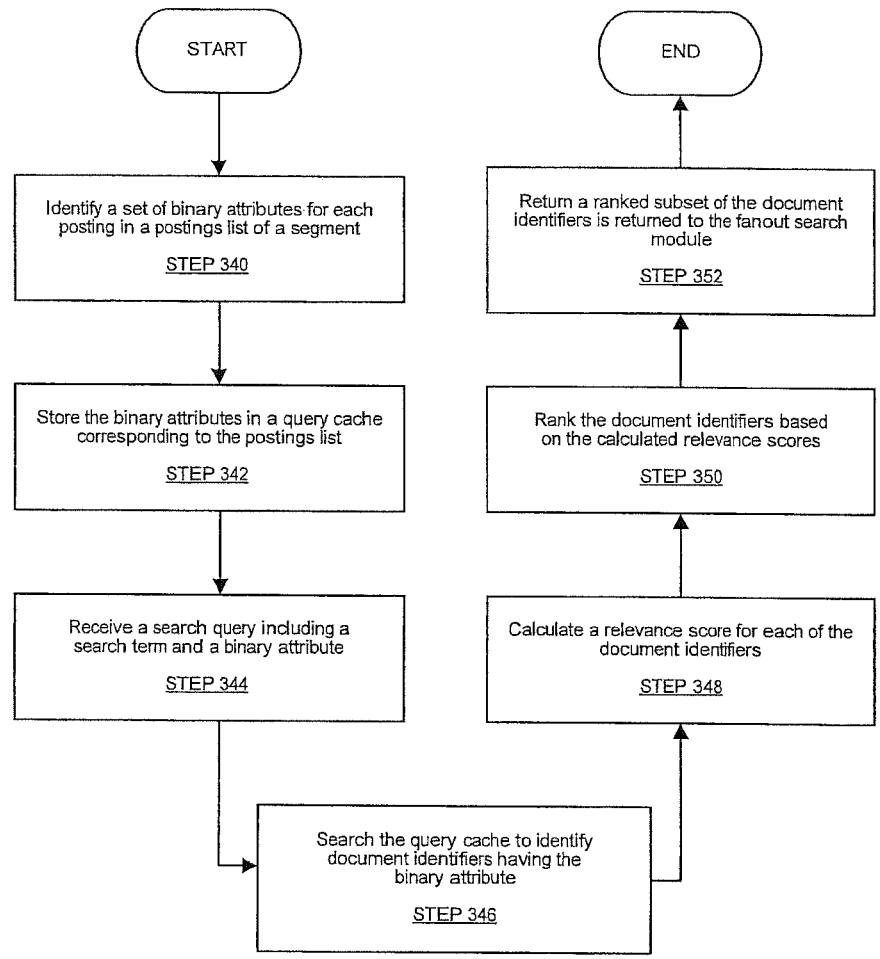

FIG. 3D shows a flowchart of a method for searching a messaging platform. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 3D should not be construed as limiting the scope of the invention.

In STEP 340, a set of binary attributes is identified for each posting in a postings list of a segment. In one or more embodiments of the invention, the binary attributes are determined by one or more background processes which follow a writer of a partition and update a query cache corresponding to newly written postings in a postings list. In STEP 342, the binary attributes are stored in a query cache corresponding to the postings list.

In STEP 344, a search query including a search term and a binary attribute is received. STEPS 340 and 342 can be performed continuously, periodically, concurrently with one or more of STEPS 344-352, and/or at any predefined time(s), in accordance with various embodiments of the invention.

In STEP 346, the query cache is searched to identify document identifiers having the binary attribute. In one or more embodiments of the invention, the query cache is searched to limit the number of messages which are analyzed for a match to the search terms, so that only entries having the binary attribute are analyzed. In other words, the query cache is searched to identify a subset of the postings list for analysis.

In STEP 348, a relevance score is calculated for each of the document identifiers. A mathematical formula including any number of predefined factors can be used to calculate the relevance scores. In STEP 350, the document identifiers are ranked based on the calculated relevance scores.

In STEP 352, a ranked subset of the document identifiers is returned to the search fanout module. The highest ranked scores can correspond to the best matching messages (according to one or more predefined metrics).

The following section describes various examples of the invention. The examples are included to aid in the understanding of the invention but are not intended to limit the scope of the invention.

FIGS. 4A-4F depict an example of a postings list in accordance with one or more embodiments of the invention. In this example, the postings list includes 4 postings pools in a single segment of a partition. Postings pool 1 has a fixed section size of $2^3$ (or 8), postings pool 2 has a fixed section size of $2^5$ (or 32), postings pool 3 has a fixed section size of $2^7$ (or 128), and postings pool 4 has a fixed section size of $2^9$ (or 512). The segment also includes a dictionary and a set of parallel arrays (not shown) associated with the postings pools.

Figure 4A:
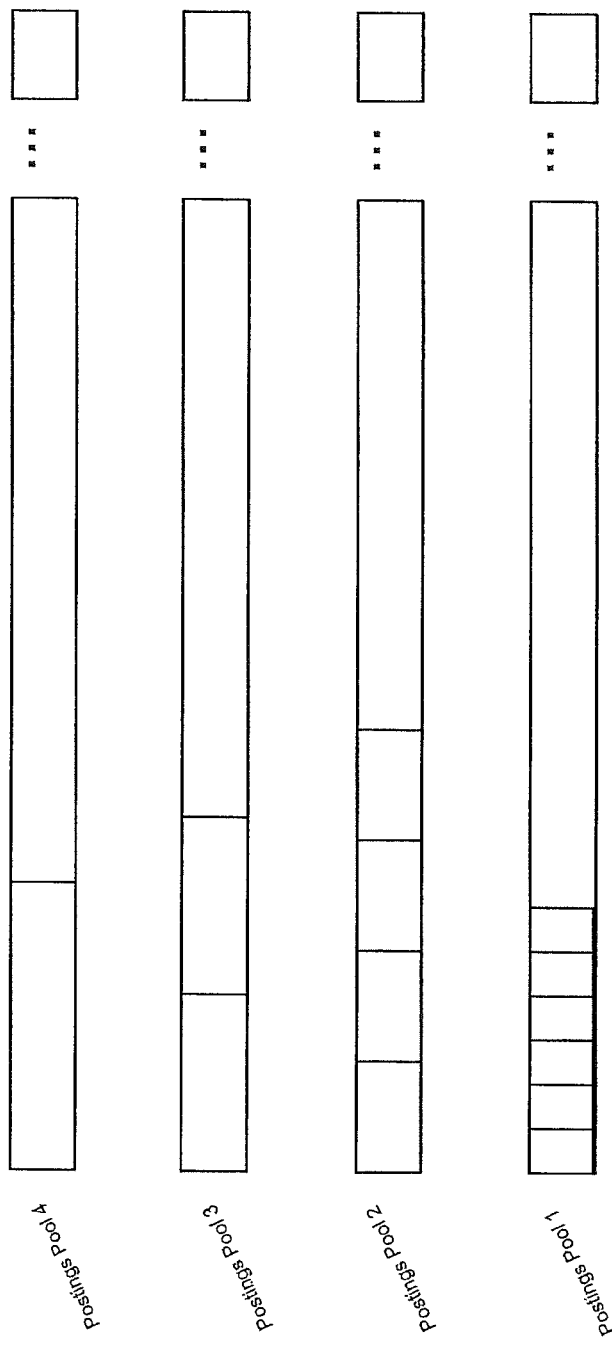
FIGS. 4A-4F show an example of a set of postings pools in accordance with one or more embodiments of the invention.

Continuing the example, initially, a writer thread begins populating the postings list with document identifiers of a current time slice of messages. At some point, the writer thread parses a message and identifies a term that does not yet exist in the dictionary. FIG. 4A depicts a state of the postings pools at this point in the example.

Figure 4B:
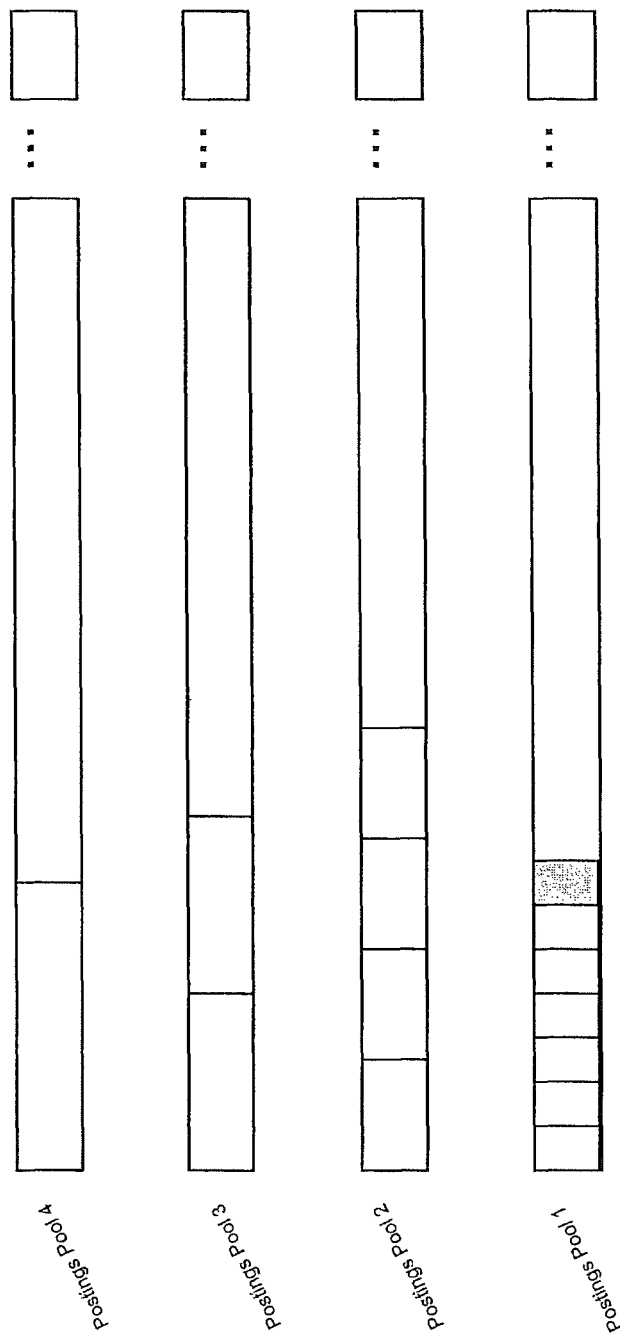
Figure 4C:
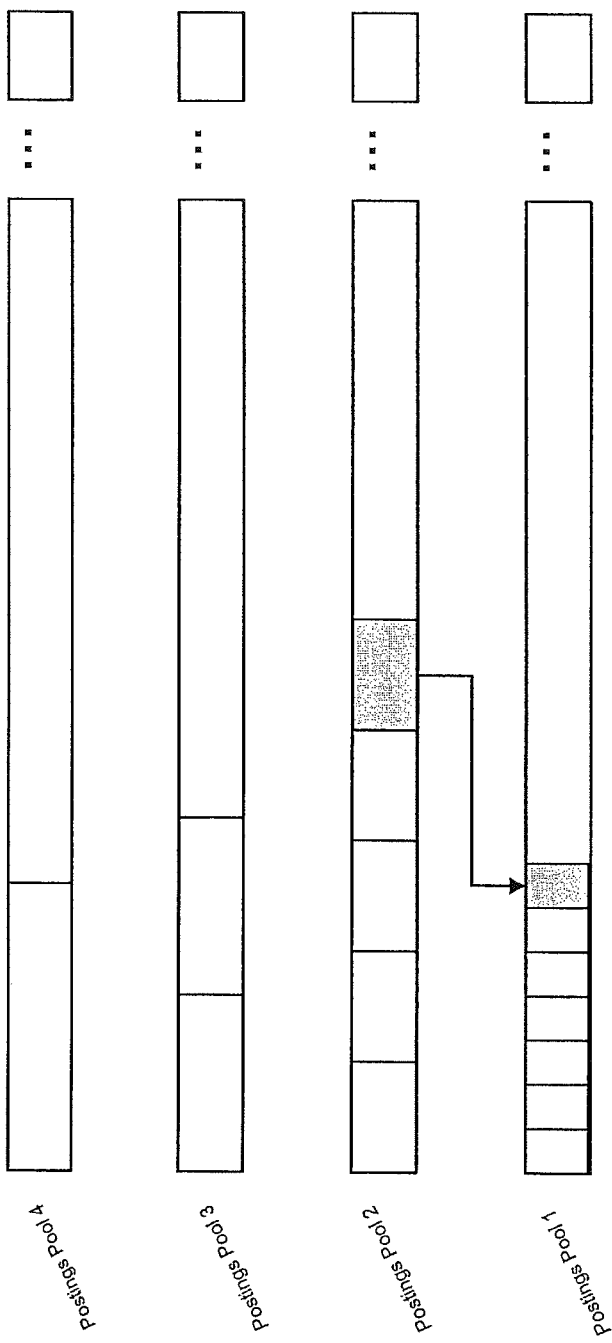
Figure 4D:
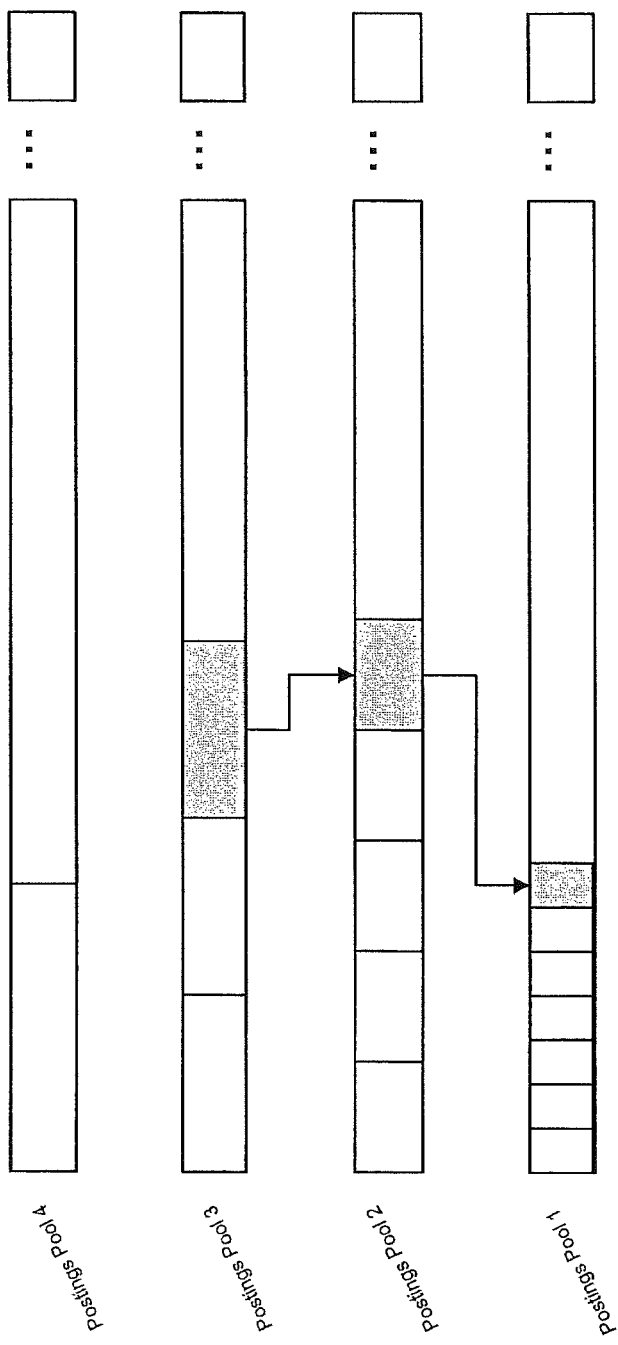
Figure 4E:
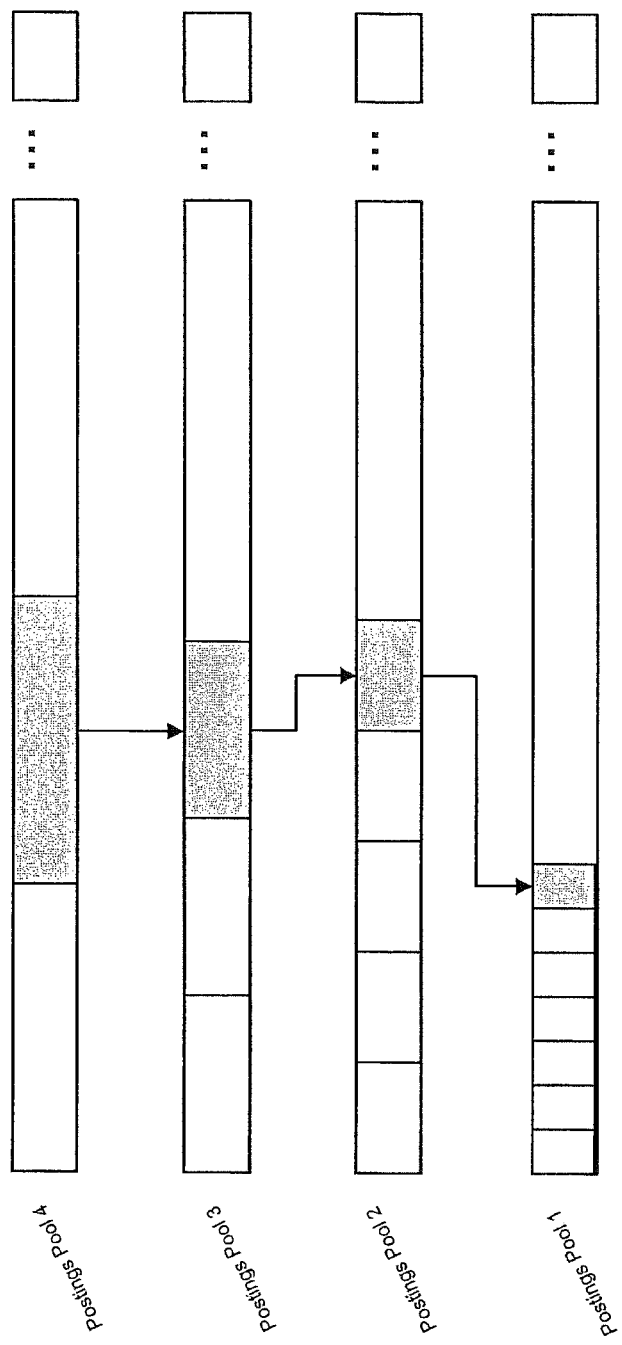

Continuing the example, the writer thread adds the new term to the dictionary and allocates a new section in the lowest level postings pool (i.e., postings pool 1) for the term. FIG. 4B depicts a state of the postings pools at this point in the example. As the writer thread continues writing the document identifiers of the current time slice, the term is identified within 7 more messages and the newly allocated section of postings pool 1 fills to capacity. When a $9^{th}$ message containing the term is encountered, the writer thread allocates a new section in the next lowest level postings pool not containing a section for the term (i.e., postings pool 2). The newly added section includes a reference to the next-lower section in postings pool 1. FIG. 4C depicts a state of the postings pools at this point in the example. Similarly, after the section in postings pool 2 reaches capacity (i.e., 128 postings), the writer thread creates a third section in postings pool 3 to store new document identifiers. Each section is an ordered list of document identifiers stored chronologically in their broadcast order. FIGS. 4D and 4E depict the addition of new sections until the highest level section (in postings pool 4) reaches capacity.

Figure 4F:
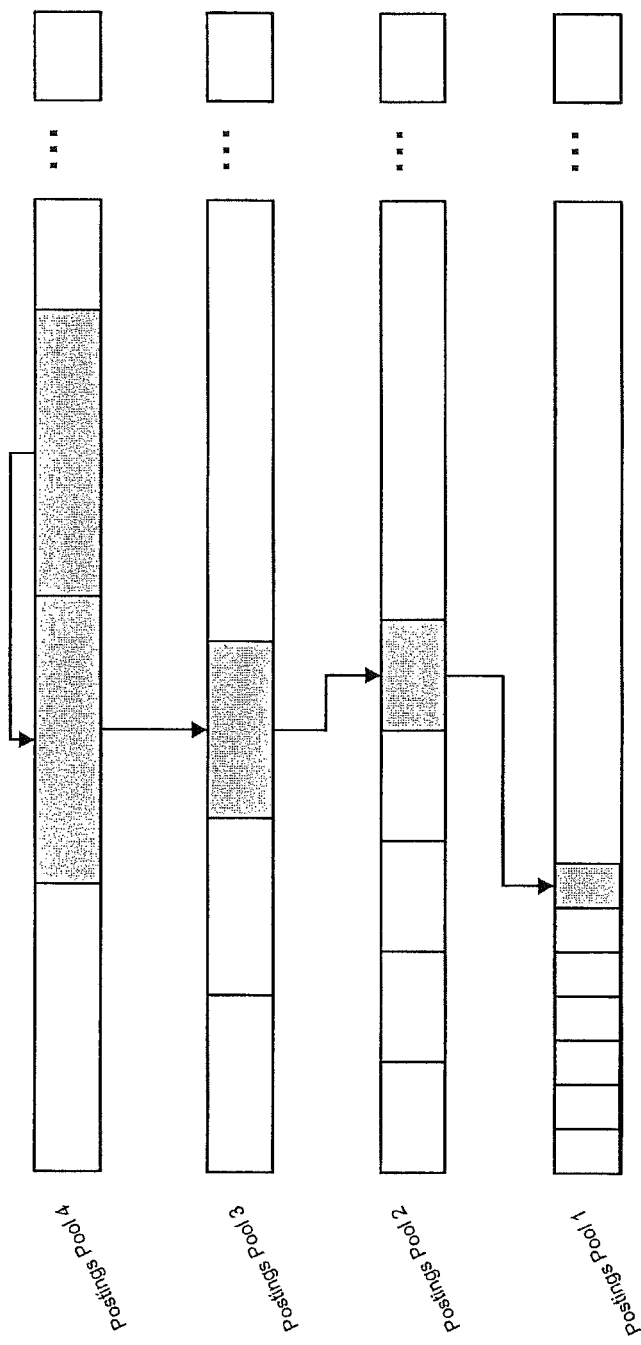

At this point in the example, upon encountering additional messages containing the term, the writer thread allocates a new section in the last postings pool (postings pool 4). FIG. 4F depicts a state of the postings pools at this point in the example. In this manner, any number of sections can be allocated to postings pool 4 for the given term.

Figure 5:
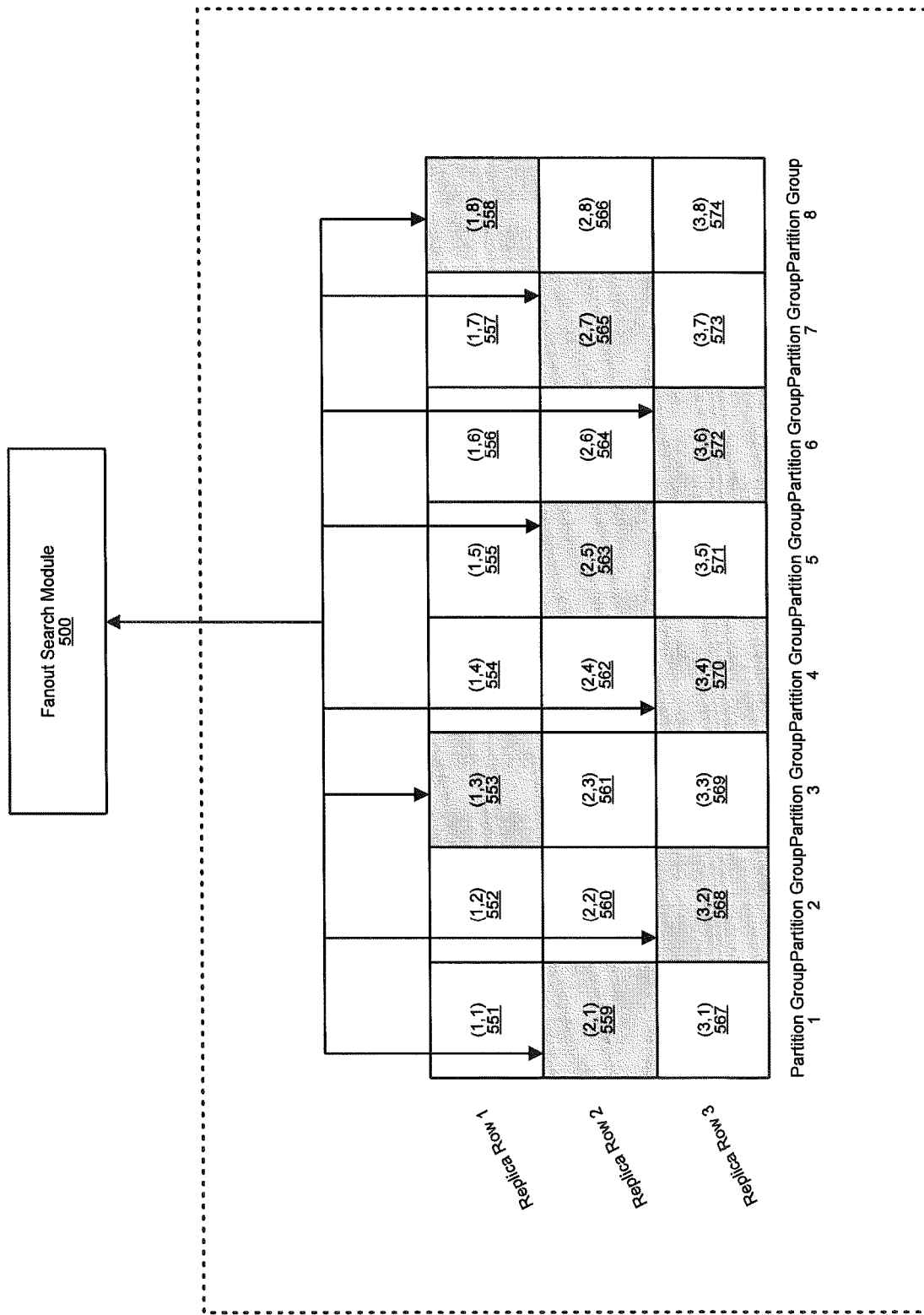
FIG. 5 shows an example schematic diagram of a system in accordance with one or more embodiments of the invention.

FIG. 5 depicts an example of a search fanout module (500) and a set of partitions (851-874) replicated across three replica rows. In this example, a search query containing multiple search terms is received by the search fanout module (500). The search fanout module (500) maintains a table depicting the current load (and state) of each of the partitions. Using the table, the search fanout module (500) selects a single partition from each partition group for handling the search query and forwards the terms to the selected partitions for parallel searching FIG. 5 depicts the selected partitions (559, 568, 553, 570, 563, 572, 565, and 558) in communication with the search fanout module (500).

Figure 6A:
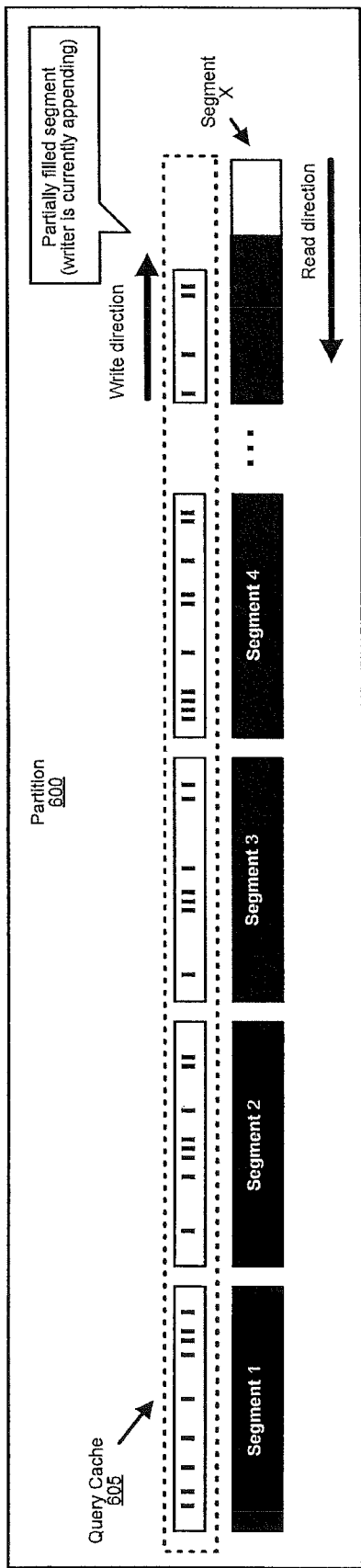
FIGS. 6A-6C show example schematic diagrams of a partition in accordance with one or more embodiments of the invention.
Figure 6B:
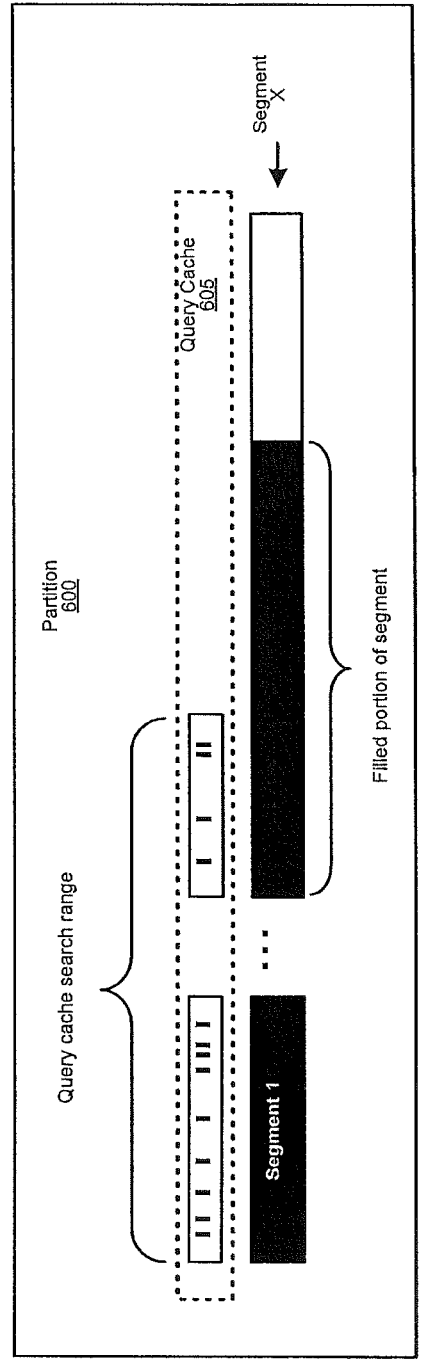
Figure 6C:
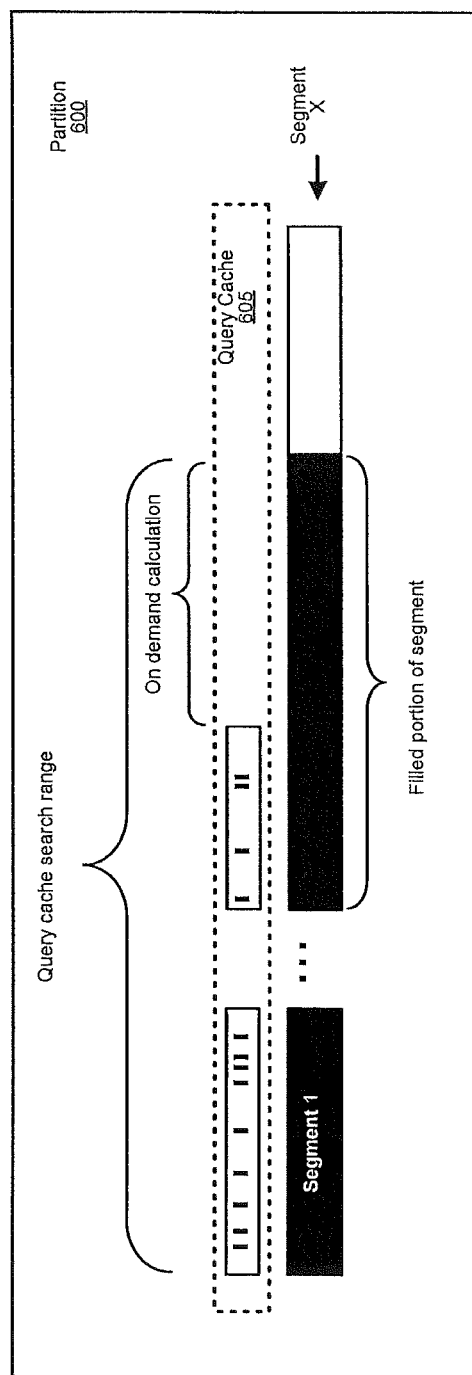

FIGS. 6A-6C depict an example of a partition (600) containing multiple segments and a query cache (605). In this example, a writer thread of the partition begins indexing a new time slice of messages to segment X. As the writer thread writes new document identifiers to a postings list of the segment, a background process follows the writer thread (with a slight lag) in order to populate query cache values for the newly written postings. FIGS. 6A and 6B depict a state of the partition (600) at this point in the example.

Continuing the example, a real-time search engine of the partition (600) receives a search request containing a search term and a binary attribute. In this example, the search term is the word "badminton" and the attribute designates that the searcher is requesting only messages containing an image. The real-time search engine initially identifies a last update identifier indicating a last update point of the query cache (605) as well as a last written document identifier designating a position of the single writer thread of the partition. Based on the last update point and the position of the writer thread at that time, the real-time search engine requests an on demand population of the query cache (605) up until the identified position of the writer thread. The background process populates the query cache (605) up until the requested point and the real-time search engine proceeds to search the query cache (605) in reverse chronological order (i.e., in reverse order of the write direction, see FIG. 6A) after the on demand population is complete. FIG. 6C depicts a state of the partition (600) at this point in the example.

Continuing the example, the real-time search engine searches the query cache (605) to identify entries matching the binary attribute (i.e., to identify messages containing images). When a matching query cache entry is found, the real-time search engine then proceeds to read the corresponding posting value in the segment to fetch the document identifier and to determine whether the corresponding message contains the term "badminton." After identifying 10,000 document identifiers of such messages, the partition (600) calculates relevance scores for each document identifier. The partition (600) then selects a subset of the 10,000 messages (e.g., 20 messages) with the highest relevance scores for inclusion in a result set, and returns the result set and the corresponding relevance scores to a search fanout module in response to the search request. The search fanout module aggregates result sets from multiple partitions and then proceeds to select the messages with the highest relevance scores for inclusion in a final result set which is returned to a requesting client.

Search Infrastructure with a Query Cache

In general, embodiments of the invention provide a method and system for search in any system including searchable documents (e.g., messages in a messaging platform, web pages, videos, and/or any other type of document that is searchable). In one or more embodiments, messages posted to a messaging platform are required to be within a maximum length (e.g., character count). In one or more embodiments, hyperlinks and non-textual content can be excluded from a maximum length determination of the message, in accordance with various embodiments. It should be appreciated that one or more embodiments of the invention are discussed with reference to messages in a messaging platform, but that one or more embodiments of the invention can include searchable documents in any platform. A search query including a search term is received from a client. The search term is sent to a set of partitions for parallel searching Each partition includes a query cache and at least one time slice of messages posted to the messaging platform. The partition searches the query cache in reverse chronological order of the time slice of messages by matching the search term to an attribute stored in the query cache. A result set is returned based on the search.

FIG. 1D shows a schematic diagram of a query cache (191) and a corresponding segment, in accordance with one or more embodiments of the invention. As shown in FIG. 1D, the query cache (191) can include one or more attribute arrays (e.g., attribute arrays 1-N), each including an entry corresponding to a posting in the associated segment. Various components of the query cache (191) can be located on the same device (e.g., a server, mainframe, desktop Personal Computer (PC), mobile computing device, and any other device) or can be located on separate devices connected by a network (e.g., a local area network (LAN), the Internet, etc.). Those skilled in the art will appreciate that there may be more than one of each separate component running on a device, as well as any combination of these components within a given embodiment of the invention.

In one or more embodiments of the invention, the query cache (191) includes one or more query cache attributes for each message of the time slice of messages. The attributes can be binary attributes and/or non-binary attributes. Examples of a non-binary attribute can include, but are not limited to, a 2-bit variable capable of storing 4 values, a 4-bit variable capable of storing 16 values, a character string, a message attribute, a message category, and any other characteristic, attribute, or term usable for purposes of search.

Examples of a binary attribute can include, but are not limited to, a top contributor flag, a top message flag, a spam flag, an includes image flag, an includes video flag, an includes news flag, an includes sports flag, an includes pornography flag, an includes antisocial user flag, an includes hyperlink flag, and any other characteristic, attribute, or term representable as a binary value. For example, a binary attribute can be implemented as a 1-bit variable capable of storing 2 values.

Binary and/or non-binary attributes can indicate certain characteristics of an associated message. For example, the top contributor flag can indicate whether a message was posted by a top contributor of the messaging platform, or the top message flag can indicate whether a message is classified as a top message of the messaging platform. In addition, the spam flag can indicate whether a message is classified as spam.

In another example, the includes image flag or includes video flag can indicate whether a message includes an image or video, respectively. The includes news flag, includes sports flag, or includes pornography flag can indicate whether a message includes news, sports, or pornography content, respectively.

In another example, the includes antisocial user flag can indicate whether a message was posted by an antisocial user of the messaging platform. The authoring account flag can indicate whether a message was posted by a specific account of the messaging platform. The includes hyperlink flag can indicate whether a message includes a hyperlink.

In the case of a non-binary attribute, multiple values for a certain flag can indicate more detailed characteristics. For example, different values for an antisocial user flag can indicate different degrees of how antisocial a user is. In another example, different values for an includes image flag can indicate different resolution levels of an included image. In yet another example, different values for an includes image flag can indicate how many images are included in the message. In another example, different values for an includes image flag can indicate whether an included image is hosted by a third-party service, is high-resolution, and is of a certain file type.

In one or more embodiments of the invention, an attribute represents a characteristic of one or more messages. In other words, for example, the query cache (191) can store a predefined, pre-calculated, or periodically calculated characteristic of each message. When a query or search request is made, the attribute independently and/or previously stored in the query cache (191) can then aid the query or search operation. In one or more embodiments of the invention, the attribute can represent a query-dependent or query-independent characteristic of a message.

The cache segments may be implemented as distinct objects or structures, and/or may simply refer to a logical portion of the query cache (191), in accordance with various embodiments of the invention. Referring to FIG. 1D, each attribute can be stored in the attribute arrays (e.g., attribute arrays 1-N). For example, the first column of each attribute array 1-N can correspond to the message P1, the second column of each attribute array 1-N can correspond to the message P2, and so on.

In one or more embodiments of the invention, the real-time search engine (192) includes functionality to receive a search request including one or more search terms. Examples of a search term can include, but are not limited to, one or more general search terms entered into a text box by a user of a client device (e.g., "Antarctica", "puppies", etc.), one or more binary search terms corresponding to a binary query cache attribute, one or more non-binary search terms corresponding to a non-binary query cache attribute, and/or any other term usable in identifying content and/or attributes of a message. Search terms can be generated by a user or can be added to a search request based on a context of the search (e.g., image search, video search, news search, originating client platform, etc.). The client (105), frontend module (110), and/or search fanout module (115) can be configured to add or modify a search term based on the context, in accordance with various embodiments.

In one or more embodiments of the invention, the real-time search engine (192) includes functionality to search the query cache in reverse chronological order of the time slice of messages. The real-time search engine can be configured to match one or more search terms (e.g., the binary search term "querycache_image" or the non-binary search term "querycache_credibilityrank=2", where the query cache classifies each message into one of three credibility rankings) to a value of one or more binary attributes and/or non-binary attributes of the query cache (191). In this way, the partition (150) can be configured to limit the search range of a given request to messages of a particular type (i.e., messages having the specified attribute(s)).

For example, referring to FIG. 1D, the real-time search engine (192) can search the messages of the segment based on the values stored by the attribute arrays 1-N in the query cache (191). More specifically, the real-time search engine (192) can search for matches of the one or more binary search terms and/or non-binary search terms with the values stored by the attribute arrays 1-N.

In one example, if the real-time search engine (192) searches the messages based on a binary search term associated with the binary attributes stored by attribute array 1, the real-time search engine (192) can search for matches in the attribute array 1 instead of the message content. If the binary search term indicates that messages with a binary attribute of "1" or "TRUE" are to be found, the real-time search engine (192) can identify the messages P1, P5, and P10 without searching their content since the associated binary attributes of the attribute array 1 for those messages include a value of "1". Accordingly, the real-time search engine (192) can avoid searching the messages P2, P3, P4, P6, P7, P8, and P11 because the associated binary attributes of the attribute array 1 for those messages do not include a value of "1". As a result, the search time can be reduced.

In one or more embodiments of the invention, the real-time search engine (192) includes functionality to search for a match of more than one search term with more than one attribute in the query cache (191). For example, the real-time search engine (192) can search for a match of a first binary search term associated with attribute array 1 and a second binary search term associated with attribute array 2. In this example, given that the binary search terms indicate that messages with a binary attribute of "1" or "TRUE" are to be found, the real-time search engine (192) identifies the message P5 without searching its content since the associated binary attributes of the attribute array 1 for that message include a value of "1". Accordingly, the real-time search engine (192) can avoid searching the messages P1-P4 and P6-P11 because the associated binary attributes of the attribute array 1 and attribute array 2 for those messages do not include a value of "1". As a result, the search time can be reduced. The real-time search engine (192) can be configured to generate a result set including document identifiers of at least a subset of the matching messages.

In one or more embodiments of the invention, the real-time search engine (192) includes functionality to execute a logical operation on values of at least two binary attributes to identify a subset of messages in the segment matching the binary attributes. The real-time search engine (192) can execute an "AND" or "OR" operation between binary attributes in the query cache (191) associated with a message. For example, an "AND" operation between binary attributes of the attribute array 1 and the attribute array 2 may result in an identification of the message P5 because that message is the only message with a value of "1" in both attribute arrays. In another example, an "OR" operation between binary attributes of the attribute array 1 and the attribute array 2 may result in an identification of the messages P1, P2, P5, P8, and P10 because those messages are the only messages with a value of "1" in any attribute arrays. The real-time search engine (192) can be configured to generate a result set including document identifiers of at least a subset of the matching messages.

In one or more embodiments of the invention, the real-time search engine (192) includes functionality to search for a match of one or more non-binary search terms with one or more associated non-binary attributes in the query cache (191). As discussed above, the value of a non-binary attribute can be selected from three or more predefined values (e.g., 2-bit variable capable of storing 4 values). The non-binary search term can specify one or more of these values in a search request. Accordingly, the real-time search engine (192) can search the non-binary attributes in the query cache (191) for matches with, for example, values of 0, 1, 2, and 3 instead of only values of 0 and 1. In one or more embodiments of the invention, the real-time search engine (192) treats any non-zero value as a "TRUE" value or effectively a "1" value and treats zero values as a "FALSE" or a "0". The real-time search engine (192) can be configured to generate a result set including document identifiers of at least a subset of matching messages.

In one or more embodiments of the invention, the real-time search engine (192) includes functionality to search the query cache in reverse chronological order of the time slice of messages. In other words, the real-time search engine (192) begins searching the most recent messages first and searches older messages as it continues to search. In one example, the real-time search engine (192) discontinues the search once a message corresponding to a predefined time threshold is reached (e.g., a message that is 7 days old). In another example, the real-time search engine (192) discontinues the search after identifying a predefined number of matching messages.

In one or more embodiments of the invention, the real-time search engine (192) includes functionality to identify a search term within each message of the subset of messages generated by searching the query cache (191). The search term can include, for example, a character string and/or an image. Because the content of only a subset of messages of the partition (150) are searched, the search time can be much less compared to the search time required for searching the content of all of the messages. In one or more embodiments of the invention, the real-time search engine (192) includes functionality to search the message content in parallel with searching the query cache (191) and generating the subset. For example, while the real-time search engine (192) is in the process of searching the query cache (191) attributes and generating the result set, the real-time search engine (192) can also search the content of the messages that have been already identified as having a matching query cache attribute.

In one or more embodiments of the invention, the real-time search engine (192) includes functionality to generate, based on searching the query cache, a result set including document identifiers of at least a subset of the time slice of messages. The subset can correspond to the messages with associated attributes that match the search terms, discussed above.

In one or more embodiments of the invention, the real-time search engine (192) includes functionality to calculate relevance scores for at least a portion of the time slice of messages with matching query cache attributes. The relevance score can be calculated based on any number of search relevance criteria. Examples of search relevance criteria can include, but are not limited to, timeliness of the message, frequency of a search term within the message, density of a search term within the message, credibility of an authoring account of the message, ranking of the message, grammatical quality of the message, number of rebroadcasts of the message, an association of the message with an originating account of the search request (e.g., a message/author attribute or category), and any other criteria that can be used to modify a relevance score of a message. In one example, the real-time search engine (192) calculates the relevance scores based on the posting time of a message or an existence and/or frequency of a non-binary search term within each message. The real-time search engine (192) can select messages for inclusion in the result set based on the calculated relevance scores (e.g., by selecting a predefined number of messages with the highest relevance scores).

In one or more embodiments of the invention, the real-time search engine (192) includes functionality to return the result set in response to the search request. For example, the real-time search engine (192) can return the result set to the search fanout module (115) in response to the search request.

In one or more embodiments of the invention, the query cache update engine (190) includes functionality to calculate an average search time latency for one or more non-binary search terms. For example, the query cache update engine (190) can calculate an average search time latency for the search term "election results". Further, the query cache update engine (190) can include functionality to determine whether the average search time latency exceeds a predefined threshold. For example, a search time latency threshold of 1 second may be predefined and the query cache update engine (190) can determine whether an average search time latency associated with the search term "election results" exceeds that threshold. In this example, the query cache update engine (190) periodically calculates the average search time latency of requests containing the search term over a predefined time window (e.g., 10 minutes).

In one or more embodiments of the invention, the query cache update engine (190) can include functionality to determine whether the average search time latency exceeds a dynamically updated threshold. For example, the dynamically updated threshold can be increased or decreased if the average search time latency of all or a portion of messages increases or decreases, respectively. In another example, the predefined threshold can be a percentage deviation from a historical average (or threshold) latency. In this way, in one or more embodiments, the query cache update engine (190) is configured to calculate the historical average latency (over a historical time window) and to determine whether a current average latency (e.g., of a more recent time window) exceeds the historical average latency by a predefined threshold percentage and/or amount.

In addition, the query cache update engine (190) can include functionality to dynamically add or remove one or more attributes to or from the query cache (191). The query cache update engine (190) can include functionality to add or remove one or more attributes in response to a determination that the average search time latency exceeds a predefined threshold (e.g., a fixed latency, a historical average latency, etc.), a determination that a frequency of a given search request exceeds a predefined threshold, a determination that a number of rebroadcasts of the message exceeds a predefined threshold, and any other criteria that can be used to add or remove attributes to or from the query cache (191) to decrease search time latency. Referring to the example of FIG. 1D, the query cache update engine (190) can be configured to add or remove one or more attribute arrays storing attributes corresponding to messages in the segment to or from the query cache (191). For example, a fourth attribute array (not shown) may be added or removed.

In one or more embodiments of the invention, the predefined thresholds discussed above can be either fixed or dynamically updated. The query cache update engine (190) or the search fanout module (115) can dynamically update one or more thresholds based on any number of criteria. For example, the query cache update engine (190) can be configured to calculate a dynamically updated threshold latency. In this example, the dynamically updated threshold latency is equal to a historical average search latency of a term over the past 24 hours increased by 50%. Thus, continuing the example, if the average search latency of search requests including the given term (e.g., over the current time window of 10 minutes) exceed the threshold latency, the query cache update engine (190) adds an attribute to the query cache. Examples of criteria for updating a threshold can include, but are not limited to, percentage deviation from a historical/average engagement metric, percentage deviation from a historical/average number of rebroadcasts, and/or any other criteria for determining a baseline threshold relevant to search. If it is determined that the threshold is exceeded, the query cache update engine (190) can be configured to add or remove one or more attributes from the query cache (191).

In one or more embodiments of the invention, the query cache update engine (190) or the search fanout module (115) can analyze the criteria based on a rolling window or moving average analysis of the messages posted to the messaging platform (100), partitions (120), and/or partition (150). The moving average can include a sample size or sample period analyzed at a fixed or dynamically updated interval. For example, the query cache update engine (190) or the search fanout module (115) can analyze a sample period of the last 10 minutes of posted messages, or the last 10,000 posted messages, at an interval of every 1 minute. In one example, the interval of analysis may be dynamically updated (e.g., based on a rate that messages are posted). In one or more embodiments of the invention, the query cache update engine (190) or the search fanout module (115) can calculate one or more thresholds based on a fixed or dynamically updated interval. For example, the query cache update engine (190) or the search fanout module (115) can analyze the last 10 minutes of posted messages every 10 minutes. In one example, the interval of analysis may be dynamically updated (e.g., based on a rate that messages are posted).

For example, if the query cache update engine (190) determines that the search time latency associated with the search term "election results" exceeds the predefined threshold, the query cache update engine (190) can dynamically add an attribute in the query cache (191), associated with each message, that indicates whether the message is associated with election results. As a result, searches for such messages will be faster with the aid of the query cache (191) because the content of each message will no longer need to be searched to identify matching messages. Instead, the real-time search engine (192) can quickly search the query cache (191) and identify a subset of messages involving such terms. The speed increase of such searches can be especially beneficial because the slow search times for such terms may be remedied or mitigated.

However, continuing the example, if the query cache update engine (190) determines that the search time latency associated with the search term "election results" no longer exceeds the threshold, the query cache update engine (190) can dynamically remove the corresponding attribute from the query cache (191). Accordingly, the query cache update engine (190) can remove, from the query cache (191), one or more attribute arrays storing attributes corresponding to messages in the segment. In one or more embodiments of the invention, the removal of attributes from the query cache (191) is not limited to attributes that were dynamically added to the query cache.

In one or more embodiments of the invention, the query cache update engine (190) includes functionality to dynamically add and/or remove one or more attributes to or from the query cache (191) in response to other determinations. For example, the query cache update engine (190) can dynamically add or remove one or more attributes in response to a determination that a frequency of search requests for a certain message characteristic has increased or decreased beyond a predefined frequency threshold. For example, in the weeks before the U.S. presidential election, search requests or queries for messages involving the election results may be infrequent. However, on the day of and the following day of the election, such searches may become very frequent. Accordingly, in response to determining that a historical search latency threshold or a historical search frequency threshold is exceeded, the query cache update engine (190) can dynamically add an attribute in the query cache (191), associated with each message, that indicates whether the message involves election results. As a result, searches for such messages will be faster during that time with the aid of the query cache (191). It may be preferable to optimize such searches based on their frequency during a period of time, regardless of the search time latency associated with such searches (e.g., based on a number of search requests associated with "election results" exceeding a predefined number of requests per hour or minute).

However, in this example, in the days or weeks following the election results, searches for messages involving the election results may be relatively infrequent. Accordingly, the query cache update engine (190) can dynamically remove the attribute in the query cache (191) that indicates whether the message involves the election results (e.g., in response to determining that a current average latency or a current search frequency threshold has decreased below the historical average search latency or the historical search frequency threshold, respectively).

In one or more embodiments of the invention, the query cache update engine (190) includes functionality to whitelist an authoring account based on one or more criteria. For example, a popular rock star with millions of followers may be the subject of frequent searches. In another example, it may be known that a popular news agency posts content that often becomes a popular search subject. Accordingly, the query cache update engine (190) can be configured to update an attribute in the query cache (191), associated with each message, that indicates whether the message includes content posted by or otherwise associated with one of a predefined list of whitelisted accounts. The query cache update engine (190) can be configured to whitelist and/or remove accounts from the whitelist based on comparing one or more predefined criteria with a predefined threshold. For example, if an engagement metric, a credibility rating, a popularity rating (e.g., number of followers, number of rebroadcasts, etc.), and/or other attribute of the account exceed the threshold, the query cache update engine (190) can be configured to add the account to the whitelist. Conversely, the query cache update engine (190) can dynamically remove the account from the whitelist (e.g., after a determination that the account attribute(s) no longer exceed the threshold).

In one or more embodiments of the invention, the query cache update engine (190) includes functionality to dynamically add/or remove one or more attributes in response to a number of rebroadcasts of the message by an authoring account, a number of messages posted by the authoring account, a credibility rating of an authoring account, and/or a threshold of engagement by an authoring account (e.g., based on a predefined number of separate users marking a message posted by the authoring account as a favorite message, a predefined number of separate users rebroadcasting a message posted by the authoring account, an amount of viewing of a message by one or more separate users, and/or a predefined number of separate users forwarding a message posted by the authoring account).

In one or more embodiments of the invention, attributes in the query cache (191) do not necessarily correspond to exact matches of content within a message. Instead, a query cache attribute can indicate that the content within a message matches a category. For example, an attribute associated with a category related to the subject of election results can correspond to messages that include the words "election results", "presidential results", "today's election", the name of the candidates with the word "results", and/or any other content related to the election results.

In one or more embodiments of the invention, the real-time search engine (192) includes functionality to calculate a relevance score for one or more categories based on a degree of relevancy for one or more search terms with the one or more categories. The real-time search engine (192) further includes functionality to use the attributes in the query cache (191) corresponding to categories that include adequate relevance scores to aid in the search. To determine whether a category is adequately relevant, the real-time search engine (192) can select categories with relevance scores beyond a relevance score threshold (e.g., categories with relevance scores above 90%), can select a predetermined number of the categories with the highest relevance scores (e.g., the top five categories), a number of the highest scored categories with relevance scores with a sum totaling a predefined amount (e.g., the highest scored categories with a sum total of relevance scores of 300%), and/or any other relevancy threshold.

For example, if a search term includes "election fraud", the real-time search engine (192) calculates a relevance score for the search term with other categories. Categories that may have adequate relevance scores may include categories such as "election results", "fraud", "recount", the names of candidates, and any number of other categories relevant to the search term "election fraud". Continuing the example, the real-time search engine (192) can use attributes in the query cache (191) corresponding to categories that include adequate relevance scores (e.g., attributes corresponding to the categories of "election results" and "fraud") to aid in the search.

In one or more embodiments of the invention, the query cache update engine (190) can include functionality to dynamically add or remove one or more attributes corresponding to a category to or from the query cache (191). The query cache update engine (190) can include functionality to add or remove one or more attributes corresponding to a category in response to a determination that searches related to a category exceed a predefined threshold (e.g., a fixed threshold, a historical average threshold, etc.), a determination that searches related to a category are more frequent than other searches related to other categories, a determination that the amount or rate of inclusion of categorizing tags (e.g., hashtags) in messages has exceeded a predefined or dynamically updated threshold, and any other criteria that can be used to add or remove attributes corresponding to a category to or from the query cache (191) to decrease search time latency. Referring to the example of FIG. 1D, the query cache update engine (190) can be configured to add or remove one or more attribute arrays storing attributes corresponding to messages in the segment to or from the query cache (191). For example, a fourth attribute array (not shown) may be added or removed.

In one or more embodiments of the invention, categories can be predefined categories and/or dynamically determined categories. The query cache update engine (190) can add attributes corresponding to one or more categories from a group of predefined categories to the query cache (191). The query cache (191) can include none, some, or all attributes corresponding to the predefined categories.

The query cache update engine (190) or the search fanout module (115) can include functionality to dynamically determine categories eligible to be represented by attributes in the query cache (191). The query cache update engine (190) can include functionality to add or remove one or more attributes corresponding to a category in response to a determination that searches related to a currently undefined category exceed a predefined threshold (e.g., a fixed threshold), a determination that searches related to a currently undefined category exceed a dynamically updated threshold (e.g., a threshold updated based on a recent average search frequency for all messages), and any other criteria that can be used to add or remove attributes corresponding to a currently undefined category to or from the query cache (191) to decrease search time latency.

For example, the query cache update engine (190) or the search fanout module (115) can determine that searches related to a forming Atlantic hurricane have increased beyond a fixed or dynamically updated threshold. In response to the determination, the query cache update engine (190) can add an attribute corresponding to the Atlantic hurricane to the query cache (191).

In one or more embodiments of the invention, the query cache update engine (190) includes functionality to read and/or modify the query cache (191). The query cache update engine (190) may include one or more background processes (not shown) configured to periodically or continuously update the query cache (191) by calculating and/or identifying attributes and updating cache entries accordingly. The background processes may follow a writer thread updating one or more inverted message indices of the segments, and may update stale query cache entries for newly written messages.

In one or more embodiments of the invention, the query cache update engine (190) includes functionality to update different segments of the query cache (191) at different frequencies (e.g., based on changes of metadata associated with the messages of the first time slice of messages and the second time slice of messages). For example, referring to FIG. 1C, the query cache update engine (190) can update the cache segment 4 at a different frequency than the cache segment 3.

In one or more embodiments of the invention, the query cache update engine (190) includes functionality to more frequently update cache segments associated with messages that have been posted more recently than cache segments associated with messages that have been posted less recently. For example, assuming that the cache segment 4 is associated with messages that have been posted more recently than messages associated with the cache segment 3, the query cache update engine (190) can update the cache segment 4 more frequently than the cache segment 3 because changes caused by the more recently posted messages may affect the query cache more than changes to older message posts or because more recent postings can be more relevant to a real-time messaging experience.

In one or more embodiments of the invention, the query cache update engine (190) includes functionality to update different segments of the query cache (191) at different frequencies based on a fixed update frequency. In one or more embodiments of the invention, the query cache update engine (190) includes functionality to update different segments of the query cache (191) at different frequencies based on dynamically updated frequencies. For example, the dynamically updated frequency associated with one or more segments can be increased if messages are added to one or more segments at a rate surpassing a frequency threshold.

Figure 7A:
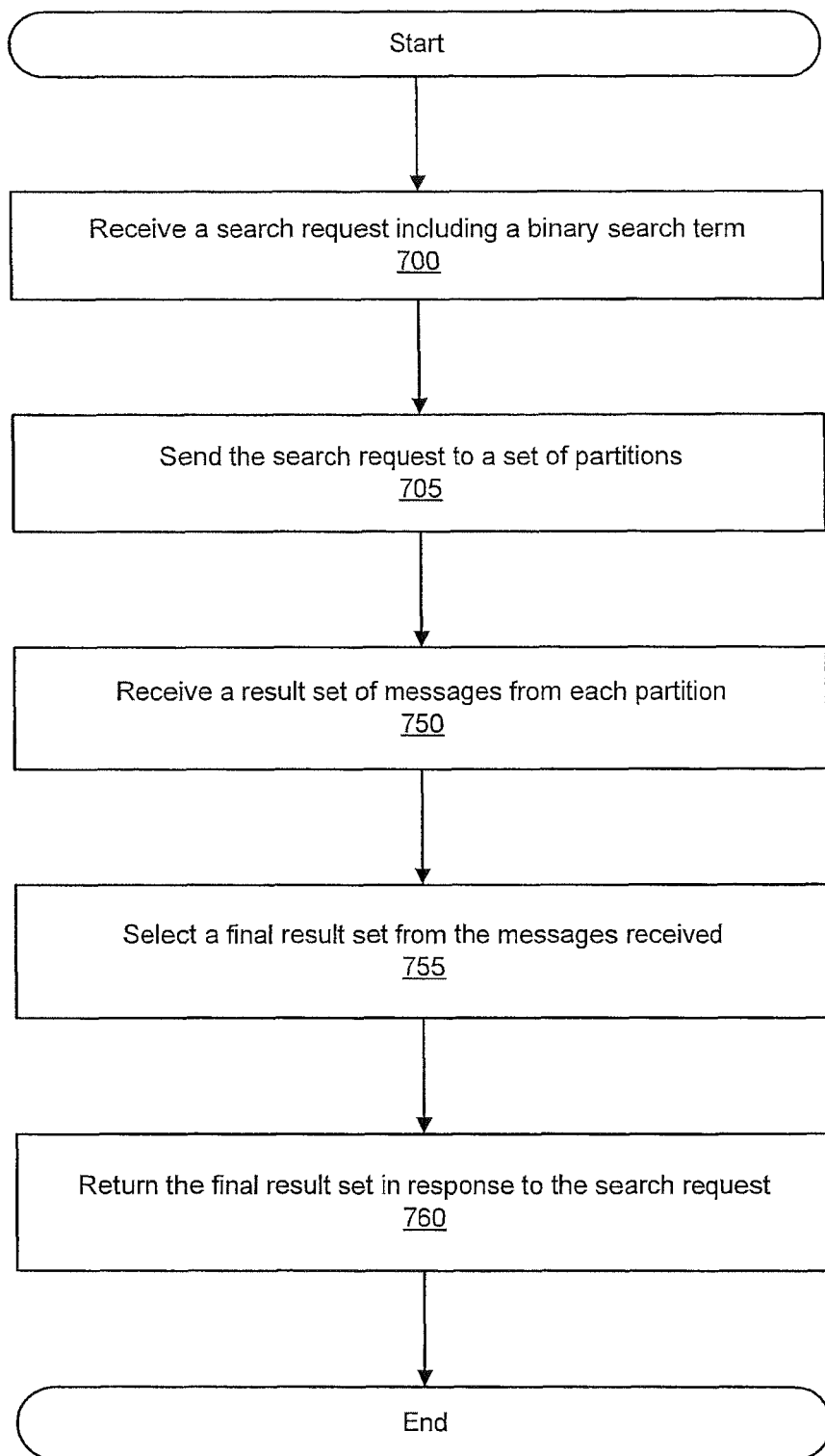
FIGS. 7A and 7B show flowcharts in accordance with one or more embodiments of the invention.

FIG. 7A shows a flowchart of a method for search (e.g., in a messaging platform). While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 7A should not be construed as limiting the scope of the invention.

In STEP 700, a search request including a binary search term is received. For example, referring to FIG. 1A, the search fanout module (115) receives a search request including a binary search term from the frontend module (110) and/or ultimately from the client (105).

In STEP 705, the search request is sent to a set of partitions. The partitions can perform separate searches in order to identify one or more messages based on any number of provided search terms (e.g., the binary search term). The partitions can perform the searches serially, in parallel, and/or in any combination thereof.

In STEP 750, a result set of messages is received from each partition. For example, referring to FIG. 1A, the search fanout module (115) receives a result set of messages from each of the partitions (120). The result set can include a set of document identifiers from one or more segments of one or more of the partitions. In this example, each message in the result set has an attribute value matching the binary search term in a corresponding query cache.

In STEP 755, a final result set is selected from the messages received. For example, each partition can return a relevance score for each message (e.g., the relevance score which was used to select the message for inclusion in the result set). In this example, the messages with the highest relevance scores can then be selected, from among all sets of messages received from multiple partitions, for inclusion in the final result set. In STEP 760, the final result set is returned in response to the search request. For example, the search fanout module (115) returns the final result set to the frontend module (110) and/or ultimately the client (105) in response to the search request.

Figure 7B:
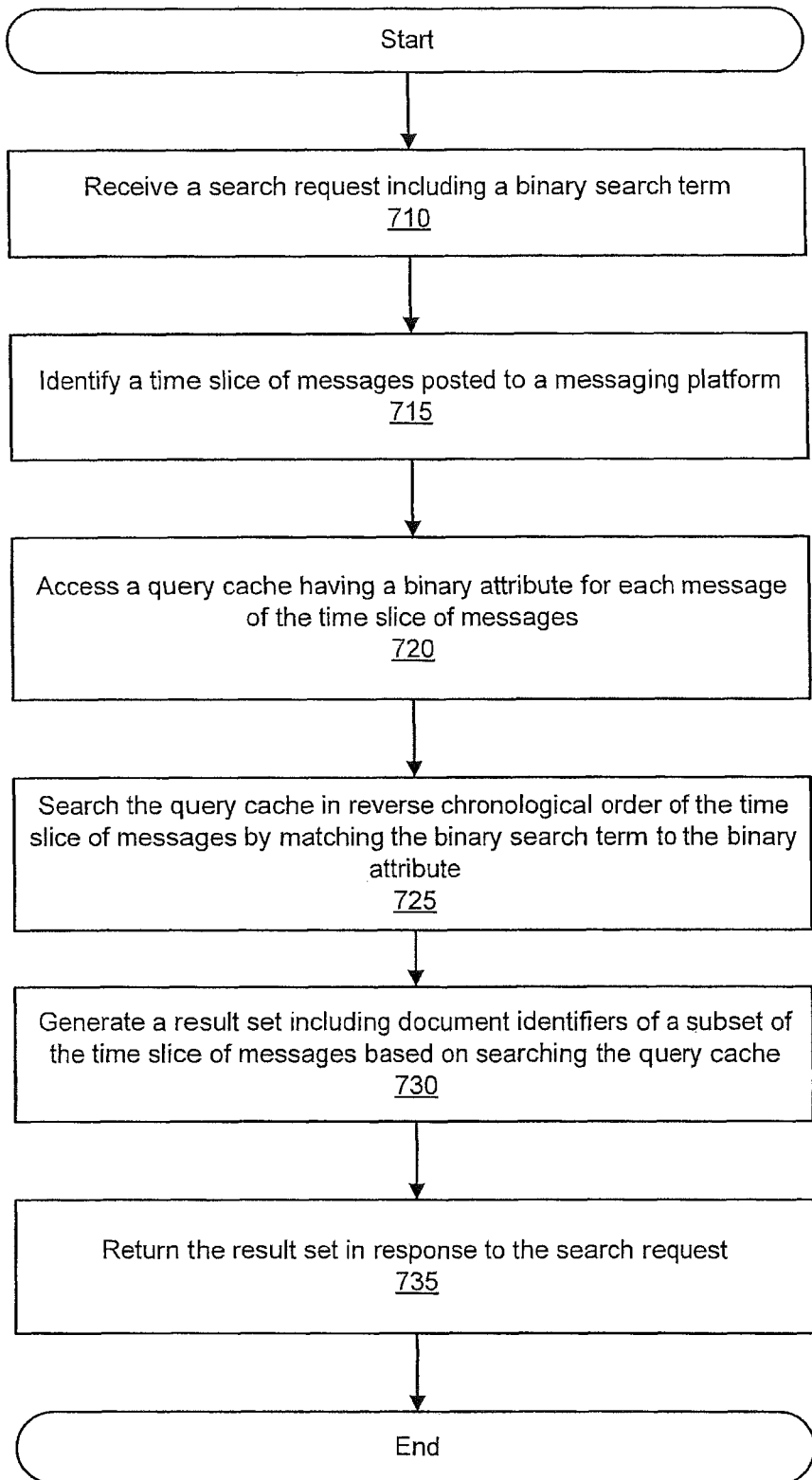

FIG. 7B shows a flowchart of a method for search (e.g., in a messaging platform). While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 7B should not be construed as limiting the scope of the invention.

In STEP 710, a search request including a binary search term is received. For example, referring to FIG. 1A, a partition of the partitions (120) receives a search request including a binary search term from the search fanout module (115).

In STEP 715, a time slice of messages posted to a messaging platform is identified. A time slice of messages posted to a messaging platform can include a set of messages representing messages that were posted to a messaging platform within a predefined time window.

In STEP 720, a query cache having a binary attribute for each message of the time slice of messages is accessed. The binary attribute can indicate whether an associated message includes a certain characteristic or attribute. The binary attribute can be used for the purposes of searching and identifying messages that match the characteristic.

In STEP 725, the query cache is searched in reverse chronological order of the time slice of messages by matching the binary search term to the binary attribute. For example, referring to FIG. 1B (discussed above), the partition (150) or real-time search engine (192) searches the most recently posted message in cache segment 4, followed by the next most recently posted message in cache segment 3, and so on. Further, in this example, assuming that the cache segment 4 is associated with messages that have been posted more recently than messages associated with the cache segment 3, the partition (150) or real-time search engine (192) can search the cache segment 4 before the cache segment 3.

In one or more embodiments of the invention, messages having the specified attribute in the query cache are then searched for relevance to one or more other search terms provided in the request. Searching for relevance can include, for example, calculating a relevance score for each of the messages based on frequency of a word, density of a word, timeliness, and/or any number of other criteria. Thus, the query cache can be searched to identify messages having the attribute(s), and then those messages can be ranked according to their relevance to one or more provided search terms. Relevance scoring of the messages can happen after or concurrently with the search of the query cache in STEP 725. In other words, while the messages with binary attributes matching the binary search term are in the process of being matched, the content of the messages that have already been matched during the process can be searched.

In STEP 730, a result set including document identifiers of a subset of the time slice of messages is generated based on searching the query cache. The subset of messages can be, for example, messages with a matching value of the binary attribute (i.e., identified in STEP 725) which are subsequently searched and ranked according to a calculated relevance score. Messages having the highest relevance scores can be selected for inclusion in the result set.

In STEP 735, the result set is returned in response to the search request. For example, a partition of the partition (120) returns the result set in response to the search request to the search fanout module (115).

In one or more embodiments of the invention, a method for search (e.g., in a messaging platform) includes STEPs 700-760 of FIG. 7A and STEPs 710-735 of FIG. 7B. For example, STEPs 700 and 705 of FIG. 7A can be first executed, followed by the execution of STEPs 710-735 of FIG. 7B, and then followed by the execution of STEPs 750-760 of FIG. 7A. It should be appreciated that in one or more embodiments of the invention, the steps of FIG. 7A can be executed by the same or a different module from the module executing the steps of FIG. 7B.

FIGS. 6A-6C depict an example of a partition (600) containing multiple segments and a query cache (605). In this example, a writer thread of the partition begins indexing a new time slice of messages to segment X. As the writer thread writes new document identifiers to a postings list of the segment, a background process follows the writer thread (with a slight lag) in order to populate query cache values for the newly written postings. FIGS. 6A and 6B depict a state of the partition (600) at this point in the example.

Continuing the example, a real-time search engine of the partition (600) receives a search request containing two search terms. In this example, the first search term is the word "badminton" and the second search term is a binary attribute which designates that the searcher is requesting only messages containing an image (i.e., "querycache_image"). The real-time search engine initially identifies a last update identifier indicating a last update point of the query cache (605) as well as a last written document identifier designating a position of the single writer thread of the partition. Based on the last update point and the position of the writer thread at that time, the real-time search engine performs an on demand calculation of the query cache (605) up until the identified position of the writer thread. The real-time search engine then requests that the background process populate the query cache (605) up until the requested point with the calculated entries and the real-time search engine proceeds to search the query cache (605) in reverse chronological order (i.e., in reverse order of the write direction, see FIG. 6A) after the on demand population is complete. FIG. 6C depicts a state of the partition (600) at this point in the example.

Continuing the example, the real-time search engine searches the query cache (605) to identify entries matching the binary attribute (i.e., to identify messages containing images). When a matching query cache entry is found, the real-time search engine then proceeds to read the corresponding posting value in the segment to fetch the document identifier and to determine whether the corresponding message contains the term "badminton". After identifying 10,000 document identifiers of such messages, the partition (600) calculates relevance scores for each document identifier. The partition (600) then selects a subset of the 10,000 messages (e.g., 20 messages) with the highest relevance scores for inclusion in a result set, and returns the result set and the corresponding relevance scores to a search fanout module in response to the search request. The search fanout module aggregates result sets from multiple partitions and then proceeds to select the messages with the highest relevance scores for inclusion in a final result set which is returned to a requesting client.

Search Infrastructure with Facets

In general, embodiments of the invention provide a method and system for search in any system including searchable documents, (e.g., messages in a messaging platform, web pages, videos, and/or any other type of document that is searchable). In one or more embodiments, messages posted to a messaging platform are required to be within a maximum length (e.g., character count). In one or more embodiments, hyperlinks and non-textual content can be excluded from a maximum length determination of the message, in accordance with various embodiments. It should be appreciated that one or more embodiments of the invention are discussed with reference to messages in a messaging platform, but that one or more embodiments of the invention can include searchable documents in any platform. A search query including a search term and a facet category is received from a client. The search term and facet category is sent to a set of partitions for parallel searching. Each partition includes a facet store and at least one time slice of messages posted to the messaging platform. The partition searches in reverse chronological order of the time slice of messages by matching the search term to the messages of the time slice of messages and matching the facet category to an attribute stored in the facet store. A result set is returned based on the search.

In one or more embodiments of the invention, a facet can be a property of or an entity in a message. For example, an image or a video included in a message can be a facet of that message. In another example, news content in a message can be a facet of that message. In yet another example, an authoring account property can be a facet of that message. A message can include no facets, one facet, or more than one facet.

FIG. 1E shows a schematic diagram of a partition (150) that can be included in the partitions (120) of FIG. 1A, in accordance with one or more embodiments of the invention. As shown in FIG. 1E, the partition (150) can include a facet store (177) and one or more segments (e.g., segments 1-X). The facet store (177) can include one or more facet store segments (e.g., facet store segments 1-X), each mapped to a different segment of the partition (150) (e.g., facet store segment 1 mapped to segment 1, facet store segment 2 mapped to segment 2, and so on). The partition (150) can further include a real-time search engine (192) and a facet store update engine (176). Various components of the partition (150) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there may be more than one of each separate component running on a device, as well as any combination of these components within a given embodiment of the invention.

In one or more embodiments of the invention, each segment (e.g., segments 1-X) includes an inverted message index and one or more associated data structures. For example, an index can include a postings list, a dictionary, and an attributes array storing one or more attributes for each posting in the postings list. The postings list may include any number of document identifiers referencing a set of messages in the message repository (110). Alternatively, in one or more embodiments of the invention, one or more of the segments may store separate portions of the same inverted message index. In this way, the inverted message index may be stored collectively across multiple segments of the partition (150).

In one or more embodiments of the invention, each segment (e.g., segments 1-X) stores one or more time slices of messages posted to the messaging platform. For example, each segment can include a postings list representing messages that were consecutively posted or posted in order to the messaging platform. However, in one or more embodiments of the invention, the messages in the time slice may not have necessarily been posted back to back to the messaging platform.

The facet store (177) can be one or more repositories, data services, structures, and/or collections of data corresponding to the document identifiers stored in one or more segments of the partition (150). In one or more embodiments of the invention, the facet store (177) includes a facet store segment (e.g., facet store segments 1-X of FIG. 1E) corresponding to each segment (e.g., segments 1-X) and/or postings list. Thus, in the example of FIG. 1E, facet store segment 1 includes data associated with segment 1, facet store segment 2 includes data associated with segment 2, facet store segment 3 includes data associated with segment 3, and so on.

FIG. 1F shows a schematic diagram of a facet store (177), a corresponding segment, and corresponding inverted facet indices, in accordance with one or more embodiments of the invention. As shown in FIG. 1F, the facet store (177) can include a primary facet array 178 including an element corresponding to a posting and/or document in the associated segment. The facet store (177) can also include an overflow facet array (179) including one or more elements corresponding to one or more documents in the associated segment. Various components of the facet store (177) can be located on the same device (e.g., a server, mainframe, desktop Personal Computer (PC), mobile computing device, and any other device) or can be located on separate devices connected by a network (e.g., a local area network (LAN), the Internet, etc.). Those skilled in the art will appreciate that there may be more than one of each separate component running on a device, as well as any combination of these components within a given embodiment of the invention.

In one or more embodiments of the invention, each segment (e.g., segments 1-X) includes or is associated with one or more inverted facet indices (e.g., inverted facet indices 171, 172, 173, 174, through 175) and one or more associated data structures. An inverted facet index can include a facet postings list, a facet dictionary, and one or more parallel arrays storing one or more attributes for each posting in the postings list. The facet dictionary can include facet identifiers of any number of facets. The postings list may include document identifiers of a set of messages in the message repository (110) that include a particular facet identified in the dictionary. In one or more embodiments, one or more of the segments may store separate portions of the same inverted facet index. In this way, the inverted facet index may be stored collectively across multiple segments of the partition (150).

In one or more embodiments of the invention, the content of one or more of the inverted facet indices can be stored instead in the inverted message index (i.e., the same inverted index storing the message terms). Thus, facet identifiers can be stored in the dictionary of the inverted message index along with message terms. Alternatively, in one or more embodiments, the one or more inverted facet indices can be stored independently of each segment (e.g., segments 1-X).

In one or more embodiments, the one or more inverted facet indices are each configured to index facets of a particular facet category. Examples of a facet category can include, but are not limited to, an images facet category, a videos facet category, a news facet category, a hashtag facet category, a mentions facet category, an authors facet category, a topics facet category, a language statistics facet category, a source statistics facet category, and a stocks facet category, and/or any other category of a facet of a document. In one or more embodiments of the invention, a single inverted facet index can be used to index multiple facet categories (e.g., a multimedia facet category storing images, video, and audio).

A facet category can indicate a category for a particular facet. For example, the images facet category can index documents containing or referencing images, the videos facet category can index documents containing or referencing videos, and the news facet category can index documents containing or referencing news articles.

In another example, the hashtag facet category can index documents containing hashtags (i.e., a term preceded by a hash character which provides a means of grouping messages), and the mentions facet category can index documents containing mentions of another account of the messaging platform (100). In addition, the authoring account facet category can index documents posted by particular authoring accounts of the messaging platform (100).

In another example, the topics facet category can index documents based on their association with one or more topics, the stocks facet category can index documents containing or referencing stock ticker symbols. In addition, the language statistics facet category can index documents based on their language. Further, a source statistics facet category can indicate a client and/or an operating system platform (e.g., the Twitter client on iOS). Twitter is a registered trademark of Twitter Corporation (San Francisco, Calif.) and iOS is a registered trademark of Apple Corporation (Cupertino, Calif.).

It should be appreciated that one or more facets may exist within a facet category. For example, an image of an animal, an image of a building, and an image of a politician may all be facets in the images facet category.

Referring to FIG. 1F, in one or more embodiments, the facet store includes a primary facet array (178) and an overflow facet array (179). The primary facet array can include primary elements, each corresponding to a document identifier of a document (e.g., a message posted to the messaging platform (100)). For example, the first element of the primary facet array (178) can correspond to the message P1 as shown by the dotted arrow, the second element of the primary facet array (178) can correspond to the message P2 as shown by the dotted arrow, and so on. In one or more embodiments of the invention, the primary facet array (178) can store information that indicates whether the corresponding message includes no facets, one facet, or more than one facet. If the information in an element of the primary facet array (178) indicates that the corresponding message includes one facet, the element can store information about the facet (e.g., an identifier of a corresponding inverted facet index, a facet identifier stored in the dictionary entry of an inverted facet index, discussed below). In one or more embodiments of the invention, if the information in an element of the primary facet array (178) indicates that the corresponding message includes more than one facet, the element can store a reference to a location in an associated data structure that stores additional facet information (e.g., a location in the overflow facet array (179), discussed below).

The overflow facet array (179) includes overflow elements, each associated with an element of the primary facet array (178). The overflow facet array (179) can be configured to store one or more facet identifiers for the associated primary element. The elements of the overflow facet array (179) can be configured to store additional information associated with the facets (e.g., a corresponding facet category, identifier of a corresponding inverted facet index, etc.).

FIG. 1G shows a schematic diagram of a primary facet array element (181) and an overflow facet array element (185), in accordance with one or more embodiments of the invention. The primary facet array element (181) can include one or more overflow bit(s) (182), one or more facet category bit(s) or overflow facet array element reference bit(s) (183), and/or one or more facet identifier bit(s) or overflow facet array element reference bit(s) (184).

In one or more embodiments of the invention, the overflow bit(s) (182) indicate whether a message corresponding to the primary facet array element (181) includes no facets, one facet, or more than one facet. For example, in the case of a single overflow bit (182), a value of '0' can indicate that the corresponding message includes no facets or only one facet. A single overflow bit (182) value of '1' can indicate that the corresponding message includes more than one facet. In the case of multiple overflow bits (182), various values represented by the overflow bits (182) can each indicate different properties of the facet. For example, a value of "0" can indicate that the corresponding message includes no facets, a value of "1" can indicate that the corresponding message includes only one facet, and a value of "2" can indicate that the corresponding message includes more than one facet.

In one or more embodiments of the invention, the facet category bit(s) (183) indicate a facet category of a facet in a message. For example, a value of "0" can indicate that the corresponding facet is in the images facet category, a value of "1" can indicate that the corresponding facet is in the videos facet category, and so on. The facet category can indicate in which inverted facet index the facet identifier is stored (e.g., inverted facet index 171 through 175 of FIG. 1F). In one or more embodiments of the invention, the facet category bit(s) (183) indicate an inverted facet index of a facet.

In one or more embodiments of the invention, the facet identifier bit(s) (184) store a facet identifier corresponding to a facet in a message. For example, the facet identifier bit(s) (184) can store a unique identifier of a particular facet that is included in a dictionary of an inverted facet array. The unique identifier of the facet can be assigned by the facet store update engine or another component of the messaging platform. For example, a unique identifier of a URL (e.g., of an image) can be any unique or sufficiently unique numerical representation of the URL. In one or more embodiments, the facet category bit(s) (183) and the facet identifier bit(s) (184) together can be used to identify a dictionary entry for the facet in an inverted facet array.

In one or more embodiments of the invention, the bits for the facet category bit(s) (183) and the facet identifier bit(s) (184) can instead be interpreted as overflow facet array element reference bit(s) (183 and 184). An overflow facet array element reference bit(s) (183 and 184) can store a reference to an overflow facet array element (185) in an overflow facet array (179).

In one or more embodiments of the invention, when a single overflow bit (182) holds a value of '0', the corresponding message can include no facets or one facet. The facet category bit(s) (183) and the facet identifier bit(s) (184) may indicate that the message includes no facets (e.g., when facet category bit(s) (183) and the facet identifier bit(s) (184) both store values of '0'). When a single overflow bit (182) holds a value of '1', the corresponding message can include more than one facet. The facet category bit(s) (183) and the facet identifier bit(s) (184) can instead be interpreted as overflow facet array element reference bit(s) (183 and 184) that store a reference to an overflow facet array element (185) in an overflow facet array (179), where information for multiple facets in a message can be stored.

The overflow facet array element (185) can include one or more continuation bit(s) (186), one or more facet category bit(s) (187), and/or one or more facet identifier bit(s) (188). In one or more embodiments of the invention, the overflow facet array (179) can include multiple overflow facet array elements per primary facet array element. Each overflow facet array element can include information about a different facet of the message.

The continuation bit(s) (186) can indicate whether additional overflow facet array elements exist for the associated primary element. For example, in the case of a single continuation bit (186), a value of '0' can indicate that there are no additional overflow facet array elements (185) beyond the current overflow facet array element (185). A single continuation bit (186) value of '1' can indicate that there are one or more additional overflow facet array elements (185) for the associated primary element. The additional overflow facet array element (185) can be adjacent (e.g., immediately before or after) the current overflow facet array element (185) in the overflow facet array (179). The facet category bit(s) (187) and the facet identifier bit(s) (188) can then be interpreted to identify an entry in a dictionary of an inverted facet index. In one or more embodiments of the invention, the continuation bit (186) of the last overflow facet array element (185) for the current primary element always holds a value of '0', indicating that no additional overflow facet array elements (185) exist for the primary element.

In one or more embodiments of the invention, multiple continuation bits (186) can be used to indicate different properties of the facet. For example, a value of "0" can indicate that there are no additional overflow facet array elements (185) for the corresponding primary element, a value of "1" can indicate that there is one additional overflow facet array element (185) for the primary element, a value of "2" can indicate that there are two additional overflow facet array elements (185) for the primary element, and so on.

In one or more embodiments of the invention, the facet category bit(s) (187) indicate a facet category of a facet in a message. For example, a value of "0" can indicate that the corresponding facet is in the images facet category, a value of "1" can indicate that the corresponding facet is in the videos facet category, and so on. The facet category can indicate in which inverted facet index a facet identifier exists. Thus, the facet category bit(s) (187) can identify a particular inverted facet index that stores the facet identifier.

In one or more embodiments of the invention, the facet identifier bit(s) (188) store a facet identifier of a facet. For example, the facet identifier bit(s) (188) can store a unique or sufficiently unique numerical identifier of a particular facet of a message. In one or more embodiments, the facet category bit(s) (187) and the facet identifier bit(s) (188) together can indicate an entry in a dictionary of an inverted facet array.

The elements of the primary facet array (178) and the elements of the overflow facet array (179) can be configured to include any number of bits. For example, the primary facet array element (181) may be 16 bits, 32 bits, or 64 bits in size.

Returning to FIG. 1F, the message P1 corresponds to a primary facet array (178) element. The element illustrated without an empty or solid circle symbol denotes that the message P1 does not include any facets. For example, the overflow bit (182) of the element can indicate that there is no information about additional facets being stored in the overflow facet array (179) for the message P1, and the facet category bits (183) and facet identifier bits (184) can indicate that there is no facet for the message P1. The messages P3, P5, P6, and P11, similarly illustrated without an empty or solid circle symbol, do not include any facets.

The message P2 corresponds to a primary facet array (178) element including an empty circle symbol. The empty circle symbol denotes that the message P2 includes only one facet. For example, the overflow bit (182) of the element can indicate that there are no additional facets being stored in the overflow facet array (179) for the message P2. The facet category bits (183) and facet identifier bits (184) can together be used to identify an entry into a dictionary of an inverted facet array, in this case, denoted by the arrow to inverted facet index 1 (171). The messages P8 and P10, similarly illustrated with empty circle symbols, include only one facet. In the case of messages P8 and P10, the primary facet array (178) elements of both messages include facet identifiers stored in a dictionary of the inverted facet index 4 (174).

The message P4 corresponds to a primary facet array (178) element including a solid circle symbol. The solid circle symbol denotes that the message P4 includes two or more facets. For example, the overflow bit (182) of the element can indicate that there are additional facets being stored in the overflow facet array (179) for the message P4. The facet category bit(s) (183) and the facet identifier bit(s) (184) can instead be used as overflow facet array element reference bit(s) (183 and 184). For example the overflow facet array element reference bits (183 and 184) can point to a first overflow element in the overflow facet array (179). In this case, the first overflow element in the overflow facet array (179) element is depicted to include a small solid circle symbol.

The first overflow element can include facet category bits (183) and facet identifier bits (184) that can be used to identify a dictionary entry in an inverted facet array, in this case, denoted by the arrow to inverted facet index 1 (171). The small solid circle symbol of the first overflow element denotes that the continuation bit (186) of the first overflow element indicates that there is information about an additional facet being stored in the overflow facet array (179) for the message P4. Accordingly, a second overflow element adjacent to the first overflow element hold information about an additional facet for the message P4. The second overflow element can include facet category bits (183) and facet identifier bits (184) that can be used to identify a dictionary entry in an inverted facet array, in this case, denoted by the arrow to inverted facet index 3 (173). The second overflow element includes a small empty circle symbol which denotes that the overflow facet array (179) includes no further elements holding information about facets in the message P4.

The messages P7 and P9, similarly illustrated with solid circle symbols, include more than one facet. In the case of the message P7, the overflow facet array (179) includes four elements corresponding to four facets of the message P7. For example, the first and second elements include a facet identifier for facets identified in the inverted facet index 2 (172), the third element includes a facet identifier for a facet identified in the inverted facet index 3 (173), and the fourth element includes a facet identifier for a facet identified in the inverted facet index 1 (171). The small solid circle symbol in the first three overflow elements denotes that an additional overflow element for the message P7 exists. The small empty circle symbol in the fourth overflow element denotes that no additional overflow element for the message P7 exists beyond that element. In the case of the message P9, the overflow facet array (179) includes three elements corresponding to three facets of the message P9. For example, all three elements include a facet identifier for facets identified in the inverted facet index 4 (174). The small solid circle symbol in the first two overflow elements denotes that an additional overflow element for the message P9 exists. The small empty circle symbol in the third overflow element denotes that no additional overflow element for the message P9 exists beyond that element.

In one or more embodiments of the invention, the real-time search engine (192) includes functionality to receive a search request including one or more search terms and a facet category. Examples of a search term can include, but are not limited to, a general search term entered into a text box by a user of a client device (e.g., "Antarctica", "puppies", etc.), and/or any other term usable in identifying content and/or attributes of a message. Search terms can be generated by a user or can be added to a search request based on a context of the search (e.g., image search, video search, news search, originating client platform, etc.). The client (105), frontend module (110), and/or search fanout module (115) can be configured to add or modify a search term based on the context, in accordance with various embodiments.

In one or more embodiments of the invention, the real-time search engine (192) includes functionality to search, based on the search term, the postings list to identify a first set of matching document identifiers. Searching the postings list can include, but is not limited to, searching the contents of documents in the postings list for a match with the search term, searching a query cache for matches with the search term, and/or any other search method for matching the search term with a document identifier in the postings list. In this way, the partition (150) can be configured to limit the search range of the facet store (177) for a given request to a subset of messages (i.e., messages having the specified attribute(s)). For example, referring to FIG. 1F, the real-time search engine (192) need only search the primary facet array (178) elements and overflow facet array (179) elements of the messages of the segment that match the search term. In an example, the messages P2, P5, and P7 may be the only documents identified matching the search term. Accordingly, the real-time search engine (192) can avoid searching the primary facet array (178) elements and overflow facet array (179) elements of messages P1, P3, P4, P6, and P8-P11. As a result, the search time can be reduced.

In one or more embodiments of the invention, the real-time search engine (192) includes functionality to search the postings list in reverse chronological order of the time slice of documents. In other words, the real-time search engine (192) begins searching the most recent messages first and searches older messages as it continues to search. In one example, the real-time search engine (192) discontinues the search once a message corresponding to a predefined time threshold is reached (e.g., a message that is 7 days old). In another example, the real-time search engine (192) discontinues the search after identifying a predefined number of matching messages or a specified matching message.

In one or more embodiments of the invention, the real-time search engine (192) includes functionality to search elements in the facet store corresponding to the first set of matching document identifiers to identify a set of facets within the facet category. In one or more embodiments of the invention, searching elements of the facet store includes searching, based on the facet category, the primary facet array (178) in reverse chronological order of the first time slice of documents to identify references to the set of facets. For example, the real-time search engine (192) can access the facet category bits (183 and 187) of each primary facet array (178) element and overflow facet array (179) element corresponding to the matching document identifiers to identify a set of facets matching the facet category. The real-time search engine (192) can begin searching the primary facet array (178) elements corresponding to the most recent messages first and can search older messages as it continues to search.

Continuing the example, the real-time search engine (192) can access the facet category bits (183) of the primary facet array (178) element corresponding to the message P2 to determine whether the facet matches the facet category. The real-time search engine (192) may ignore the message P5 since that message contains no facets, as indicated by the primary facet array (178). The real-time search engine (192) can access the facet category bits (183) of the primary facet array (178) element corresponding to the message P7, and the facet category bits (187) of the overflow facet array (179) element corresponding to the message P7, to determine whether any of the facets match the facet category.

In one or more embodiments of the invention, the real-time search engine (192) includes functionality to calculate a count of references from the elements to each facet in the set of facets. In other words, the real-time search engine (192) can count, for each facet in the set of facets, a number of references to each facet in the primary facet array (178) and overflow facet array (179).

Continuing the example, the real-time search engine (192) can count the facet identifier in the primary facet array (178) element corresponding to the message P2 and the facet identifier in the fourth overflow facet array (179) element corresponding to the message P7. Assuming that both facet identifiers are the same, the facet would have a count of two references. Similarly, the real-time search engine (192) can count the facet identifier in the first and second overflow facet array (179) elements corresponding to the message P7. Assuming that the two facet identifiers are the same, that facet would also have a count of two references.

In one or more embodiments of the invention, the real-time search engine (192) includes functionality to search the message content for a match with the search term in parallel with searching the facet store (177) to identify a set of facets within the facet category, in parallel with calculating a count of references, and/or in parallel with generating the result set. One or more concurrent reader threads can be used to perform the concurrent functions. For example, while the real-time search engine (192) is in the process of searching the postings list to identify matching document identifiers, the real-time search engine (192) can also search elements in the facet store corresponding to the already identified document identifiers to identify a set of facets within the facet category.

In one or more embodiments of the invention, the real-time search engine (192) includes functionality to determine, based on accessing an inverted facet index, a count of the first time slice of documents referencing each unique facet, where the facet identifier is selected for inclusion in the result set based on the count. For example, the real-time search engine (192) can select a predefined number of the facets with the highest count for inclusion in the result set.

In one or more embodiments of the invention, the real-time search engine (192) includes functionality to return the result set in response to the search request. For example, the real-time search engine (192) can return the result set to the search fanout module (115) in response to the search request.

In one or more embodiments of the invention, the real-time search engine (192) includes functionality to search the inverted facet index for a facet identifier identified in the facet store (i.e., based on a search). For example, referring to FIG. 1F, the real-time search engine (192) can access the facet identifier for at least one facet in the set of facets in at least one of the inverted facet indices (171-175).

In one or more embodiments of the invention, the real-time search engine (192) includes functionality to calculate, based on searching the inverted facet index, histogram scores for the facet identifier, where each of the histogram scores represents a count of documents associated with the facet identifier within a discrete time segment. For example, in FIG. 1F, a particular facet in the inverted facet index 1 (171) may be referenced by multiple messages over time. However, the facet may be referenced at different rates during different time periods. The real-time search engine (192) can calculate a histogram score that represents the number of facet references for each time segment.

In one or more embodiments of the invention, the real-time search engine (192) includes functionality to calculate a historical average of the histogram scores. For example, the real-time search engine (192) can calculate a historical average of histogram scores for a particular facet over multiple time segments.

In one or more embodiments of the invention, the real-time search engine (192) includes functionality to determine that a current histogram score of the histogram scores exceeds the historical average. For example, if the most recent time segment of messages includes a histogram score, for a facet identifier, that is greater than the historical average, the real-time search engine (192) may increase the relevance of that facet in a relevance scoring function. A scoring function, for example, can increase a relevance score if a current histogram score exceeds the historical average by a predefined amount or percentage. The scoring function can increase the relevance score by doubling the score, by increasing the score in proportion to the difference between the current histogram score and the historical average, or by any other approach for weighting facets with larger current histogram scores in comparison to their historical average. In one example, the score (e.g., relevance score) of a given facet is equal to the count of that facet for the current search (e.g., the count of the facet for a number of searched postings). Increasing the relevance score can involve arbitrarily increasing or decreasing the value of the count in order to modify the score of the facet.

Thus, regardless of the scoring function used, the facet identifier is more likely to be included in the result set. In another example, the real-time search engine (192) adds a predefined integer to the count of a particular facet if it is determined that the current histogram score of the facet exceeds the facet's historical average. Thus, when selecting facets with the highest count of references in the facet store for inclusion in the result set, the particular facet is more likely to be included due to the higher count. In one or more embodiments of the invention, if the current time segment has not yet completed real-time search engine (192) can be configured to calculate an expected number of references for the time segment based on the current number of references. If the expected number exceeds the historical average score, the real-time search engine (192) may include that facet identifier in the result set.

In one or more embodiments of the invention, the facet store update engine (176) includes functionality to read and/or modify the facet store (177). The facet store update engine (176) may include one or more background processes (not shown) configured to periodically or continuously update the facet store (177) by calculating and/or identifying facets in documents and their associated facet categories, and updating facet store (177) elements accordingly. The background processes may follow a writer thread updating one or more inverted message indices of the segments, and may update stale facet store (177) elements for newly written postings.

In one or more embodiments of the invention, the real-time search engine (192) includes functionality to search the facet store (177) using facet store-only and/or hybrid filtering. As the writer thread writes the most current segment, the facet store segment corresponding to that segment may be populated by one or more background processes. Thus, a background process may trail the writer thread and update corresponding facet store data as the current segment is written. As a result, population of the facet store segment may lag the population of the current segment by varying amounts. Facet store-only filtering involves searching only the portions of the facet store (177) that are non-stale at a current time (i.e., without performing an on-demand update of the facet store (177)). Thus, facet store-only filtering restricts the search range to that of the currently non-stale cache entries. Hybrid filtering involves populating a stale portion of the facet store (177) on demand. Thus, the real-time search engine (192) can be configured to identify a stale portion of the facet store (177) which corresponds to the lag between the writer thread and one or more background processes responsible for updating the facet store (177). The facet store update engine (176) can then calculate the attribute values for the stale portion and update the facet store (177), thereby increasing the search range of the facet store (177) for the current request.

In one or more embodiments of the invention, the real-time search engine (192) includes functionality to determine a safe search range of the facet store (177). In one or more embodiments of the invention, the search range refers to the searchable (i.e., non-stale) portion of the facet store (177) at a given point in time. The search range may be calculated either periodically or on demand, at any time before and/or after receiving the search request, in accordance with various embodiments of the invention.

In one or more embodiments of the invention, the real-time search engine (192) includes functionality to identify a last update identifier indicating a last update point of the facet store (177). The real-time search engine (192) can be configured to identify a last written document identifier designating a position of the single writer thread of the partition. Based on the last update identifier and the last written document identifier, the real-time search engine (192) may be configured to identify a stale portion of the facet store (177) corresponding to a fresh portion of the postings list (i.e., a portion of the facet store (177) which is not yet updated by the background process(es)). The facet store update engine (176) can refresh the stale portion of the facet store (177) on demand, and can then update a safe search range of facet store (177) to include the previously stale portion.

Returning to FIG. 1E, in one or more embodiments of the invention, the real-time search engine (192) includes functionality to search one or more of the segments to identify document identifiers of messages based on one or more search terms. The real-time search engine (192) can be configured to identify a predefined number of matching document identifiers for each search query. Thus, in one example, if the search terms are extremely prevalent, the real-time search engine can identify the first 10,000 document identifiers for analysis. Identification of the matching document identifiers can be based on any search syntax, in accordance with various embodiments of the invention. For example, the terms "pink elephant" (including quotations) can require the entire phrase to be present, while the same terms without the quotations can require the separate terms to exist anywhere within the same message.

Figure 8A:
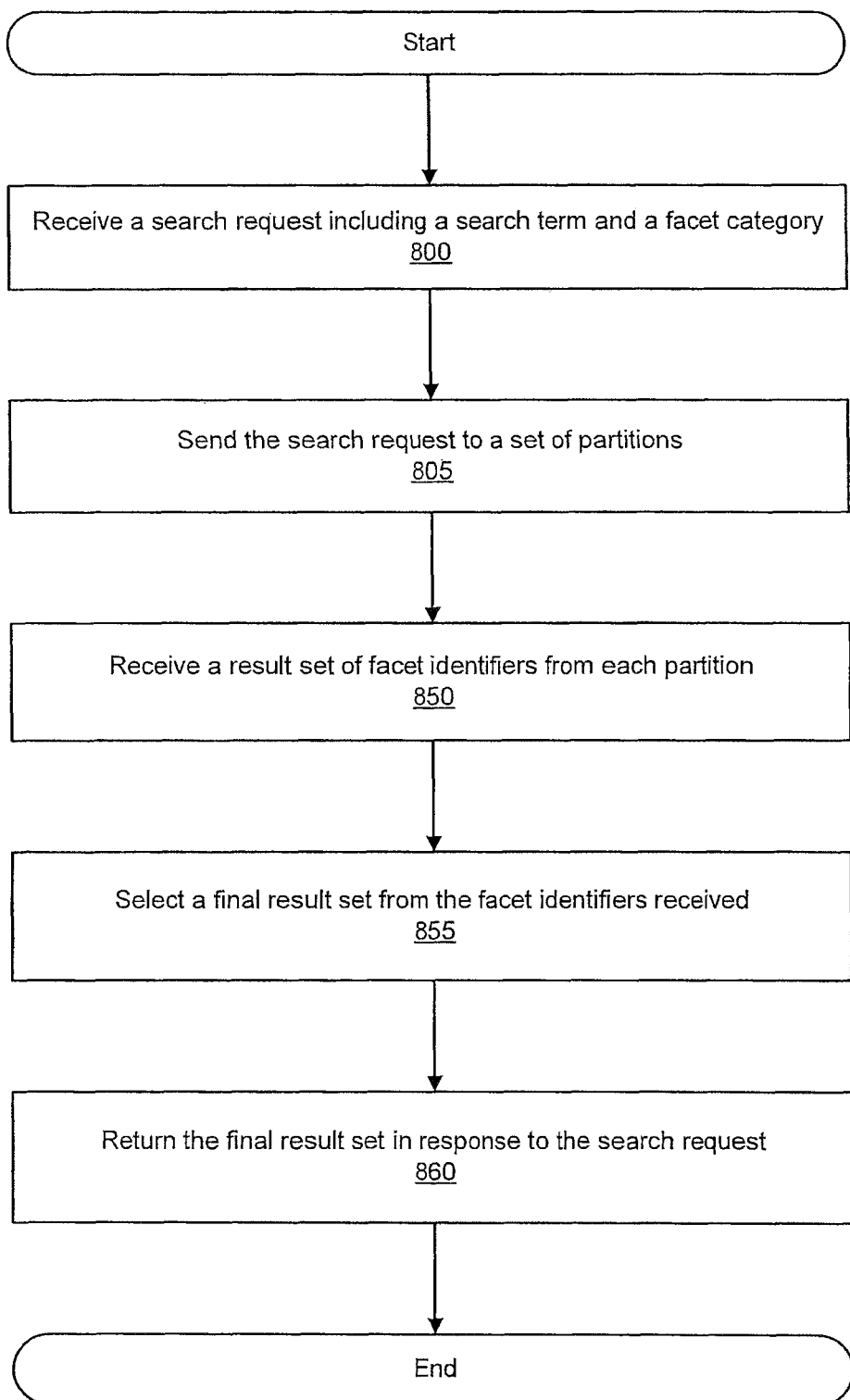
FIGS. 8A and 8B show flowcharts in accordance with one or more embodiments of the invention.

FIG. 8A shows a flowchart of a method for search (e.g., in a messaging platform). While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 8A should not be construed as limiting the scope of the invention.

In STEP 800, a search request including a search term and a facet category is received. For example, referring to FIG. 1A, the search fanout module (115) can receive a search request including a search term and a facet category from the client (105) (e.g., by way of the frontend module (110)).

In STEP 805, the search request is sent to a set of partitions. The partitions can perform separate searches in order to identify one or more messages and/or facet identifiers based on any number of provided search terms (e.g., the search term). The partitions can perform the searches serially, in parallel, and/or in any combination thereof.

In STEP 850, a result set of facet identifiers is received from each partition. For example, referring to FIG. 1A, the search fanout module (115) receives a result set of facet identifiers from each of the partitions (120). The result set can include a set of top scored facet identifiers from one or more segments of one or more of the partitions.

In STEP 855, a final result set is selected from the facet identifiers received. In STEP 860, the final result set is returned in response to the search request. For example, the search fanout module (115) can return the final result set to the client (105) (e.g., by way of the frontend module (110)) in response to the search request.

Figure 8B:
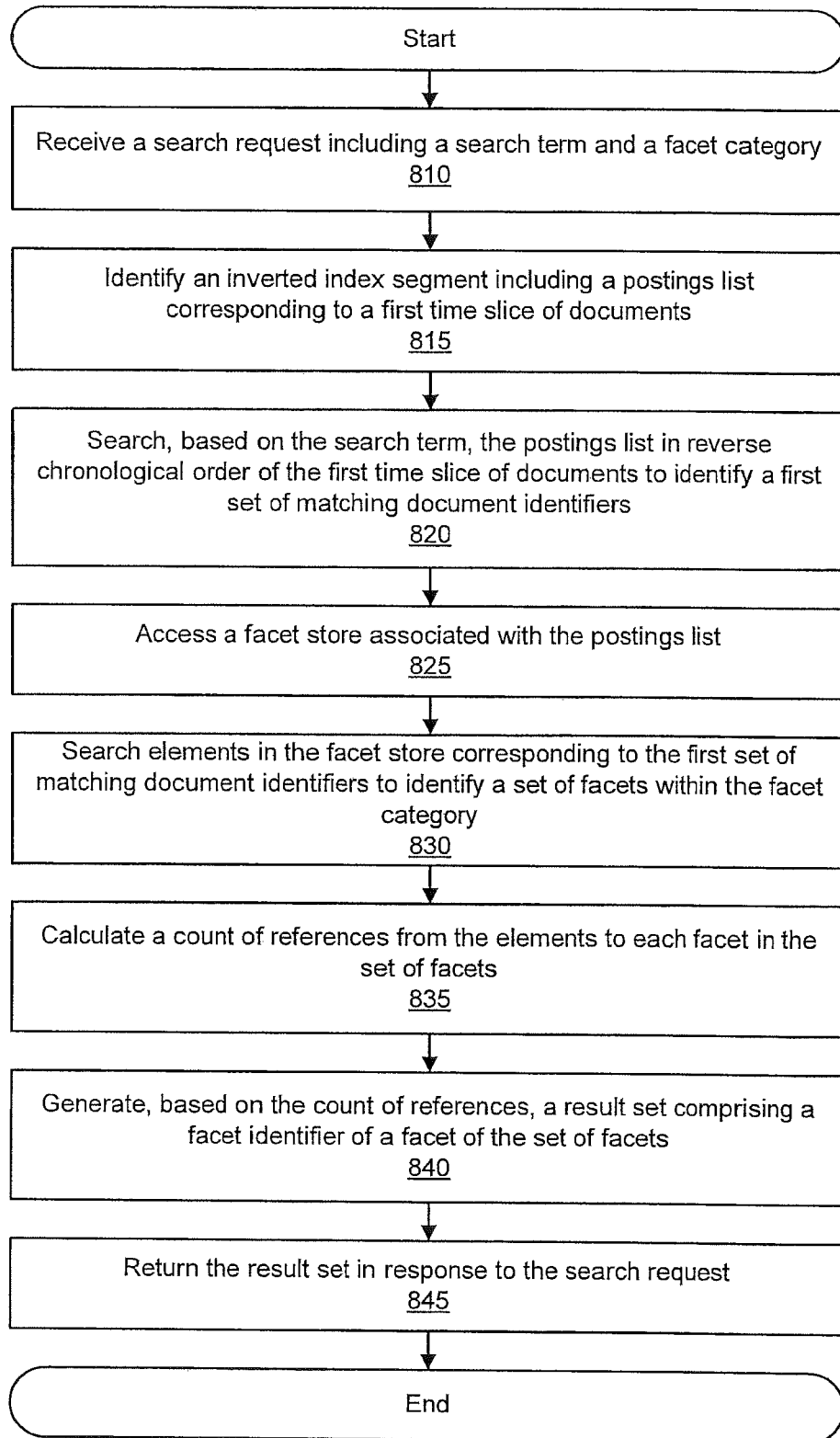

In one or more embodiments of the invention, the search for facet identifiers described with regard to the flowcharts of FIGS. 8A and 8B can be performed concurrently with a text search (e.g., a search for one or more user-entered terms). Thus, the messaging platform (100) can be configured to trigger one or more facet searches in conjunction with each text search requested by the client (105). The client (105) can then, for example, display the one or more results of the facet search(es) with one or more results of the text search concurrently in a results view of an executing application or web browser (e.g., see FIG. 10).

FIG. 8B shows a flowchart of a method for search (e.g., in a messaging platform). While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 8B should not be construed as limiting the scope of the invention.

In STEP 810, a search request including a search term and a facet category is received. For example, referring to FIG. 1A, a partition of the partitions (120) receives a search request including a search term and a facet category from the search fanout module (115).

In STEP 815, an inverted index segment including a postings list corresponding to a first time slice of documents is identified. A time slice of messages posted to a messaging platform can include messages that were posted to a messaging platform within a predefined time window.

In STEP 820, the postings list is searched, based on the search term, in reverse chronological order of the first time slice of documents to identify a first set of matching document identifiers. For example, referring to FIG. 1E (discussed above), real-time search engine (192) can be configured to search the most recently posted message in segment 4, followed by the next most recently posted message in segment 3, and so on. Further, in this example, assuming that the segment 4 is associated with messages that have been posted more recently than messages associated with the segment 3, the partition (150) or real-time search engine (192) can search the segment 4 before the segment 3. Alternatively, in one or more embodiments of the invention, the segments can be searched concurrently.

In STEP 825, a facet store associated with the postings list is accessed. For example, referring to FIG. 1E, the facet store (177) associated with the postings list(s) in the partition (150) is accessed.

In STEP 830, elements in the facet store corresponding to the first set of matching document identifiers are searched to identify a set of facets within the facet category. For example, referring to FIG. 1F and assuming that only the messages P2 and P7 are included in the first set of matching document identifiers, the real-time search engine (192) searches the elements of the primary facet array (178) and/or the overflow facet array (179) corresponding to the messages P2 and P7.

Relevance scoring of the messages can happen after or concurrently with the search of the query cache in STEP 825. In other words, while the messages with binary attributes matching the binary search term are in the process of being matched, the content of the messages that have already been matched during the process can be searched.

In STEP 835, a count of references from the elements to each facet in the set of facets is calculated. For example, referring to FIG. 1F, for each facet in the inverted facet indices 1-N (171-175), a count of references from the facet store (177) elements is calculated.

In STEP 840, a result set including facet identifiers of a facet of the set of facets is generated based on the count of references. For example, a facet identifier may be included in the result set based on having the highest count of references in comparison to other facet identifiers, having a count of references within a top percentage compared to other facet identifiers, and/or any other criteria for including the facet identifier based on the count of references.

In STEP 845, the result set is returned in response to the search request. For example, a partition of the partition (120) returns the result set in response to the search request to the search fanout module (115).

In one or more embodiments of the invention, a method for search (e.g., in a messaging platform) includes STEPs 800-860 of FIG. 8A and STEPs 810-845 of FIG. 8B. For example, STEPs 800 and 805 of FIG. 8A can be first executed, followed by the execution of STEPs 810-845 of FIG. 8B, and then followed by the execution of STEPs 850-860 of FIG. 8A. It should be appreciated that in one or more embodiments of the invention, the steps of FIG. 8A can be executed by the same or a different module from the module executing the steps of FIG. 8B.

Figure 9A:
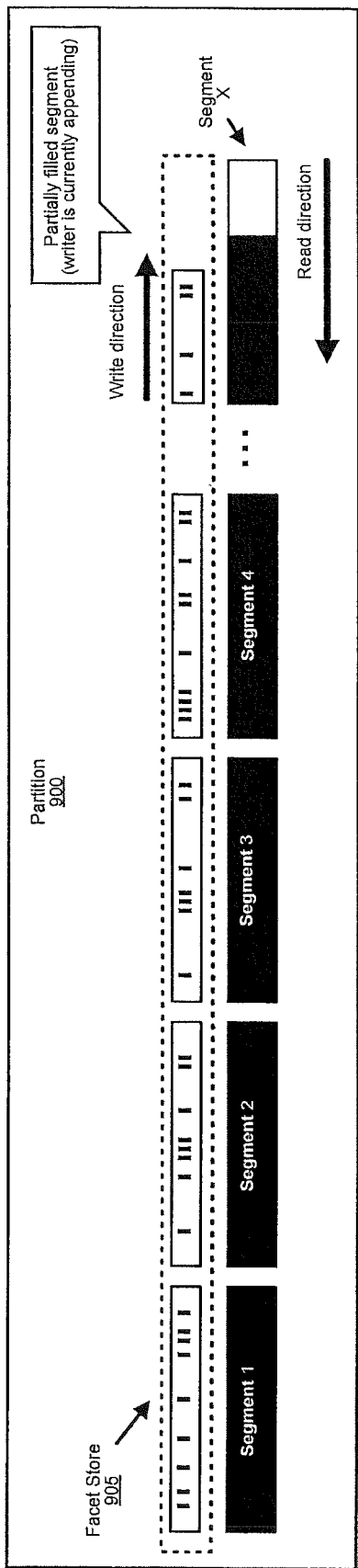
FIGS. 9A-9C show example schematic diagrams of a partition in accordance with one or more embodiments of the invention.
Figure 9B:
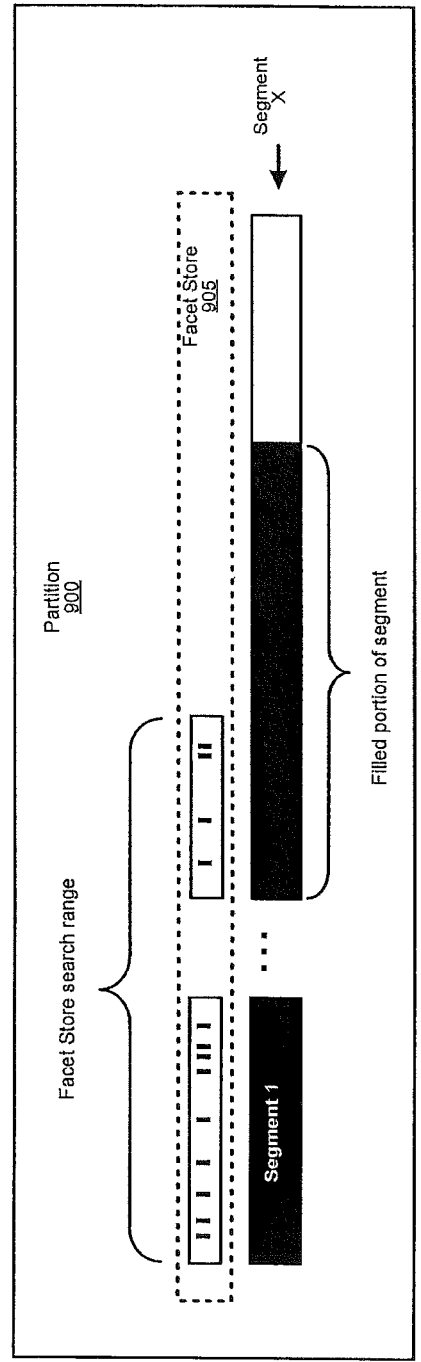
Figure 9C:
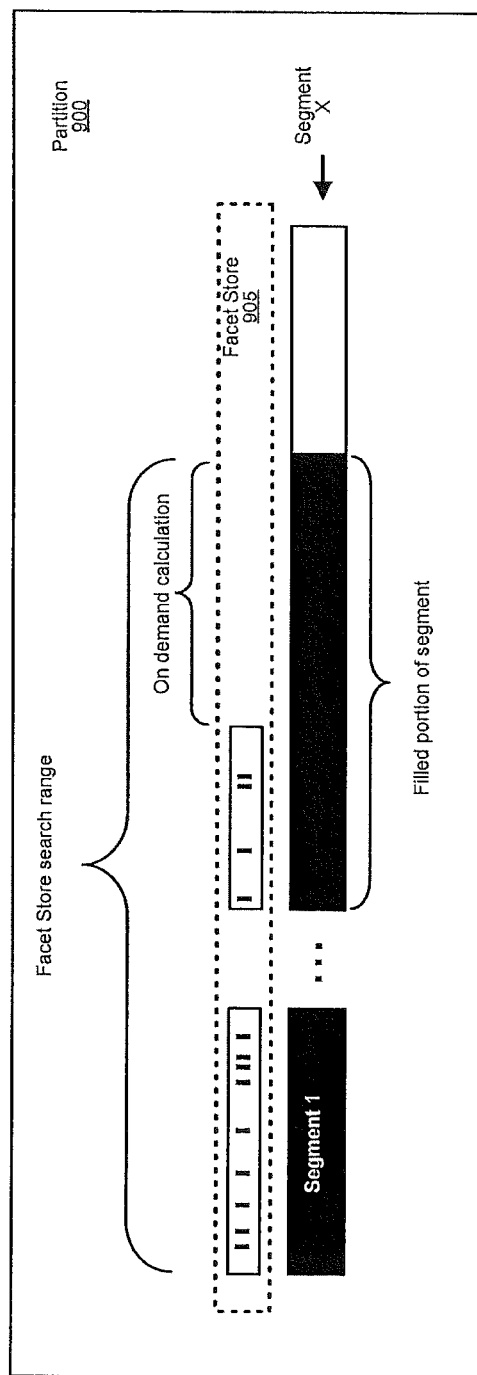

FIGS. 9A-9C depict an example of a partition (900) containing multiple segments and a facet store (905). In this example, a writer thread of the partition begins indexing a new time slice of messages to segment X. As the writer thread writes new document identifiers to a postings list of the segment, a background process follows the writer thread (with a slight lag) in order to populate query cache values for the newly written postings. FIGS. 9A and 9B depict a state of the partition (900) at this point in the example.

Continuing the example, a real-time search engine of the partition (900) receives a search request containing two search terms. In this example, the first search term is the word "badminton" and the second search term is the images facet category, which designates that the searcher is requesting only images that are related to the first search term of "badminton". The real-time search engine initially identifies a last update identifier indicating a last update point of the facet store (905) as well as a last written document identifier designating a position of the single writer thread of the partition. Based on the last update point and the position of the writer thread at that time, the real-time search engine requests an on demand population of the facet store (905) up until the identified position of the writer thread. The background process populates the facet store (905) up until the requested point and the real-time search engine proceeds to search the facet store (905) in reverse chronological order (i.e., in reverse order of the write direction, see FIG. 9A) after the on demand population is complete. FIG. 9C depicts a state of the partition (900) at this point in the example.

Continuing the example, the real-time search engine searches the segment to identify documents matching the first search term. When matching documents are identified, the real-time search engine then proceeds to read the elements in the facet store (905) corresponding to the matching documents to identify a set of images based on the images facet category. After identifying a number of facet identifiers (e.g., 10,000) of such images, the partition (900) calculates a reference count for each facet identifier. The reference count is a count of references to an image from the searched elements of the facet store (905) (i.e., elements corresponding to messages matching the first search term). The partition (900) then selects a subset of the 10,000 images (e.g., 20 images) with the highest reference counts for inclusion in a result set, and returns the result set to a search fanout module in response to the search request. The search fanout module aggregates result sets from multiple partitions and then proceeds to select the facets with the highest reference counts for inclusion in a final result set which is returned to a requesting client.

Figure 10:
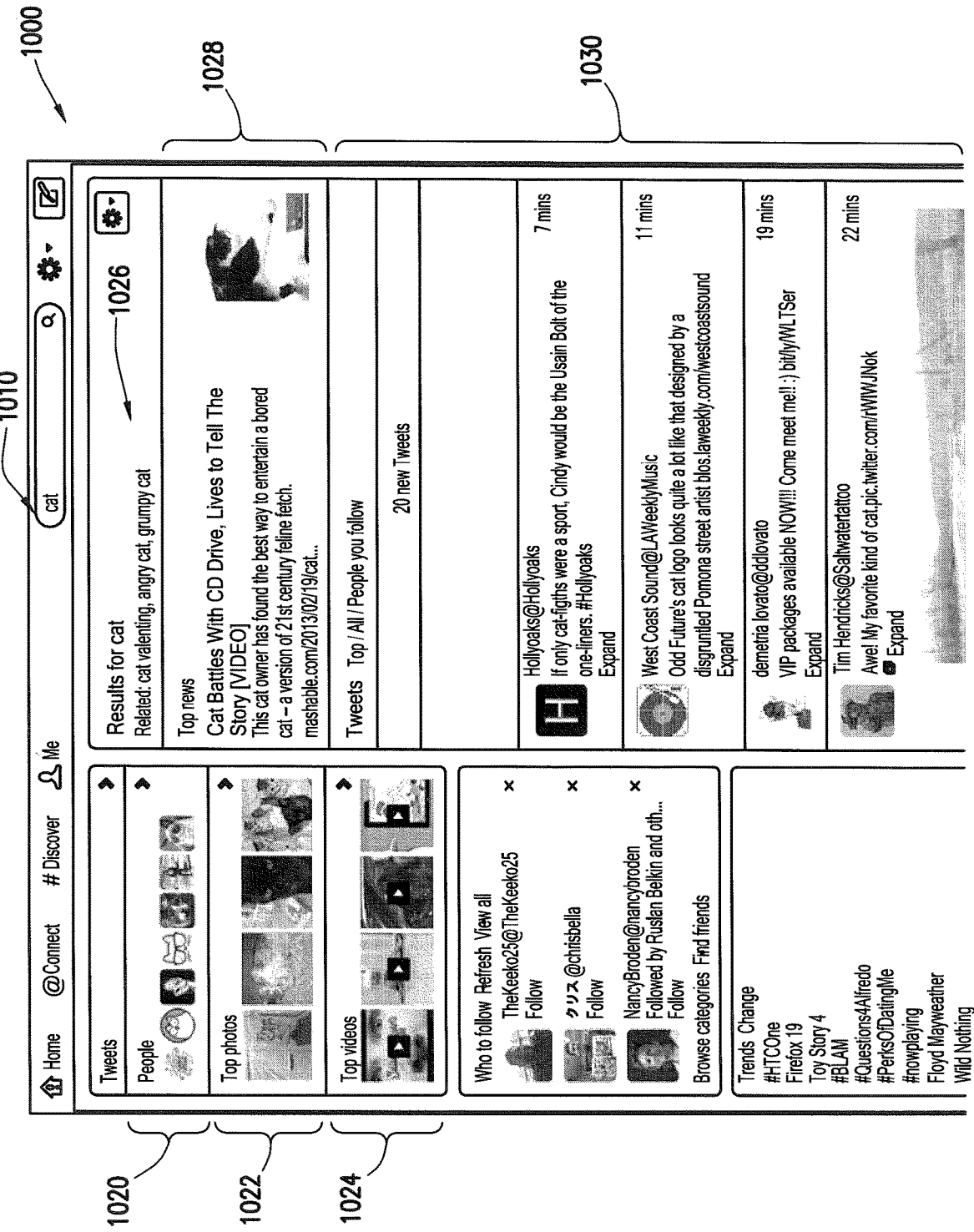
FIG. 10 shows a user interface in accordance with one or more embodiments of the invention.

FIG. 10 shows a user interface in accordance with one or more embodiments of the invention. In one or more embodiments of the invention, the user interface receives a search term (e.g., the search term "cat" in a search box 1010). A client executing the user interface then generates a search request including the search term and sends the request to the messaging platform (100). The search fanout module (115) receives the search request and identifies a set of facet categories associated with the search. The facet categories can be generated by the client or generated automatically by the search fanout module (115) or other component of the messaging platform (100), in accordance with various embodiments. Continuing the example, the search fanout module (115) forks the request into multiple search requests, each including the search term and at least one of the facet categories. The search fanout module (115) then sends each of the forked search requests to a set of partitions (120) for parallel search.

A real-time search engine (192) of each partition receives each of the forked search requests (including the search term and the one or more facet categories). In this example, the facet categories include an images facet category, a videos facet category, a news facet category, a hashtag facet category, and/or an authors facet category.

Continuing the example, the real-time search engine (192) returns result sets for each search request to the search fanout module. The search fanout module then aggregates the result sets for each search request and selects the top results from the aggregated set for inclusion in a final result set. The final result set for each forked request is then sent to the client for display on the user interface. The user interface can then display documents matching the search term (e.g., the messages in the Tweets 1030 section). The user interface can also display facets related to the search term (e.g., by facet category). For example, referring to FIG. 10, the People 1020 section can be displayed and correspond to the authors facet category, the Top photos 1022 section can correspond to the images facet category, the Top videos 1024 section can correspond to the videos facet category, the Related 1026 section can correspond to the hashtag facet category, and the Top news 1028 section can correspond to the news facet category.

Variable Length Document Postings List Format

In general, embodiments of the invention provide a method and system for search in any system including searchable documents, (e.g., messages in a messaging platform, web pages, videos, and/or any other type of document that is searchable). In one or more embodiments, messages posted to a messaging platform are required to be within a maximum length (e.g., character count). In one or more embodiments, hyperlinks and non-textual content can be excluded from a maximum length determination of the message, in accordance with various embodiments. It should be appreciated that one or more embodiments of the invention are discussed with reference to messages in a messaging platform, but that one or more embodiments of the invention can include searchable documents in any platform. A search query including a search term is received from a client. The search term is sent to a set of partitions for parallel searching. Each partition includes a primary postings list including document identifiers of a time slice of messages posted to the messaging platform and an overflow postings list storing additional information about at least a subset of the document identifiers. The partition searches in reverse chronological order of the time slice of messages to score and select at least a subset of the document identifiers. A result set is returned based on the search.

In one or more embodiments of the invention, the real-time search engine (192) includes functionality to search one or more of the segments to identify document identifiers of messages based on one or more search terms. The real-time search engine (192) can be configured to identify a pre-defined number of matching document identifiers for each search query. Thus, in one example, if the search terms are extremely prevalent, the real-time search engine can identify the first 10,000 document identifiers for analysis. Identification of the matching document identifiers can be based on any search syntax, in accordance with various embodiments of the invention. For example, the terms "pink elephant" (including quotations) can require the entire phrase to be present, while the same terms without the quotations can require the separate terms to exist anywhere within the same message.

In one or more embodiments of the invention, the real-time search engine (192) includes functionality to rank the document identifiers in order of the calculated relevance scores. The real-time search engine (192) can be configured to select a predefined number of the highest ranked document identifiers for returning to the search fanout module (115). Thus, the search fanout module (115) can be configured to receive sets of matching document identifiers from any number of partitions.

In one or more embodiments of the invention, the real-time search engine (192) is a software application or a set of related software applications configured to execute on one or more hardware processors. The real-time search engine (192) can include one or more reader threads configured to perform multiple concurrent searches of the partition (150). The real-time search engine (192) can be a component of a service-oriented architecture (SOA) application and can be configured to facilitate communication between the partition (150) and one or more other components of the messaging platform (100). In one or more embodiments of the invention, one or more components of the real-time search engine (192) reside in cloud computing application in a network distributed system. In one or more embodiments of the invention, the real-time search engine (192) is integrated within or operatively connected to one or more other components of the messaging platform (100).

FIG. 11 shows an example modification to the system of FIG. 1H, in accordance with one or more embodiments of the invention. As shown in FIG. 11, the segment (199) can include a dictionary (193), one or more parallel arrays (197) (e.g., text reference (194), primary postings reference (195), overflow postings reference (198A), overflow postings reference (198B), frequency (196), etc.), a primary postings list with one or more postings pools (e.g., primary postings pools 1-X), and an overflow postings list with one or more postings pools (e.g., overflow postings pools 1-X). Similar to FIG. 1H, various components of the segment (199) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention. Common elements of the segment (199) of FIG. 11 are discussed with regard to FIG. 1H (above).

In one or more embodiments of the invention, the postings pools of the primary postings list and the overflow postings list include one or more sections of postings (e.g., sections A-N). Each postings pool may include a fixed section size. In one or more embodiments of the invention, the fixed section sizes of the postings pools increase with each subsequent postings pool (beginning with the lowest level postings pool, postings pool 1). The increase between adjacent postings pools may be either a fixed amount, an exponential amount, and/or customized based on performance/design/resource constraints. In the example of FIG. 11, each section in postings pool 1 can store up to two postings. Thus, in this example, section A has a size of 2. Continuing the example, postings pool 2 has a section size of 2^4 or 16, postings pool 3 has a section size of 2^7 or 128, and postings pool X has a section size of 2^11 or 2048. Any section size may be chosen and any number of postings pools may be utilized, in accordance with various embodiments of the invention. Each postings pool can include a maximum of 1 section for each term in the dictionary (193), with the exception of the last (i.e., highest level) postings pool (e.g., postings pool X). The last postings pool can include any number of sections for a single term in the dictionary (193). It should be appreciated that while the primary postings list and the secondary postings list can share a similar or the same structure, the contents of each list may be different, as well as the structure of components that store the contents and constitute the postings lists. Furthermore, in one or more embodiments, the primary postings list and the overflow postings list can be configured with different fixed section sizes in their corresponding postings pools.

In one or more embodiments of the invention, similar to the discussion of FIG. 1H, each section includes one or more postings. For example, the postings can be implemented as 32 bit binary values, with a 24 bit document identifier portion and an 8 bit text position portion. In this example, the maximum number of document identifiers that each segment can store is 16,777,216 (i.e., $2^{24}$). As discussed with regard to FIG. 1H, the postings may be implemented as a fixed length binary value (discussed above) or may utilize delta encoding. Thus, the real-time search engine can be configured to utilize fixed length encoding of the entire document identifiers to traverse the postings pools in reverse chronological order (i.e., latest additions searched first).

In one or more embodiments of the invention, the writer thread of each partition includes functionality to identify one or more terms within the message. The writer thread may then identify some or all of the terms in the dictionary (193). If a term does not exist in the dictionary (193), the writer thread may be configured to add it to the dictionary (193). The writer thread may then add a posting including a document identifier of the message to one of the postings pools and may reference the posting by the dictionary entry and/or one or more of the parallel arrays (197). The writer thread can be configured to add the posting to the lowest level non-full section corresponding to the dictionary term. In other words, the writer thread first checks postings pool 1 for a section corresponding to the term. If a section does not exist for the term, the writer thread adds the section to postings pool 1 and then adds the new posting to that section. If a section does exist, the writer thread checks to see if the section is full. If the section is not full, the writer thread adds the new posting to the section. If the writer thread determines that the section is full, the new posting is added to the next lowest level postings pool with a non-full section (or no section). Upon reaching the last postings pool (i.e., primary postings pool X or overflow postings pool X in FIG. 11), new (i.e., higher level) sections are allocated within the same postings pool (e.g., sections D and E of primary postings pool X or overflow postings pool X in FIG. 11).

In one or more embodiments of the invention, similar to the discussion of FIG. 1H, each of the postings pools can be implemented as one or more blocks which are fixed-size dynamically allocated objects in heap memory. It should be appreciated that a block discussed in this paragraph is different from an overflow block.

In one or more embodiments of the invention, the primary postings reference array (195) includes, for each term in the dictionary (193), a single reference to the highest level section corresponding to the term in the postings pools (e.g., in primary postings pool X of FIG. 11). In one or more embodiments of the invention, the frequency array (196) identifies, for each term, a number of messages containing the term. In one or more embodiments of the invention, the overflow postings reference array (198A) includes, for each term in the dictionary (193), a single reference to the highest level section corresponding to the term in the postings pools (e.g., in overflow postings pool X of FIG. 11). In one or more embodiments of the invention, the overflow postings reference array (198B) includes, for each term in the dictionary (193), a single reference to the lowest level section corresponding to the term in the postings pools (e.g., in overflow postings pool 1 of FIG. 11).

In one or more embodiments of the invention, one or more of the components of the segment (199) resides entirely within primary storage (e.g., random access memory) for lower latency. For example, the dictionary (193), one or more of the parallel arrays (197), and/or one or more of the postings pools may reside entirely within primary storage. Alternatively, in one or more embodiments of the invention, one or more of the older segments (i.e., segments storing older time slices) of a partition may reside, either partially or entirely, within secondary storage (e.g., a hard disk drive, a solid state drive, etc.). Thus, for example, a predefined number of the newest segments (i.e., segments storing the most recent time slices) may reside within primary storage, while any older segments reside within secondary storage or a combination of primary and secondary storage (e.g., virtual memory).

FIGS. 12A-12F depict an example of a primary postings list and an overflow postings list in accordance with one or more embodiments of the invention. In this example, the primary postings list includes 4 primary postings pools in a single segment of a partition. Primary postings pool 1 has a fixed section size of $1^2$ (or 2), primary postings pool 2 has a fixed section size of $2^2$ (or 4), primary postings pool 3 has a fixed section size of $2^3$ (or 8), and primary postings pool 4 has a fixed section size of $2^4$ (or 16). The overflow postings list includes 4 overflow postings pools in the segment of the partition. Overflow postings pool 1 has a fixed section size of $1^2$ (or 2), overflow postings pool 2 has a fixed section size of $2^2$ (or 4), overflow postings pool 3 has a fixed section size of $2^3$ (or 8), and overflow postings pool 4 has a fixed section size of $2^4$ (or 16). In one or more embodiments, the primary postings list and/or the overflow postings list can include more or less postings pools. In one or more embodiments, each primary postings pool and/or overflow postings pool can include a larger or smaller fixed section size than discussed above. The segment also includes a dictionary and a set of parallel arrays (not shown) associated with the postings pools.

Figure 12A:
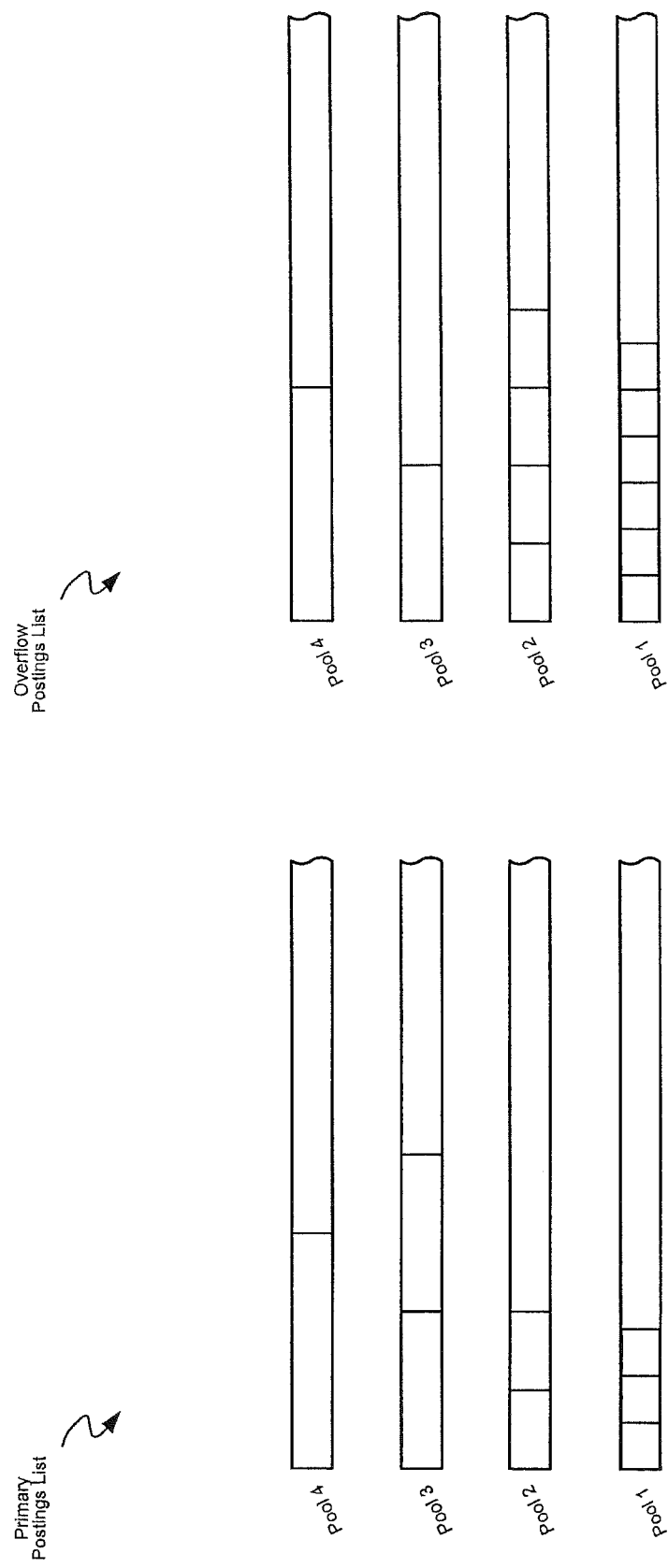
FIGS. 12A-12F depict an example of a primary postings list and an overflow postings list in accordance with one or more embodiments of the invention.

Continuing the example, initially, a writer thread begins populating the primary postings list with document identifiers of a current time slice of messages. At some point, the writer thread parses a first message and identifies a term that does not yet exist in the dictionary. FIG. 12A depicts a state of the postings pools at this point in the example.

Continuing the example, the writer thread adds the new term to the dictionary, allocates a new section in the lowest level primary postings pool (i.e., primary postings pool 1) for the term, and adds a primary posting storing a document identifier corresponding to the first message. If the writer thread identifies the term in a second message, the writer thread adds a second primary posting storing a document identifier corresponding to the second message. If the writer thread identifies more than one occurrence of the term in the second message, the writer thread allocates a new section in the lowest level overflow postings pool (i.e., overflow postings pool 1) for the term and adds an overflow posting storing a document identifier corresponding to the additional occurrence. In one or more embodiments of the invention, an overflow posting can also be created for some documents including only a single occurrence of the term. This functionality and associated embodiments of the invention are described further below.

Figure 12B:
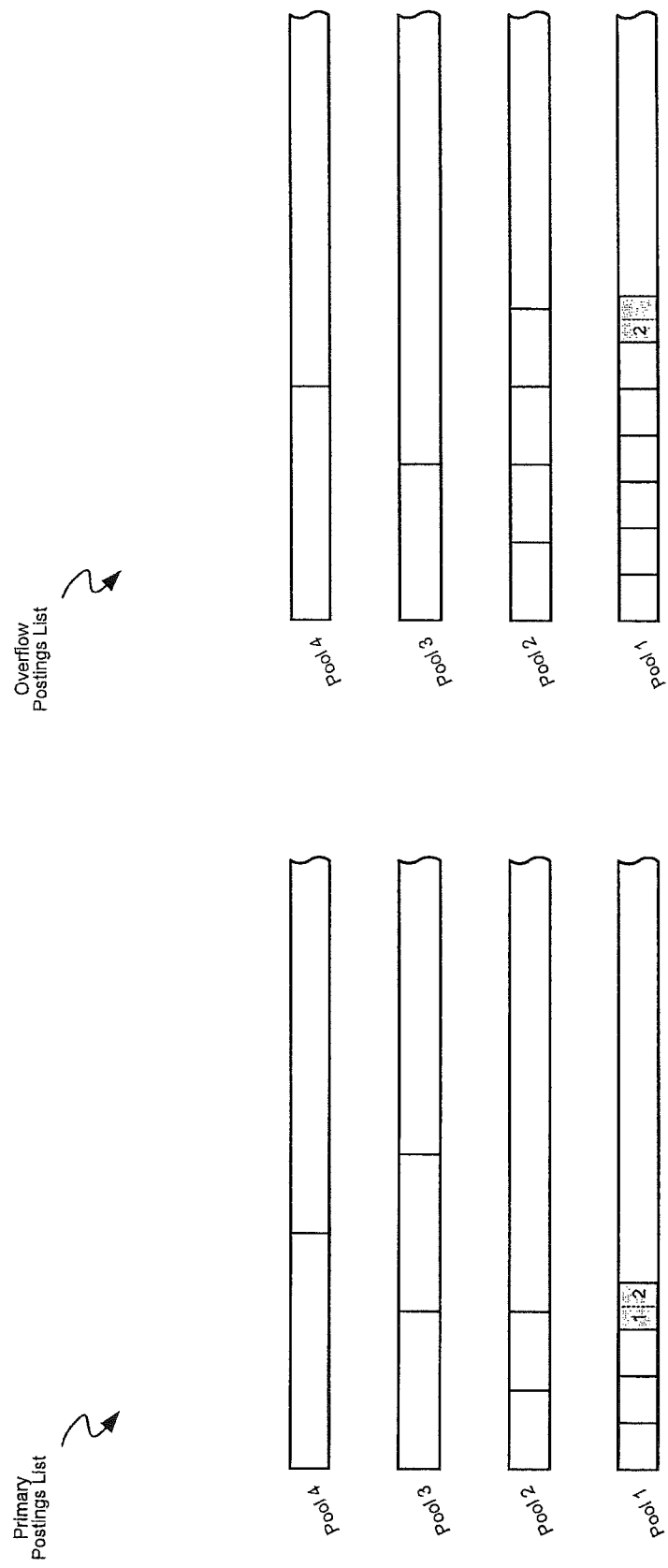

FIG. 12B depicts a state of the postings pools at this point in the example. The primary postings pool 1 stores a document identifier corresponding to one occurrence of the term in a first document (denoted by the number '1') and a document identifier corresponding to one occurrence of the term in a second document (denoted by the number '2'). The overflow postings pool 1 stores a document identifier corresponding to a second occurrence of the term in the second document (denoted by the number '2').

As the writer thread continues writing the document identifiers of the current time slice, the term is identified within 3 more messages. The writer thread adds a document identifier corresponding to one occurrence of the term in the 3rd, 4th, and 5th documents in the primary postings pool 2. If any of the additional messages contain more than one occurrence of the term, the writer thread adds additional overflow postings storing document identifier corresponding to the additional occurrence(s). If the most recently allocated section of the overflow postings pool corresponding to the term has filled or fills to capacity (i.e., 2 entries), the writer thread allocates a new section in the next lowest level overflow postings pool not containing a section for the term (i.e., overflow postings pools 2 and 3) in order to store the additional overflow postings.

Figure 12C:
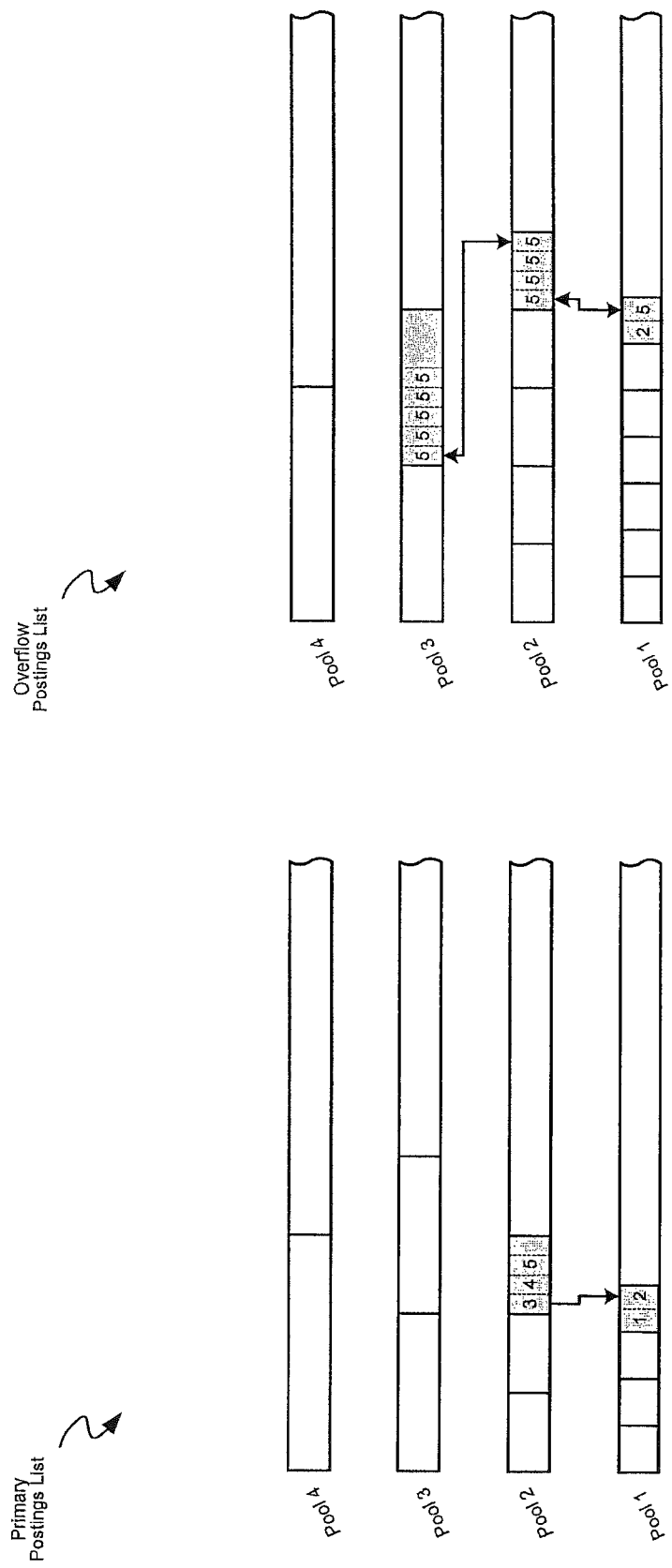

FIG. 12C depicts a state of the postings pools at this point in the example. The primary postings pool 2 stores document identifiers corresponding to occurrences of the term in the 3 additional documents (denoted by the numbers '3', '4', and '5'). Because the 5th document contains multiple occurrences of the term, the overflow postings pool 1 stores a document identifier corresponding to an additional occurrence of the term in the 5th document (continued to be denoted by the number '5'). Because the newly allocated section of overflow postings pool 1 fills to capacity (i.e., 2 entries), the writer thread allocates a new section in the next lowest level overflow postings pool not containing a section for the term (i.e., overflow postings pool 2). The writer thread adds additional overflow postings storing document identifiers corresponding to the additional occurrences in the 5th document (continued to be denoted by the number '5'). Similarly, because the newly allocated section of overflow postings pool 2 fills to capacity (i.e., 4 entries), the writer thread allocates a new section in the next lowest level overflow postings pool not containing a section for the term (i.e., overflow postings pool 3). The writer thread adds additional overflow postings storing document identifiers corresponding to the additional occurrences in the 5th document (continued to be denoted by the number '5').

After the writer thread identifies further messages containing the term, the writer thread allocates new sections in the next lowest level primary postings pool and overflow postings pool not containing a section for the term (i.e., primary postings pool 3 and overflow postings pools 3 and 4). The writer thread adds additional primary postings storing document identifiers corresponding to the additional messages.

Figure 12D:
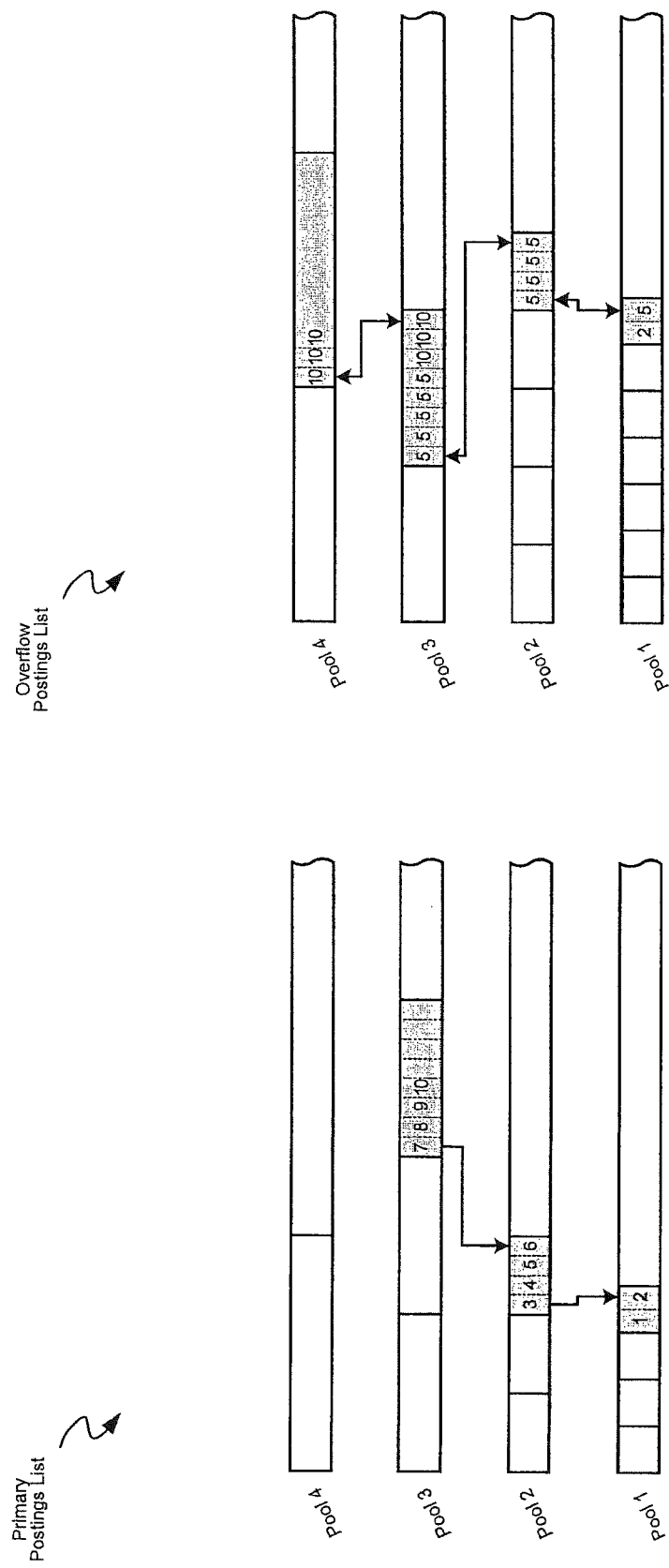
Figure 12E:
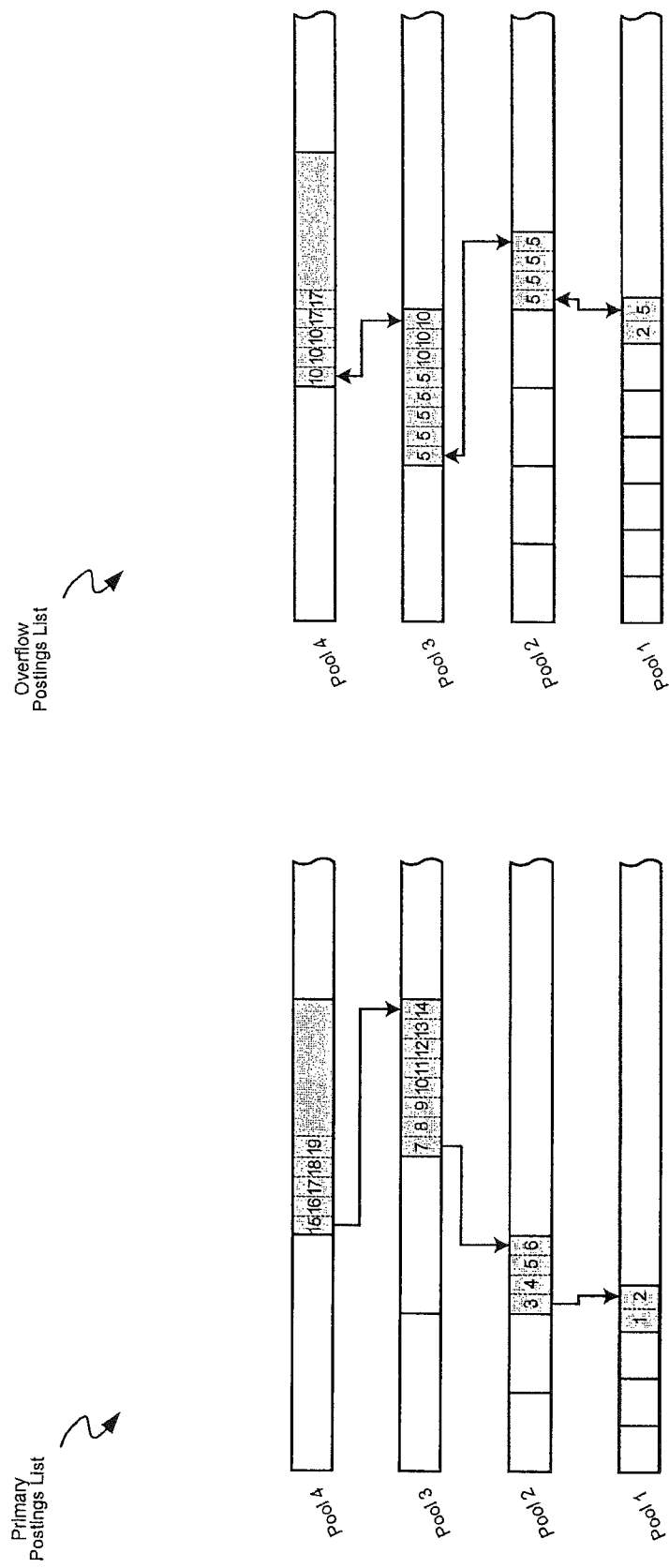

FIGS. 12D and 12E depict the addition of new sections until the highest level section (in primary postings pool 4 and overflow postings pool 4) reaches capacity. In the example, the writer thread identifies the term in additional messages, denoted by the numbers '7' through '19'. The writer thread adds entries corresponding to those documents in the primary postings list. Because the 10th and 17th documents contain more than one occurrence of the term, the writer thread adds entries corresponding to those documents in the overflow postings list. Again, in one or more embodiments, depending on a position of the term within the document and/or other factors, an overflow posting can be required for documents including only 1 occurrence of the term. This is described in further detail below.

Figure 12F:
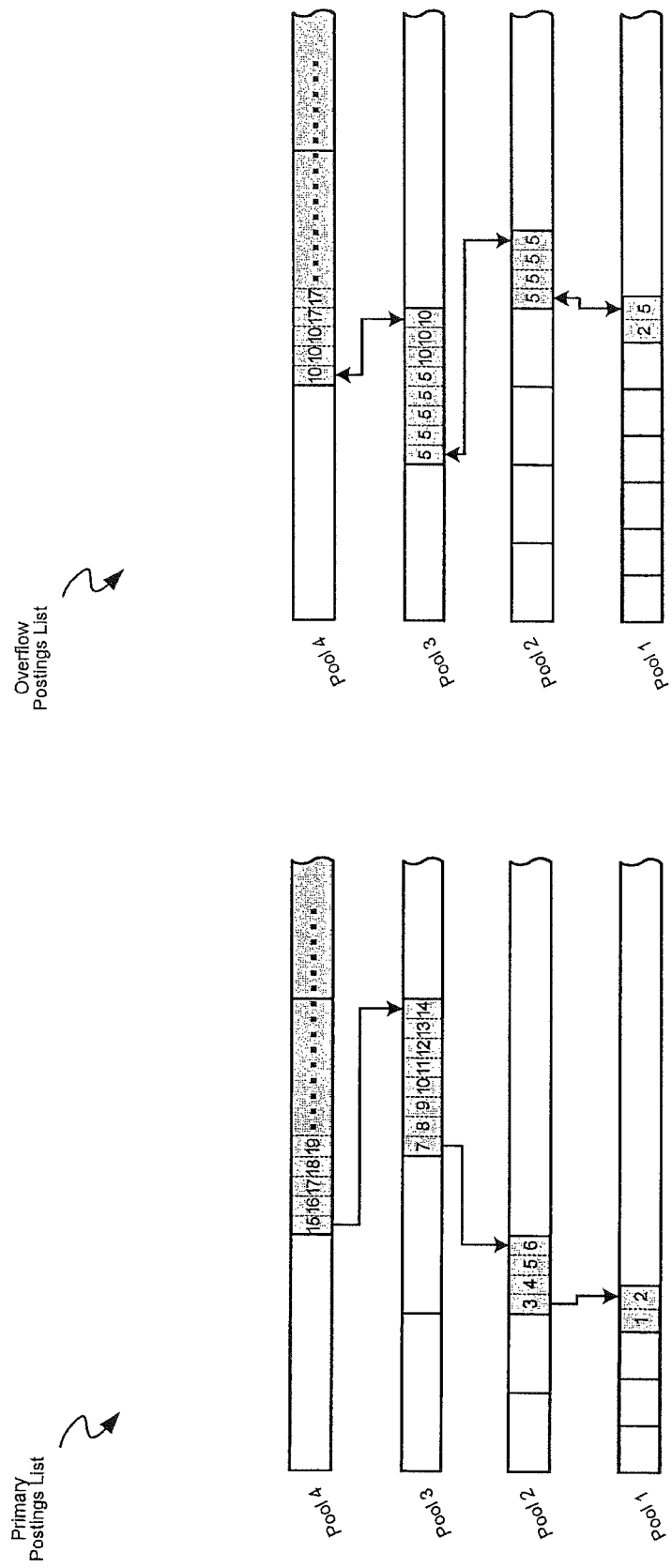

At this point in the example, upon encountering additional messages containing the term, the writer thread allocates a new section in the last postings pools (primary postings pool 4 and secondary postings pool 4). FIG. 12F depicts a state of the postings pools at this point in the example. In this manner, any number of sections can be allocated to the primary postings pool 4 and the overflow postings pool 4 for the given term.

In one or more embodiments of the invention, each section in the postings pools is an ordered list of document identifiers stored chronologically in their broadcast order. In one or more embodiments of the invention, the sections in the primary postings pools include a reference to the next-lower section in the primary postings pool storing document identifiers for the same term. In one or more embodiments of the invention, the sections in the overflow postings pools include a reference to the next-lower section and/or the next-higher section in the overflow postings pool storing document identifiers for the same term.

In one or more embodiments of the invention, an inverted index segment includes a primary postings list. For example, as discussed with relation to FIG. 1C, each segment (e.g., segments 1-X) includes an inverted message index, in FIG. 12F, a segment includes the primary postings list. In one or more embodiments of the invention, the primary postings list includes a primary posting for each document of a time slice of documents. For example, as discussed with relation to FIG. 1C, each segment (e.g., segments 1-X) stores one or more time slices of messages posted to the messaging platform. Or, in FIG. 12F, the primary postings list includes a primary posting for each document in a time slice of documents. The primary posting stored by a primary postings list and/or a primary postings pool can be in the form of the primary posting (1381) of FIG. 13A.

In one or more embodiments of the invention, each primary posting of the primary postings list includes a document identifier corresponding to a document. For example, in FIG. 13A, the primary posting (1381) includes document identifier bit(s) (1382) that can store a unique identifier of a document. With reference to FIGS. 12A-12F, document identifier bit(s) (1382) of each primary posting (1381) store a document identifier corresponding to a message (e.g., a message containing a particular term).

In one or more embodiments of the invention, each primary posting of the primary postings list includes a configurable portion. For example, in FIG. 13A, the term position bit(s) or term occurrence bit(s) (1383) can be configurable to either store term position bit(s) or term occurrence bit(s). In one or more embodiments of the invention, when the configurable portion stores term position bit(s), the term position bit(s) store a text position value representing a location of a term within a document referenced by the document identifier bit(s) (1382).

In one or more embodiments of the invention, when the configurable portion stores term occurrence bit(s) (1383), the term occurrence bit(s) (1383) store an occurrence value representing a number of occurrences of a term within a document referenced by the document identifier bit(s) (1382). If the occurrence value is too large to be stored by the term occurrence bit(s) (1383), the term occurrence bit(s) (1383) can store a value indicating that the occurrence value is stored elsewhere. For example, if the term occurrence bit(s) (1383) include 7 bits, the term occurrence bit(s) (1383) can only store values ranging from 0 to 127 ($2^7$). If the occurrence value is 127 or larger, a value of 127 can be stored in the term occurrence bit(s) (1383), which indicates that the occurrence value is stored elsewhere. Accordingly, the occurrence value can be stored in term occurrence bit(s) (1389A) in the overflow postings block, discussed above.

In one or more embodiments of the invention, each primary posting of the primary postings list includes a primary posting type flag indicating whether the configurable portion stores the text position value or the occurrence value. For example, in FIG. 13A, when the type flag bit(s) (1384) store a value of '0', the configurable portion stores term position bit(s). When the type flag bit(s) (1384) store a value of 1', the configurable portion stores term occurrence bit(s).

In one or more embodiments of the invention, the inverted index segment includes an overflow postings list including a set of overflow blocks. For example, in FIG. 12F, a segment includes an inverted message index and the segment includes the overflow postings list. The overflow postings list includes overflow postings associated with a common document in an overflow block of that document. For example, in FIG. 12F, the overflow postings list includes an overflow block for document '2' in the overflow postings pool 1, an overflow block for document '5' spanning overflow postings pools 1, 2, and 3, an overflow block for document '10' spanning overflow postings pools 3 and 4, and so on.

In one or more embodiments of the invention, each of the set of overflow blocks corresponds to at least one occurrence of a term in an associated document of the time slice of documents. For example, in FIG. 12F, the overflow block for document '2' corresponds to a second occurrence of a term in document '2' and the overflow block for document '5' corresponds to additional occurrences of the term in document '5'. The overflow block for document '5' corresponds to the first entry of the number '5' in the overflow postings pool 1, through the additional entries of the number '5' in the overflow postings pool 2, to the additional entries of the number '5' in the overflow postings pool 3. The overflow block for document '10' corresponds to the first entry of the number '10' in the overflow postings pool 3 through to the additional entries of the number '10' in the overflow postings pool 4, In one or more embodiments of the invention, each overflow block of the set of overflow blocks includes overflow postings corresponding to a primary posting in the primary postings list. For example, in FIG. 12F, the overflow blocks in the overflow postings list can include overflow postings corresponding to at least one primary posting in the primary postings list. More specifically, the overflow posting for document '2' corresponds to the primary posting for document '2' in the primary postings pool 1, the overflow postings for document '5' correspond to the primary posting for document '5' in the primary postings pool 2, the overflow postings for document '10' correspond to the primary posting for document '10' in the primary postings pool 3, and so on. Accordingly, one or more overflow postings in an overflow block can store additional occurrences and/or other attributes of a term contained by a document with a primary posting in the primary postings list.

In one or more embodiments of the invention, each overflow posting includes a delta-position value indicating a position of a term within a document. For example, in FIG. 13B, the overflow postings (1385) includes one or more term position bit(s) (1386) indicating a position of the term within an associated document. Because an overflow postings block can store more than one overflow posting for more than one occurrence of a term, more than one set of term position bit(s) (1386) corresponding to each occurrence may be stored contiguously. Each of the set of term position bit(s) (1386) can store a delta-position value indicating a difference in position between a current term occurrence and a previous or next term occurrence. A set of term position bit(s) (1386) can include more or less bits than another set of term position bit(s) (1386) if such an amount of bits are necessary to store the delta-position value. In order to enable variable size term position bit(s), the term position can be stored as a variable-length integer.

In one or more embodiments of the invention, each overflow posting includes a payload attribute storing information about an occurrence of the term within the document and/or a payload length indicating a size of the payload attribute. For example, in FIG. 13C, the overflow postings (1385) includes term position bit(s) (1386) as well as payload length bit(s) (1387) and payload bit(s) (1388). The payload bit(s) (1388) can store attributes of an occurrence of the term (e.g., a font typeface, a font color, a term visibility attribute, font formatting characteristics, etc.). The payload bit(s) (1388) can include more or less bits than another set of payload bit(s) (1388) if such an amount of bits are necessary to store the payload attribute. The payload length bit(s) (1387) are optional, and can indicate a size of the payload attribute. In one or more embodiments of the invention, if no payload length bit(s) are present, a predefined default payload length value is assumed. In order to enable variable size payload length bit(s) (1387), the payload length can be stored as a variable-length integer.

In one or more embodiments of the invention, term occurrence bit(s) (1389A) can be stored in the overflow block, wherein the term occurrence bit(s) (1389A) store an occurrence value representing a number of occurrences of a term within a document. Because an overflow postings block can store more than one overflow posting for more than one occurrence of a term, more than one set of term position bit(s) (1386), payload length bit(s) (1387), and payload bit(s) (1388) corresponding to each occurrence may be stored contiguously. Block length bit(s) (1389B) can indicate the size of an overflow block. As a result, fast skipping of an entire block is allowed since the size of the block is known (e.g., as opposed to traversing the entire block to reach an end of the block). It should be noted that term occurrence bit(s) (1389A) and/or block length bit(s) (1389B) can be used with the one or more term position bit(s) (1386) of FIG. 13B.

In one or more embodiments of the invention, the primary postings list includes a first level postings pool including a set of first level sections each configured to store at least one first level primary posting. For example, in FIG. 12F, the primary postings list includes a first level postings pool (i.e., primary postings pool 1) including sections configured to store first level primary postings (e.g., postings corresponding to documents '1' and '2'). In one or more embodiments of the invention, the primary postings list includes a last level postings pool including a set of last level sections each larger than each of the plurality of first level sections. For example, in FIG. 12F, the primary postings list includes a last level postings pool (i.e., primary postings pool 4), where the sections of the primary postings pool 4 are larger than the sections of the primary postings pool 1 (e.g., a section in the primary postings pool 4 has capacity for 16 postings while a section in the primary postings pool 1 has capacity for 2 postings).

In one or more embodiments of the invention, the overflow postings list includes a first level postings pool comprising a set of first level sections each configured to store at least one first level overflow posting. For example, in FIG. 12F, the overflow postings list includes a first level postings pool (i.e., overflow postings pool 1) including sections configured to store first level overflow postings (e.g., postings corresponding to documents '2' and '5'). In one or more embodiments of the invention, the overflow postings list includes a last level postings pool including a set of last level sections each larger than each of the set of first level sections. For example, in FIG. 12F, the overflow postings list includes a last level postings pool (i.e., overflow postings pool 4), where the sections of the overflow postings pool 4 are larger than the sections of the overflow postings pool 1 (e.g., a section in the overflow postings pool 4 has capacity for 16 postings while a section in the overflow postings pool 1 has capacity for 2 postings).

In one or more embodiments of the invention, a real-time search engine includes functionality to receive a search request including a search term. For example, referring to FIG. 1A, the search fanout module (115) can receive a search request including a search term from the client (105) (e.g., by way of the frontend module (110)), and the real-time search engine is configured to receive the search request from the search fanout module (115).

In one or more embodiments of the invention, the real-time search engine includes functionality to search, based on the search term, the primary postings list in reverse chronological order of the time slice of documents to identify a set of primary postings. In other words, the real-time search engine (192) begins searching the most recent messages first and searches older messages as it continues to search. The real-time search engine (192) can identify the set of primary postings based on the search term. For example, in FIG. 11, the real-time search engine (192) can access the primary postings reference (195) corresponding to an entry of the search term in the dictionary (193). Based on the primary postings reference (195), the real-time search engine (192) can identify a set of primary postings corresponding to the search term (e.g., a set of primary postings containing the search term). For example, in FIGS. 11 and 3, the real-time search engine (192) can identify the shaded sections in the primary postings pools (e.g., sections A-E or the sections with document numbers, respectively). In one example, in FIG. 12F, the real-time search engine (192) begins searching the most recent messages in the primary postings pool 4 first (e.g., beginning from the right side of the primary postings pool 4, through messages '19', '18,' '17', and so on).

In one or more embodiments of the invention, the real-time search engine includes functionality to identify an overflow block in the overflow postings list for each of at least a subset of the primary postings. For example, in FIG. 12F, the real-time search engine (192) is configured to identify the overflow block in the overflow postings list, corresponding to the primary posting of document '2', that includes the overflow postings for document '2'. In another example, the real-time search engine (192) is configured to identify the overflow block corresponding to the primary posting of document '5', that includes the overflow postings for document '5'. In yet another example, the real-time search engine (192) is configured to identify the overflow block in the overflow postings list, corresponding to the primary posting of document '10', that includes the overflow postings for document '10'.

In one or more embodiments of the invention, the real-time search engine includes functionality to determine, based on term occurrence bits of a primary posting, a number of repeat occurrences of the search term within a document corresponding to the primary posting. For example, referring to FIG. 13A, the real-time search engine (192) can access the type flag bit(s) (1384) of each primary posting (1381) to determine whether the term position bit(s) or term occurrence bit(s) (1383) are configured to store term position bit(s) or term occurrence bit(s). If the type flag bit(s) (1384) indicate that term occurrence bit(s) are stored, the real-time search engine (192) can determine based on an occurrence value stored by the occurrence bit(s) (1383) that the document referenced by the document identifier bit(s) (1382) includes at least one repeat occurrence of the search term.

In one or more embodiments of the invention, the real-time search engine includes functionality to determine, for a primary posting of the subset, a location of the overflow block in the overflow postings list. In one or more embodiments of the invention, the real-time search engine includes functionality to identify, in the primary postings list, a skip point within proximity of the primary posting to determine the location of the overflow block.

Figure 14:
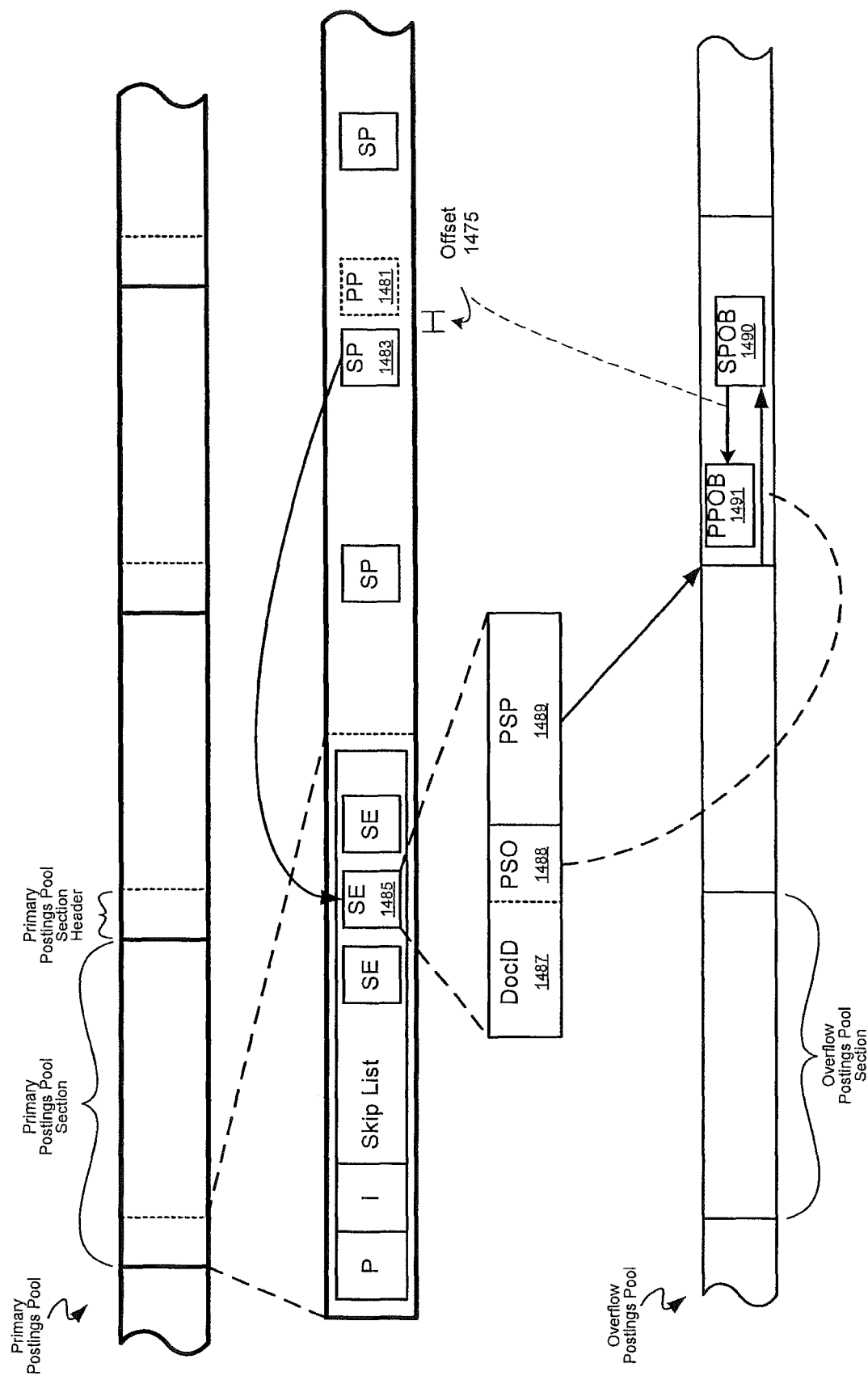
FIG. 14 depicts an example of a section header, a skip point, and a skip entry in accordance with one or more embodiments of the invention.

For example, referring to FIG. 14, a primary postings pool includes a primary postings pool section that includes a primary postings pool section header. FIG. 14 depicts a magnified view of a primary postings pool section header as well as a magnified portion of an associated primary postings pool section. The primary postings pool section header can include a section pointer "P" to a last element of a preceding section, a section index "I" of the current section within the current postings lists, and a skip list. The skip list can include one or more skip entry elements "SE". The primary postings pool section can include one or more skip points "SP". The skip points can be uniformly spaced within the primary postings pool section. The skip points can be primary postings that are designated as skip points.

Each skip entry element can correspond to each skip point. For example, the first skip entry can correspond to the first skip point, the second skip entry can correspond to the second skip point, and so on. In one example, the real-time search engine (192) can identify for a primary posting (1481) within the primary postings pool section, a skip point (1483) within proximity of the primary posting (1481).

In one or more embodiments of the invention, only a subset of the postings pools include skip entry elements and skip points. For example, the system can be configured so that only last level sections (sections of the last level postings pool) include skip entry elements and skip points. For example, the primary postings pool of FIG. 14 can be the last level postings pool for the associated primary postings list.

In one or more embodiments of the invention, the real-time search engine includes functionality to access, in the primary postings list, a skip entry element corresponding to the skip point, where the skip entry element stores a reference to the location of the overflow block. For example, in FIG. 14, the real-time search engine (192) can access a skip entry element (1485) corresponding to the skip point (1483). The skip entry element (1485) can correspond to the skip point (1483) in that they are both the second skip entry element and skip point, respectively.

In one or more embodiments of the invention, the real-time search engine includes functionality to determine the location of the overflow block in the overflow postings list based on the skip entry element. For example, referring to FIG. 14, the skip entry element (1485) can include a document identifier "DocID" (1487) portion, a posting section offset "PSO" (1488) portion, and a posting section pointer "PSP" (1489) portion. The document identifier (1487) can be a unique identifier of a document referenced by the corresponding skip point (e.g., skip point (1483)). The posting section pointer (1489) can reference the beginning of an overflow postings pool section that contains an overflow block for the document associated with the skip point (1483) (i.e., the document referenced by the document identifier (1487)). The posting section offset (1488) can indicate the beginning of the overflow block relative to the beginning of the overflow postings pool section. For example, the skip point overflow block (1490), corresponding to the skip point (1483), can be accessed based on the posting section pointer (1489) and the posting section offset (1488) stored by the corresponding skip entry element (1485).

In one or more embodiments of the invention, the real-time search engine includes functionality to determine the location of the overflow block in the overflow postings list corresponding to the primary posting based on an offset between the skip point and the primary posting. For example, in FIG. 14, the primary posting (1481) may be separated from the skip point (1483) by an offset (1475). The offset (1475) may be a number of primary postings. The real-time search engine (192) may use the offset (1475) to locate the overflow block (1491) corresponding to the primary posting (1481). For example, based on the number of primary postings indicated by the offset (1475), the real-time search engine (192) can skip forward or backward through the overflow posting pool by a corresponding number of overflow blocks to arrive at the overflow block (1491) corresponding to the primary posting (1481). In one or more embodiments, the real-time search engine (192) can utilize block length bit(s) (1389B) to determine a skip length for each overflow block.

In one or more embodiments of the invention, overflow blocks may be stored by the overflow postings list for all primary postings in a primary postings pool containing skip points and skip entry elements (e.g., all primary postings in a last level primary postings pool). As a result, the real-time search engine (192) can skip backward the same number of overflow blocks as there are primary postings for an offset to reach a particular overflow block.

In one or more embodiments of the invention, the real-time search engine includes functionality to determine, based on a location of the primary posting in the primary postings list, that the overflow block is not referenced by an associated skip entry element. For example, referring to FIG. 12F, the real-time search engine (192) can be configured to determine that a primary posting is located in one of the primary postings pools 1-3. Because, in one or more embodiments, only the last level primary postings pool (e.g., pool 4) may include skip entry elements, a primary posting in the primary postings pools 1-3 may not be in a primary postings pool with skip entry elements.

In one or more embodiments of the invention, the real-time search engine includes functionality to access the overflow postings list at the beginning overflow block for a term. For example, in FIG. 11, the real-time search engine (192) can use overflow postings reference (198B) to access a beginning overflow block for a term. The overflow postings reference (198B) can include, for each term in the dictionary (193), a single reference to the beginning overflow block in the lowest level section corresponding to the term in the postings pools (e.g., in overflow postings pool 1 of FIG. 11). In one or more embodiments of the invention, when a skip entry is available, the real-time search engine (192) is configured to identify an overflow block of a primary posting by traversing the overflow postings list backward from a PSP of the skip entry. Otherwise, if no skip entry is available (e.g., in lower level primary postings pools), the real-time search engine (192) forward-traverses the overflow postings list from a beginning overflow block of a term using overflow postings reference (198B).

In one example, referring to FIG. 12F, based on the location of the primary posting corresponding to document '5' in the primary postings pool 2, the real-time search engine (192) can determine that the overflow block corresponding to document '5' is not referenced by an associated skip entry element. The real-time search engine (192) can access the overflow postings reference (198B) based on the search term in the dictionary (193). The overflow postings reference (198B) can reference the first overflow block of the overflow postings list corresponding to the search term (e.g., the overflow block including element '2' in the overflow postings pool 1).

In one or more embodiments of the invention, the real-time search engine (192) includes functionality to access a last element of the overflow postings list corresponding to the search term. For example, in FIG. 11, the real-time search engine (192) can use overflow postings reference (198A) to access a last overflow block for each term in the dictionary (193) (if one exists). In one or more embodiments, the real-time search engine (192) cannot access overflow postings reference (198A) due to the writer thread of the segment continuously updating overflow postings reference (198A). Thus, in one or more embodiments, the real-time search engine (192) cannot be configured to backward traverse the overflow postings list from an end of the overflow postings list for a term. Instead, the real-time search engine (192) can be configured to forward-traverse the overflow postings list using overflow postings reference (198B).

In one or more embodiments of the invention, the real-time search engine (192) includes functionality to receive a search request including one or more search terms. Examples of a search term can include, but are not limited to, a general search term entered into a text box by a user of a client device (e.g., "Antarctica", "puppies", etc.), and/or any other term usable in identifying content and/or attributes of a message. Search terms can be generated by a user or can be added to a search request based on a context of the search (e.g., image search, video search, news search, originating client platform, etc.). The client (105), frontend module (110), and/or search fanout module (115) can be configured to add or modify a search term based on the context, in accordance with various embodiments.

In one or more embodiments of the invention, the real-time search engine (192) includes functionality to search, based on the search term, the postings list to identify a first set of matching document identifiers. Searching the postings list can include, but is not limited to, searching the contents of documents in the postings list for a match with the search term, searching a query cache for matches with the search term, and/or any other search method for matching the search term with a document identifier in the postings list.

In one or more embodiments of the invention, the real-time search engine (192) includes functionality to search the postings list in reverse chronological order of the time slice of documents. In other words, the real-time search engine (192) begins searching the most recent messages first and searches older messages as it continues to search. In one example, the real-time search engine (192) discontinues the search once a message corresponding to a predefined time threshold is reached (e.g., a message that is 7 days old). In another example, the real-time search engine (192) discontinues the search after identifying a predefined number of matching messages or a specified matching message.

In one or more embodiments of the invention, the real-time search engine includes functionality to calculate relevance scores for documents referenced by each of the set of primary postings, where the relevance scores are calculated based at least on timeliness. For example, the real-time search engine (192) can calculate higher relevance scores for documents that have been posted more recently compared to documents that have been posted formerly. In one or more embodiments of the invention, the set of document identifiers is selected for inclusion in the result set based on the calculated relevance scores.

In one or more embodiments of the invention, the real-time search engine (192) includes functionality to generate, based on the set of primary postings and the identified overflow blocks, a result set including a set of document identifiers of documents matching one or more search terms. The real-time search engine (192) can be configured to select a subset of the document identifiers for inclusion in the result set based on their calculated relevance scores. In one example, the relevance score can be based on matching one or more search terms to a payload attribute in the overflow postings list. In one or more embodiments of the invention, the result set further includes one or more payload attributes corresponding to matched document identifiers.

In one or more embodiments of the invention, the real-time search engine includes functionality to return the result set in response to the search request. For example, the real-time search engine (192) can return the result set to the search fanout module (115) in response to the search request.

In one or more embodiments of the invention, a postings list update engine includes functionality to read and/or modify the primary and/or overflow postings lists. The postings list update engine may include one or more background processes (not shown) configured to periodically or continuously update the primary and/or overflow postings lists by calculating and/or identifying terms in documents, and updating primary postings and overflow postings accordingly. The background processes may follow a writer thread updating one or more inverted message indices of the segments, and may update stale primary postings and overflow postings for newly written postings.

In one or more embodiments of the invention, each partition (150) includes a single writer thread (not shown). The writer thread can be configured to modify the segment(s) of the partition according to a predefined protocol. For example, the writer thread can be configured to periodically replace or overwrite an oldest segment of the partition with document identifiers of a current time slice of new messages of the messaging platform. In one or more embodiments of the invention, by utilizing a single writer thread, the partition (150) is configured to avoid the use of exclusive locks entirely and to guarantee that the writer thread is non-blocking and wait-free (i.e., never blocked in progressing by locked resource).

In one or more embodiments of the invention, the writer thread includes functionality to maintain a shared volatile variable designating or associated with a last written document identifier. The shared volatile variable can be shared between the writer thread and any number of reader threads of the real-time search engine (192). The writer thread and the real-time search engine (192) can be configured to utilize the shared volatile variable to synchronize concurrent read and write operations and/or to implement the aforementioned non-blocking wait-free algorithm.

In one or more embodiments of the invention, the writer thread includes functionality to write a predefined number of document identifiers (and related data) to a segment. The written data (or a portion thereof) can be cached and, thus, not yet written to shared memory (e.g., RAM or other memory shared between two or more CPU cores), depending on the caching algorithm used. The writer thread can be configured to perform a write to the volatile variable at a location in the program order which precedes any reads of the written document identifiers. In one or more embodiments of the invention, the write of the volatile variable causes a flush of the cache to shared memory for at least the written document identifiers. The writer thread can further be configured to maintain a shared last written document identifier (e.g., as a value of the volatile variable). Thus, the real-time search engine (192) can be configured to read document identifiers up to the last written document identifier. In one or more embodiments of the invention, these document identifiers are guaranteed to be valid because the real-time search engine (192) only reads document identifiers up until the last written document identifier (which is not updated until the write of the volatile variable). Because the write of the volatile variable occurs prior (in the program order) to any reads of the written document identifiers, the data is guaranteed to be flushed to shared memory and thus valid. In this way, the real-time search engine (192) can be configured to use the volatile variable to create a memory barrier which is visible to multiple executing threads.

In one or more embodiments of the invention, each partition (150) includes multiple writer threads. In this case, the partition can be configured to utilize one or more synchronization mechanisms to maintain data integrity and to avoid potential concurrency issues.

The partition (150) can be implemented as a single physical computing device (e.g., a server) or any number of physical computing devices in a distributed system. Thus, for example, the partition (150) may refer to a single server device, or a logical group of communicatively coupled server devices in a cluster. Similarly, the segments may be implemented in various different physical configurations. Thus, each segment may be implemented as any number of separate computing devices, each segment may refer to a set of related applications in a distributed system, or the segments may reside in the same physical computing device, in accordance with various embodiments of the invention.

Returning to FIG. 1A, in one or more embodiments of the invention, each partition of the partitions (120) includes functionality to send one or more of the identified document identifier(s) to the search fanout module (115). Each partition can be configured to send any subset of the document identifiers to the search fanout module (115), in accordance with a predefined protocol for selecting document identifiers. For example, the partition can rank the document identifiers based on their relevance scores and can select the highest ranked subset, the lowest ranked subset, or a random subset of the document identifiers for transmission to the search fanout module (115).

In one or more embodiments of the invention, the search fanout module (115) includes functionality to receive the document identifier(s) from one or more of the partitions (115). The fanout module (115) can be configured to receive any number of document identifiers from each partition (e.g., depending on the number of matches or selections made by the partition).

In one or more embodiments of the invention, the search fanout module (115) includes functionality to select any number of the received document identifiers for responding to the search query. Thus, the search fanout module (115) can be configured to simply aggregate the document identifiers from each partition and to send them in response to the search query, or to reduce the total number of document identifiers by selecting one or more document identifiers from the aggregated set. The search fanout module (115) can be configured to perform the selection randomly or according to a predefined algorithm. In one or more embodiments of the invention, the partitions calculate a relevance score for each document identifier. The document identifiers are sent along with their corresponding relevance scores to the search fanout module (115). In this case, the search fanout module (115) can be configured to aggregate the document identifiers and to select a subset of the aggregated document identifiers with the highest relevance scores to be sent in response to the search query. Aggregating the document identifiers may involve simply obtaining the identifiers from their respective partitions, in accordance with various embodiments of the invention.

Figure 15A:
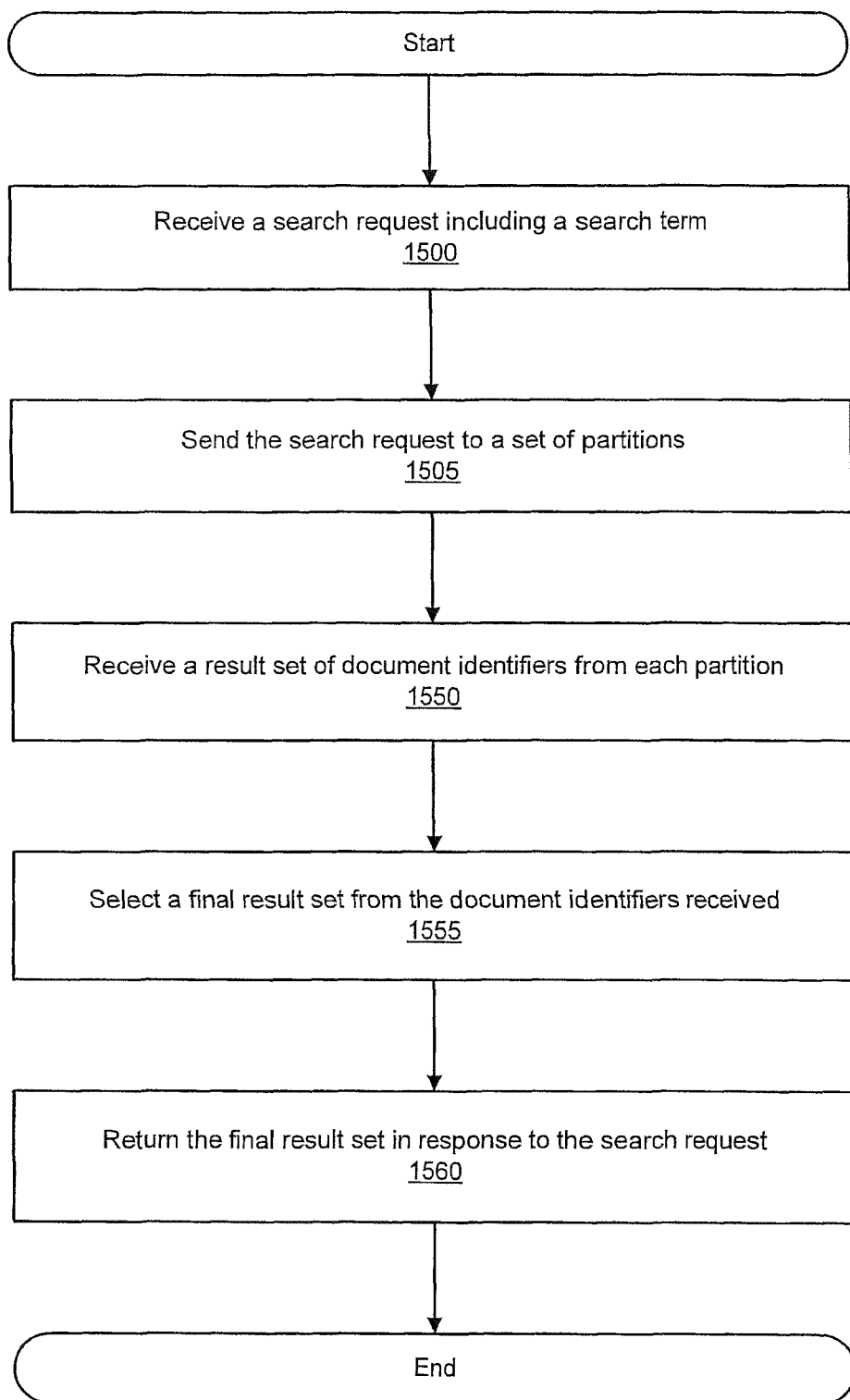
FIGS. 15A and 15B show flowcharts in accordance with one or more embodiments of the invention.

FIG. 15A shows a flowchart of a method for search (e.g., in a messaging platform). While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 15A should not be construed as limiting the scope of the invention.

In STEP 1500, a search request including a search term is received. For example, referring to FIG. 1A, the search fanout module (115) can receive a search request including a search term from the client (105) (e.g., by way of the frontend module (110)).

In STEP 1505, the search request is sent to a set of partitions. The partitions can perform separate searches in order to identify one or more document identifiers based on any number of provided search terms (e.g., the search term). The partitions can perform the searches serially, in parallel, and/or in any combination thereof.

In STEP 1550, a result set of document identifiers is received from each partition. For example, referring to FIG. 1A, the search fanout module (115) receives a result set of document identifiers from each of the partitions (120). The result set can include a set of document identifiers of documents matching the search term from one or more segments of one or more of the partitions.

In STEP 1555, a final result set is selected from the set of document identifiers received. In STEP 1560, the final result set is returned in response to the search request. For example, the search fanout module (115) can return the final result set to the client (105) (e.g., by way of the frontend module (110)) in response to the search request.

Figure 15B:
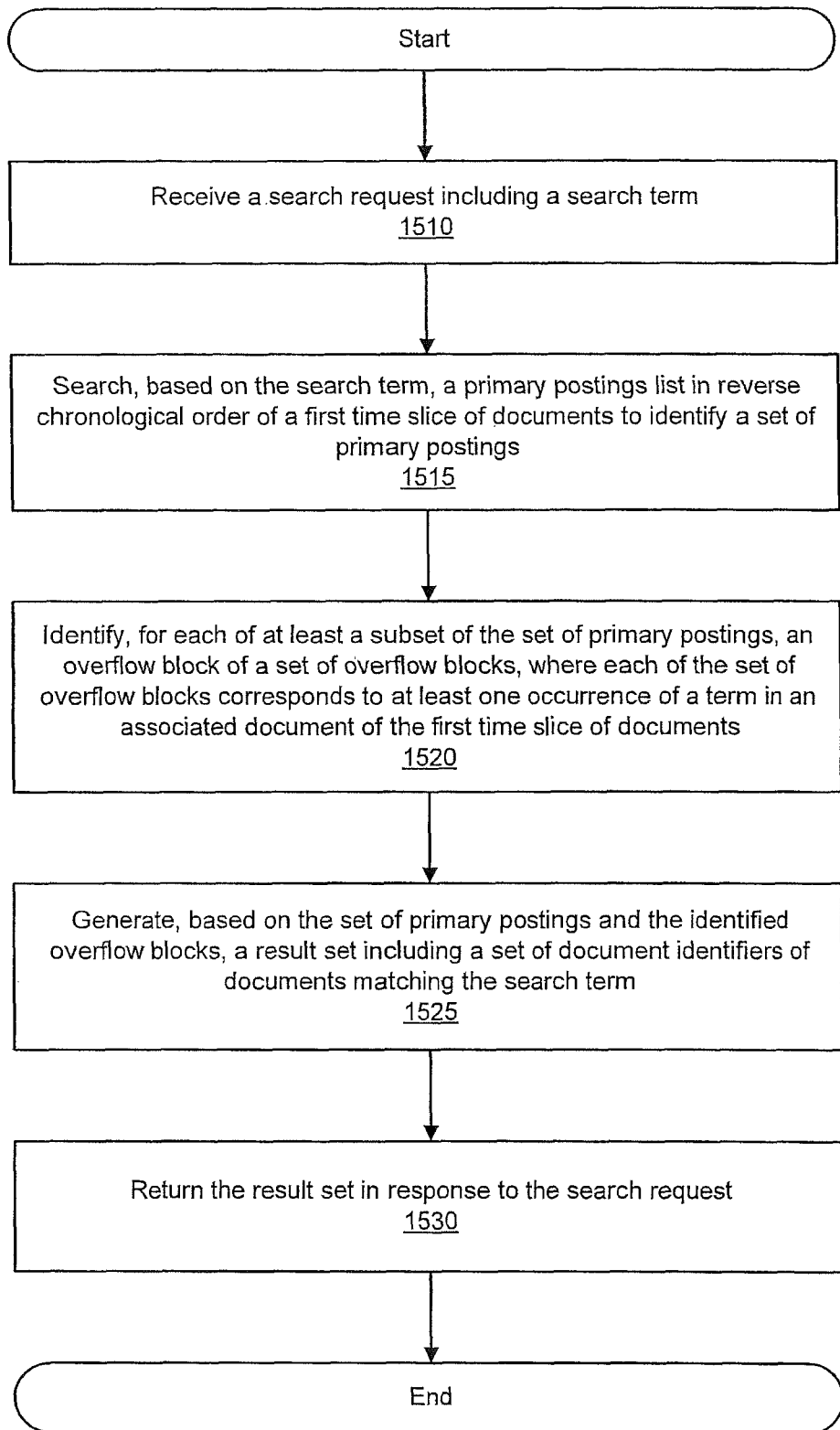

FIG. 15B shows a flowchart of a method for search (e.g., in a messaging platform). While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 15B should not be construed as limiting the scope of the invention.

In STEP 1510, a search request including a search term is received. For example, referring to FIG. 1A, a partition of the partitions (120) receives a search request including a search term from the search fanout module (115).

In STEP 1515, a primary postings list is searched, based on the search term, in reverse chronological order of a time slice of documents to identify a set of primary postings. In other words, the most recent messages are searched first. In one example, in FIG. 12F, the real-time search engine (192) begins searching the most recent messages in the primary postings pool 4 first (e.g., beginning from the right side of the primary postings pool 4, through messages '19', '18,' '17', and so on).

In STEP 1520, for each of at least a subset of the set of primary postings, an overflow block of a set of overflow blocks is identified, where each of the set of overflow blocks corresponds to at least one occurrence of a term in an associated document of the time slice of documents. The overflow block can be identified by using a skip entry to avoid traversing the entire overflow postings list for the term. If no skip entry is available, the entire overflow postings list is forward-traversed from a lowest level overflow block of the term.

In STEP 1525, based on the set of primary postings and the identified overflow blocks, a result set including a set of document identifiers of documents matching the search term is generated. For example, relevance scores can be calculated for documents identified by each of the set of primary postings, where the relevance scores are calculated based at least on timeliness. As a result, higher relevance scores can be calculated for documents that have been posted more recently compared to documents that have been posted formerly. In STEP 1530, the result set is returned in response to the search request.

In one or more embodiments of the invention, a method for search (e.g., in a messaging platform) includes STEPs 1500-1560 of FIG. 15A and STEPs 1510-1530 of FIG. 15B. For example, STEPs 1500 and 1505 of FIG. 15A can be first executed, followed by the execution of STEPs 1510-1530 of FIG. 15B, and then followed by the execution of STEPs 1550-1560 of FIG. 15A. It should be appreciated that in one or more embodiments of the invention, the steps of FIG. 15A can be executed by the same or a different module from the module executing the steps of FIG. 15B.

Figure 16:
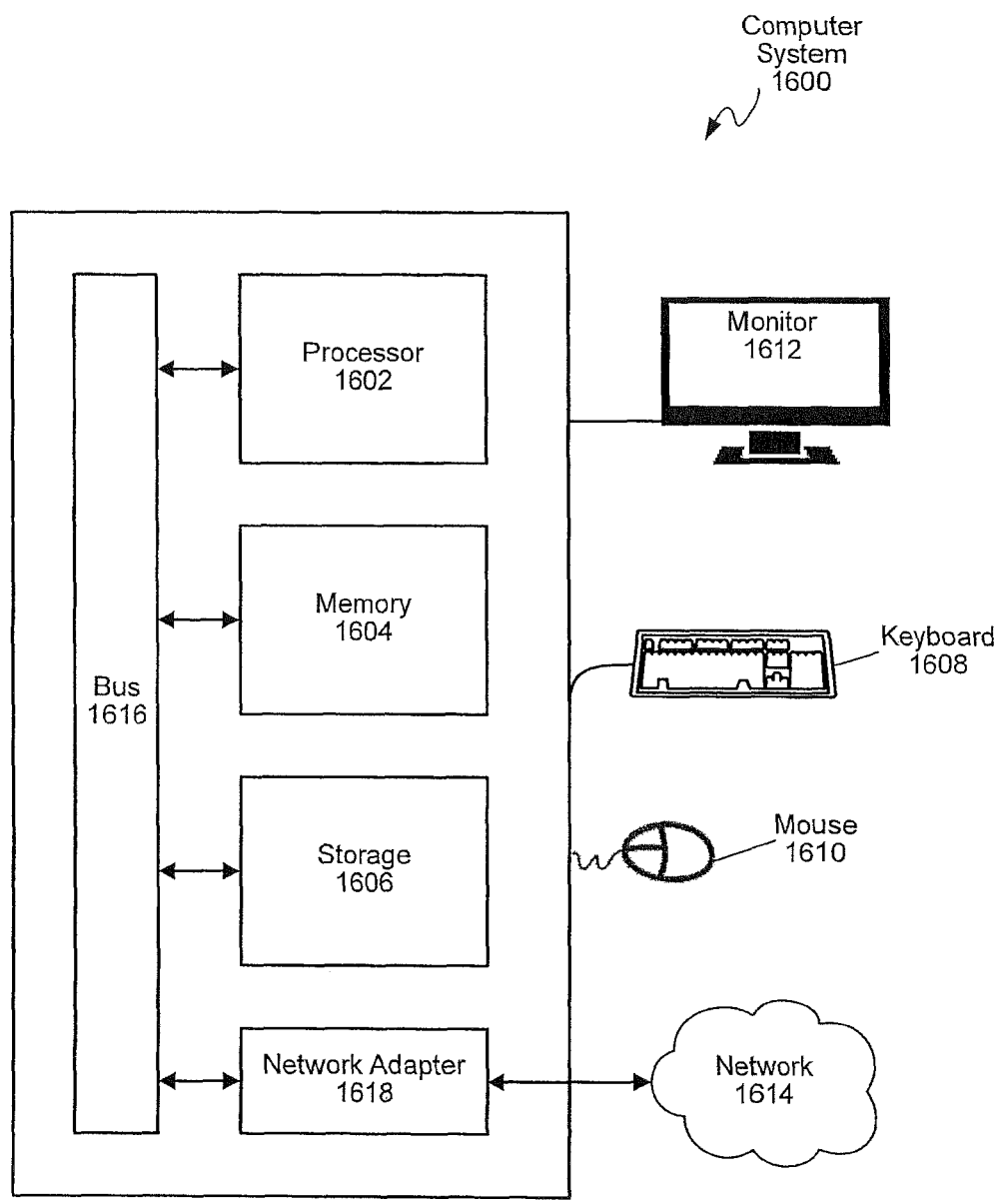
FIG. 16 shows a computer system in accordance with one or more embodiments of the invention.

Embodiments of the invention can be implemented on virtually any type of computer regardless of the platform being used. For example, as shown in FIG. 16, a computer system (1600) includes one or more processor(s) (1602) (such as a central processing unit (CPU), integrated circuit, hardware processor, etc.), associated memory (1604) (e.g., RAM, cache memory, flash memory, etc.), a storage device (1606) (e.g., a hard disk, an optical drive such as a compact disk drive or digital video disk (DVD) drive, a flash memory stick, etc.), a network adapter (1618), and numerous other elements and functionalities typical of today's computers (not shown). One or more components of the computer system (1600) can be communicatively connected by a bus (1616). The computer system (1600) may also include input means, such as a keyboard (1608), a mouse (1610), or a microphone (not shown). Further, the computer system (1600) may include output means, such as a monitor (1612) (e.g., a liquid crystal display (LCD), a plasma display, or cathode ray tube (CRT) monitor). The computer system (1600) may be connected to a network (1614) (e.g., a local area network (LAN), a wide area network (WAN) such as the Internet, or any other type of network) via the network adapter (1618). Those skilled in the art will appreciate that many different types of computer systems exist, and the aforementioned input and output means may take other forms. Generally speaking, the computer system (1600) includes at least the minimal processing, input, and/or output means necessary to practice embodiments of the invention.

Further, in one or more embodiments of the invention, one or more elements of the aforementioned computer system (1600) may be located at a remote location and connected to the other elements over a network. Further, embodiments of the invention can be implemented on a distributed system having a plurality of nodes, where each portion of the invention (e.g., search fanout module (115), partitions (120), message repository (140), frontend module (110), etc. of FIG. 1A, discussed above) may be located on a different node within the distributed system. In one embodiment of the invention, the node corresponds to a computer system. Alternatively, the node can correspond to a processor with associated physical memory. The node can alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By performing parallel searches of an inverted message index in reverse chronological order of messages, it may be possible to provide time-sensitive search results from a real-time messaging platform. By using parallel arrays store data associated with postings in the inverted message index, it may be possible to reduce the number of allocated objects and, thus, to reduce the garbage collection overhead (where applicable).

Furthermore, by using a single writer thread to update multiple segments of a partition as well as a shared volatile variable for concurrency among multiple reader threads, it may be possible to achieve a non-blocking wait free algorithm for reading and writing to the inverted message index.

Further, one or more elements of the above described systems (e.g., messaging platform 100 of FIG. 1A, computer system 1600 of FIG. 16) can be implemented as software instructions in the form of computer readable program code stored, temporarily or permanently, on one or more non-transitory computer readable storage media. The non-transitory computer readable storage media are executable by one or more computer processors to perform the functionality of one or more components of the above-described systems (e.g., FIGS. 1A and 1C) and/or flowcharts (e.g., FIGS. 3A-3D), in accordance with various embodiments of the invention. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for real-time search in a messaging platform, comprising:
   one or more computers including one or more a computer processors and one or more storage devices, the one or more computers being configured to provide;
   a fanout module configured to:
      receive a search query comprising one or more search terms;
      provide the search query to each of a plurality of partitions in parallel; and
      receive, from one or more of the partitions in response to the search query, one or more document identifiers corresponding to messages containing one or more of the search terms;
   the plurality of partitions, each partition comprising:
      a set of segments, wherein each segment of the set of segments stores a postings list representing messages broadcast to the messaging platform during a particular time slice defining a particular time range in which the messages represented by the segment were broadcast, wherein the messages were broadcast by respective user accounts of the messaging platform, wherein each segment of the partition corresponds to a different time slice; and
      a real-time search engine configured to:
         receive the one or more terms of the search query in parallel with search engines of the other partitions in the plurality of partitions; and
         search at least one segment of the set of segments, wherein the at least one segment is searched in reverse chronological order according to the time range specified by the time slice of each segment of the partition such that the segment with the most recent time range is searched first, wherein the search is performed to identify document identifiers of messages from the postings list containing one or more of the search terms.

2. The system of claim 1, wherein the real-time search engine is further configured to:
calculate a relevance score for each of the identified document identifiers;
rank the document identifiers in order of the calculated relevance scores; and
send a highest ranked subset of the document identifiers to the search fanout module, and wherein the one or more document identifiers are selected from the highest ranked subsets sent from each of the plurality of partitions.

3. The system of claim 2, wherein the search fanout module further comprises functionality to:
receive the highest ranked subsets of the document identifiers from each of the plurality of partitions; and
select the one or more document identifiers from the highest ranked subsets based on the calculated relevance scores.

4. The system of claim 2, wherein the relevance score for each of the document identifiers is calculated based on a set of linear weights associated with the document identifier and a set of non-linear weights associated with the document identifier.

5. The system of claim 4, wherein the relevance score for each of the document identifiers is calculated using the following formula:

$$\text{score}(t)=\Sigma L_t * \Pi B_t,$$

wherein t is the document identifier, wherein Lt is the set of linear weights associated with the document identifier, and wherein Bt is the set of non-linear weights associated with the document identifier.

6. The system of claim 1, wherein each of the plurality of partitions further comprises:
a query cache comprising a set of binary attributes for each document identifier in the set of segments of the partition, and
wherein the real-time search engine is further configured to:
receive a binary attribute with the search term, wherein searching at least one segment of the set of segments to identify the document identifiers is limited to the entries having the binary attribute,
wherein the binary attribute is one selected from a group consisting of a top contributor flag, a top message flag, a spam flag, an includes image flag, an includes video flag, and an includes news flag.

7. The system of claim 1, further comprising a message ingester configured to:
receive a request to index a new message broadcasted by the messaging platform;
select a partition of the plurality of partitions for indexing the new message; and
send a document identifier of the new message to the selected partition for inclusion in a current time slice of the partition.

8. The system of claim 7, wherein each of the plurality of partitions further comprises a single writer thread configured to:
select an oldest segment of the set of segments corresponding to an oldest time slice; and
overwrite the oldest segment with document identifiers broadcast during the current time slice.

9. A method for real-time search in a messaging platform, comprising:
receiving a search query comprising one or more search terms;
sending the search query to each of a plurality of partitions for parallel searching, wherein each partition of the plurality of partitions comprises a set of segments, and wherein each segment of the set of segments stores a postings list representing messages broadcast to the messaging platform during a particular time slice defining a particular time range in which the messages represented by the segment were broadcast, wherein the messages were broadcast by respective user accounts of the messaging platform, wherein each segment of the partition corresponds to a different time slice;
for each partition, in parallel with other partitions in the plurality of partitions:
searching, using a computer processor, at least one segment of the set of segments of the partition, wherein the at least one segment is searched in reverse chronological order according to the time range specified by the time slice of each segment of the partition such that the segment with the most recent time range is searched first, wherein the search is performed to identify one or more document identifiers of messages from the postings list containing one or more of the search terms; and
returning, in response to the search query, at least one of the identified document identifiers of messages containing the search term.

10. The method of claim 9, further comprising:
for each partition, in parallel with other partitions in the plurality of partitions:
calculating a relevance score for each of the identified document identifiers;
ranking the document identifiers in order of the calculated relevance scores; and
sending a highest ranked subset of the document identifiers to a search fanout module; and
wherein the at least one document identifier is selected from the highest ranked subsets sent from each of the plurality of partitions.

11. The method of claim 10, further comprising:
receiving the highest ranked subsets of the document identifiers from each of the plurality of partitions; and
selecting the at least one document identifier from the highest ranked subsets based on the calculated relevance scores.

12. The method of claim 9, wherein:
each of the plurality of partitions comprises a query cache comprising a set of binary attributes for each document identifier in the set of segments of the partition; and
the method further comprises receiving a binary attribute with the search term, wherein searching the at least one segment to identify the document identifiers is limited to the entries having the binary attribute.

13. The method of claim 12, wherein each partition of the plurality of partitions comprises only a single writer thread, and wherein the method further comprises:
identifying a last update identifier indicating a last update point of the query cache;
identifying a last written document identifier designating a position of the single writer thread of the partition;
identifying, based on the last update identifier and the last written document identifier, a stale portion of the query cache corresponding to a fresh portion of a postings list of the at least one segment;

refreshing the stale portion of the query cache; and determining a safe search range of the postings list including the refreshed portion.

14. The method of claim 9, further comprising:

receiving a request to index a new message broadcasted by the messaging platform;

selecting a partition of the plurality of partitions for indexing the new message; and sending a document identifier of the new message to the selected partition for inclusion in a current time slice of the partition.

15. The method of claim 14, wherein selecting the partition comprises calculating a mathematical function using the document identifier of the new message, wherein the partition is selected based on an output of the mathematical function.

16. The method of claim 14, wherein each of the plurality of partitions further comprises a single writer thread, and wherein the method further comprises:

selecting, by the single writer thread, an oldest segment of the set of segments corresponding to an oldest time slice; and overwriting, by the single writer thread, the oldest segment with document identifiers broadcast during the current time slice.

17. The method of claim 16, wherein overwriting the oldest segment comprises:

deleting the oldest segment;

selecting a predefined number of current document identifiers;

writing the predefined number of current document identifiers to the oldest segment; and updating a shared volatile variable to indicate a last written document identifier of the current document identifiers, wherein updating the shared volatile variable causes a cache flush for documents up to the last written document identifier to occur, and wherein the shared volatile variable is read by a plurality of concurrent reader threads to determine a safe search range.

18. A non-transitory computer readable medium (CRM) storing instructions for real-time search in a messaging platform, the instructions comprising functionality for:

receiving a search query comprising one or more search term;

sending the search query to each of a plurality of partitions for parallel searching, wherein each partition of the plurality of partitions comprises a set of segments, and wherein each segment of the set of segments stores a postings list representing messages broadcast to the messaging platform during a particular time slice defining a particular time range in which the messages represented by the segment were broadcast, wherein the messages were broadcast by respective user accounts such that each segment identifies messages broadcast to one or more accounts of the messaging platform, wherein each segment of the partition corresponds to a different time slice;

for each partition, in parallel with other partitions in the plurality of partitions:

searching, using a computer processor, at least one segment of the set of segments of the partition, wherein the at least one segment is searched in reverse chronological order according to the time range specified by the time slice of each segment of the partition such that the segment with the most recent time range is searched first, wherein the search is performed to identify document identifiers of messages from the postings list containing one or more of the search term; and returning, in response to the search query, at least one of the identified document identifiers of messages containing the search term.

19. The non-transitory CRM of claim 18, the instructions further comprising functionality for:

for each partition, in parallel with other partitions in the plurality of partitions:

calculating a relevance score for each of the identified document identifiers;

ranking the document identifiers in order of the calculated relevance scores; and sending a highest ranked subset of the document identifiers to a search fanout module; and wherein the at least one document identifier is selected from the highest ranked subsets sent from each of the plurality of partitions.

20. The non-transitory CRM of claim 18, wherein:

each of the plurality of partitions comprises a query cache comprising a set of binary attributes for each document identifier in the set of segments of the partition; and the instructions further comprise functionality for receiving a binary attribute with the search term, wherein searching the at least one segment to identify the document identifiers is limited to the entries having the binary attribute.

21. The non-transitory CRM of claim 20, wherein each partition of the plurality of partitions comprises only a single writer thread, and wherein the instructions further comprise functionality for:

identifying a last update identifier indicating a last update point of the query cache;

identifying a last written document identifier designating a position of the single writer thread of the partition;

identifying, based on the last update identifier and the last written document identifier, a stale portion of the query cache corresponding to a fresh portion of a postings list of the at least one segment;

refreshing the stale portion of the query cache; and determining a safe search range of the postings list including the refreshed portion.

22. The non-transitory CRM of claim 18, the instructions further comprising functionality for:

receiving a request to index a new message broadcasted by the messaging platform;

selecting a partition of the plurality of partitions for indexing the new message; and sending a document identifier of the new message to the selected partition for inclusion in a current time slice of the partition.

23. The non-transitory CRM of claim 22, wherein selecting the partition comprises calculating a mathematical function using the document identifier of the new message, wherein the partition is selected based on an output of the mathematical function.

24. The non-transitory CRM of claim 22, wherein each of the plurality of partitions further comprises a single writer thread, and wherein the instructions further comprise functionality for:

selecting, by the single writer thread, an oldest segment of the set of segments corresponding to an oldest time slice; and overwriting, by the single writer thread, the oldest segment with document identifiers broadcast during the current time slice.

25. The non-transitory CRM of claim 24, wherein the instructions for overwriting the oldest segment comprise functionality for:
deleting the oldest segment;
selecting a predefined number of current document identifiers;
writing the predefined number of current document identifiers to the oldest segment; and
updating a shared volatile variable to indicate a last written document identifier of the current document identifiers, wherein updating the shared volatile variable causes a cache flush for documents up to the last written document identifier to occur, and wherein the shared volatile variable is read by a plurality of concurrent reader threads to determine a safe search range.

26. The system of claim 1, wherein each segment further comprises at least a portion of an inverted index that associates terms with messages containing the terms, and wherein searching a segment includes searching the inverted index for the segment to identify messages containing the search term.

* * * * *